United States Patent [19]

Lyon et al.

[11] Patent Number: 5,892,924
[45] Date of Patent: Apr. 6, 1999

[54] METHOD AND APPARATUS FOR DYNAMICALLY SHIFTING BETWEEN ROUTING AND SWITCHING PACKETS IN A TRANSMISSION NETWORK

[75] Inventors: Thomas Lyon, Palo Alto; Peter Newman, Mt. View; Greg Minshall, Los Altos; Robert Hinden, Palo Alto; Fong Ching Liaw, Sunnyvale; Eric Hoffman, Mt. View, all of Calif.

[73] Assignee: IPSILON Networks, Inc., Sunnyvale, Calif.

[21] Appl. No.: 597,520

[22] Filed: Jan. 31, 1996

[51] Int. Cl.$^6$ .................................................. G06F 15/16
[52] U.S. Cl. ...................................... 395/200.75; 370/405
[58] Field of Search ........................ 395/200.75, 200.66, 395/200.68; 370/395, 396, 397, 399, 405

[56] References Cited

U.S. PATENT DOCUMENTS 5,379,297  1/1995  Glover et al. ............................ 370/60.1
5,444,702  8/1995  Burnett et al. .......................... 370/60.1

OTHER PUBLICATIONS

Johnson, S.A., "ATM Performance Management," pp. 6/1–6/3, 1995.
Scott A., et al., "Communications Support For Multimedia Workstaions," pp. 67–72, 1990.

Primary Examiner—Larry D. Donaghue

[57] ABSTRACT

A method and apparatus for dynamically shifting between switching and routing packets efficiently to provide high packet throughput. The present invention provides a method for transmitting packets between an upstream node and a downstream node in a network that utilizes flow classification and labelling to redirect flows. The method includes the steps of establishing default virtual channels between the upstream node and the downstream node, receiving a packet at the downstream node, performing a flow classification at the downstream node on the packet to determine whether the packet belongs to a specified flow that should be redirected in the upstream node, selecting a free label at the downstream node, and informing the upstream node that future packets belonging to the specified flow should be sent with the selected free label attached. Other embodiments of the present invention include a basic switching unit and a switch gateway unit for use in a system for transmitting packets in a network. Another embodiment includes system software, fixed on tangible media, that performs flow classification of packets to enable flow labelling and redirection to dynamically shift between Layer 3 IP packet routing and Layer 2 switching to optimize packet traffic throughput. A further embodiment provides a method for switching a flow at a first node in a network.

25 Claims, 31 Drawing Sheets

Switch Block Diagram generic IP packet (IPv4)

FIG. 8d

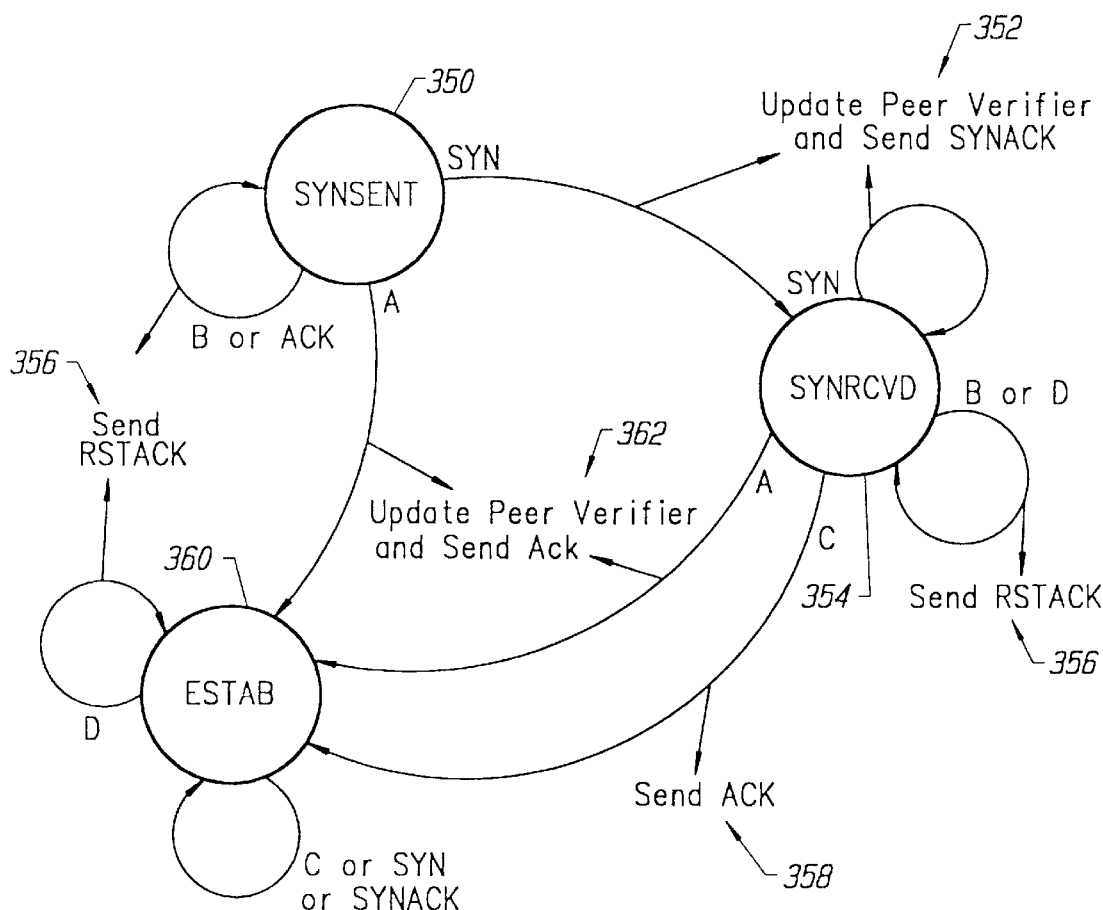

Legend
A: SYNACK AND %C
B: SYNACK AND NOT(%C)
C: ACK AND %B AND %C
D: ACK AND NOT (%B AND %C)

where % B: Sender Instance and Source IP Address in incoming message matches the values stored from previous message by Update Peer Verifier Operation for the port on which incoming message is received where % C: Peer Instance and Peer Identity in incoming message matches the values of Sender Instance and Source IP Address currently in use for all SYN, SYNACK, and ACK messages transmitted out of the port on shich incoming message is received

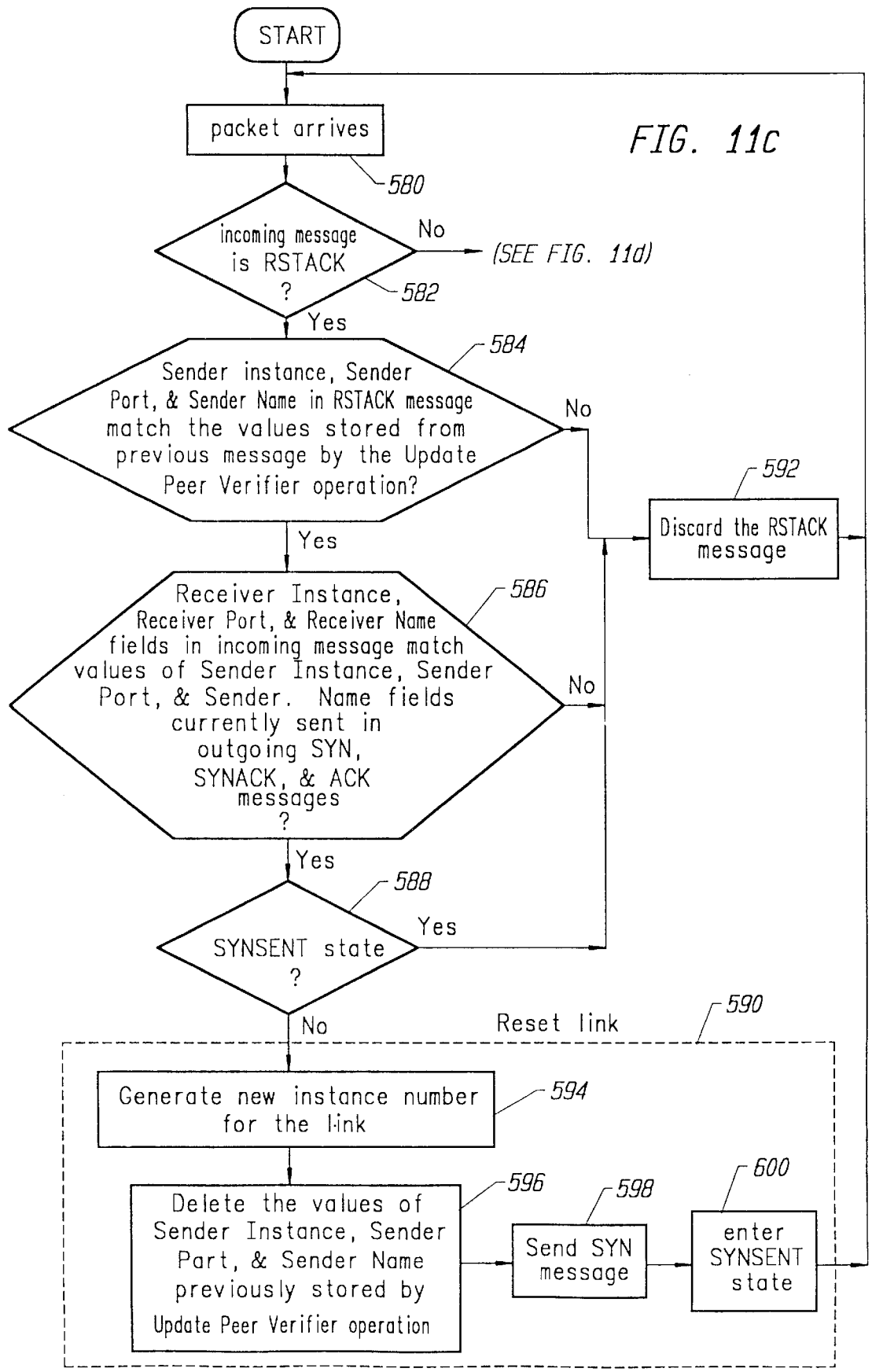

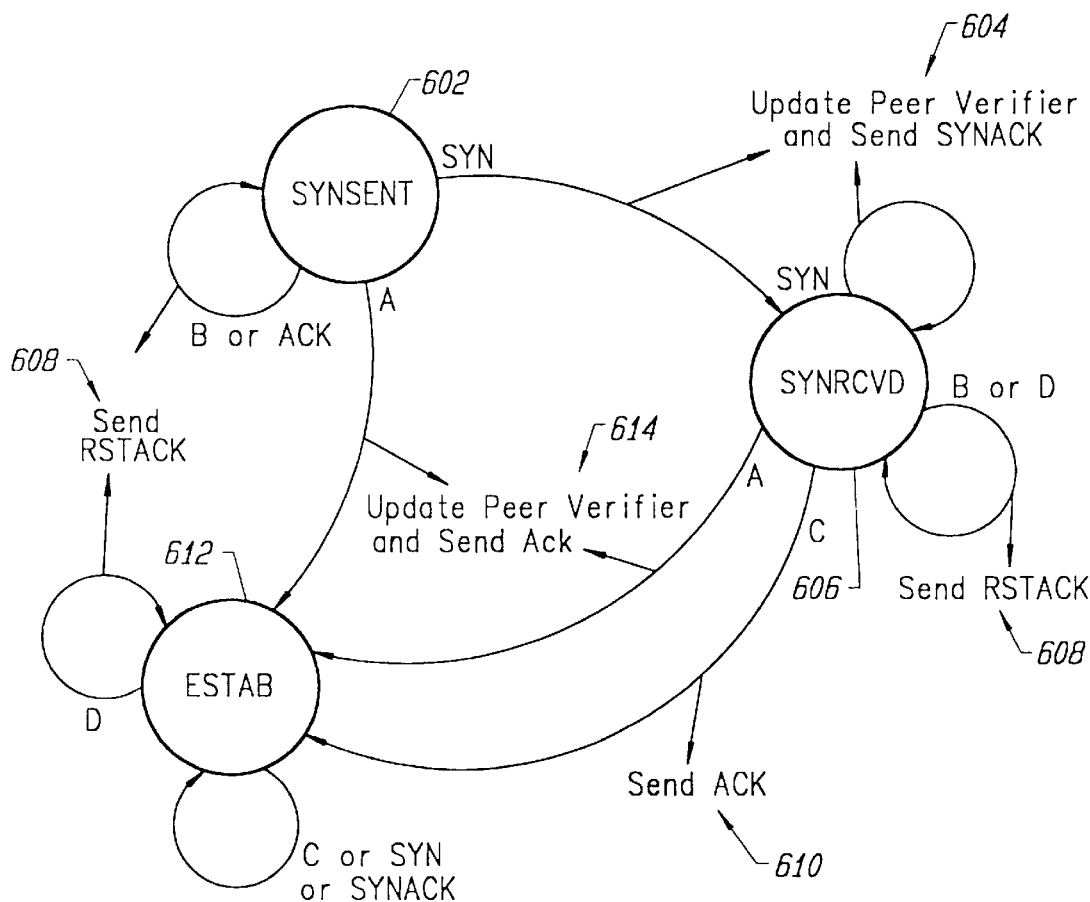

FIG. 11d

Legend

A: SYNACK AND %C
B: SYNACK AND NOT(%C)
C: ACK AND %B AND %C
D: ACK AND NOT(%B AND %C)

where %B: Sender Instance, Sender Port, and Sender Name in incoming message match values stored from previous message by Update Peer Verifier operation where %C: Receiver Instance, Receiver Port, and Receiver Name fields in incoming message match values of Sender Instance, Sender Port, & Sender Name currently sent in outgoing SYN, SYNACK, ACK messages

METHOD AND APPARATUS FOR DYNAMICALLY SHIFTING BETWEEN ROUTING AND SWITCHING PACKETS IN A TRANSMISSION NETWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates to the field of network communications. More particularly, in one embodiment the present is invention provides a method and apparatus for dynamically shifting between switching and routing packets efficiently to provide high packet throughput while maintaining complete Internet Protocol (IP) routing functionality. The present invention combines high speed, capacity, multiservice traffic capability, with simplicity, scaleability, and robustness.

Due to the current popularity and continual growth of the Internet, which utilizes IP, IP has evolved into the dominant network-layer protocol in use today. IP specifies protocol data unit (PDU) format and station-router and router-router interaction. IP provides a connectionless data transfer service to IP users in stations attached to networks of the Internet. The connectionless model on which IP is based provides a robust and flexible basis on which to construct an integrated services network. All major operating systems include an implementation of IP, enabling IP and its companion transport-layer (Layer 4 of the OSI reference model) protocol, the Transmission Control Protocol (TCP), to be used universally across virtually all hardware platforms. One of the major advantages of IP is its tremendous scaleability, operating successfully in networks with only a few users to enterprise-size networks, including the global Internet.

With the rapid growth of the Internet, conventional IP routers are becoming inadequate in their ability to handle the traffic on the Internet. With today's faster workstations, client-server computing, and higher bandwidth requirement applications, networks are increasingly encountering traffic congestion problems. Typical problems include for example highly variable network response times, higher network failure rates, and the inability to support delay-sensitive applications.

Local area network (LAN) switches offer a quick, relatively inexpensive way to relieve congestion on shared-media LAN segments. Switching technology is emerging as a more effective means of managing traffic and allocating bandwidth within a LAN than shared-media hubs or simple bridges. LAN switches operate as datalink layer (Layer 2 of the OSI reference model) packet-forwarding hardware engines, dealing with media access control (MAC) addresses and performing simple table look-up functions. Switch-based networks are able to offer greater throughput, but they continue to suffer from problems such as broadcast flooding and poor security. Routers, which operate at the network-layer (Layer 3 of the OSI reference model), are still required to solve these types of problems. However, fast switching technology is overwhelming the capabilities of current routers, creating router bottlenecks. The traditional IP packet-forwarding device on which the Internet is based, the IP router, is showing signs of inadequacy. Routers are expensive, complex, and of limited throughput, as compared to emerging switching technology. To support the increased traffic demand of large enterprise-wide networks and the Internet, IP routers need to operate faster and cost less.

Additionally, quality of service (QOS) selection is needed in order to support the increasing demand for real-time and multimedia applications, including for example conferencing. Currently TCP/IP does not support QOS selection. However, as advanced functionalities required by more types of traffic are enabled in IP, traditional IP routers will not suffice as packet-forwarding devices.

Asynchronous transfer mode (ATM) is a high-speed, scaleable, multiservice technology touted as the cornerstone of tomorrow's router-less networks. ATM is a highly efficient packet-forwarding technology with very high throughput, scaleability, and support for multiple types of traffic including voice and video as well as data. However, ATM is a networking technology so different from current networking architectures such as IP that there is no clear migration path to it. ATM has difficulty in effectively supporting existing LAN traffic due to its connection-oriented architecture, which creates the need for an additional set of very complex, untested multi-layer protocols. Problems with these protocols are evidenced by unacceptably long switched virtual circuit (SVC) connection setup times. Additionally, enabling TCP/IP users to send and receive ATM traffic using SVCs requires adopting even more new, unproven, and extremely complex protocols. These protocols do not enable applications running on TCP/IP protocols to take advantage of the QOS features of ATM, thereby imposing a tremendous amount of overhead for network managers without enabling one of the key benefits of ATM. Also, many of these protocols duplicate the functionality of the well-established TCP/IP protocol suite, and the need to learn these complex protocols increases the costs of ownership of ATM devices for network managers who must troubleshoot problems in the network. The difficulties of moving to ATM are especially pronounced in light of the time-tested and debugged IP being solidly entrenched with its huge and growing installed user base as evidenced by the popularity of the Internet.

In response to the inadequacies of current solutions to the problems, vendors have developed a host of new distributed routing networking architectures. However, these architectures are often complex, confusing, and duplicative of functionalities provided by IP. These architectures also result in increasingly complex problems for network managers. For example, duplication of functionality leads to increased strain on the network management function and can make isolation of network problems very difficult. It is seen that a system for high speed routing is needed to avoid bottlenecks and increased network management complexity. Further, provision of a networking architecture having compatibility with IP without unnecessary duplication is needed.

SUMMARY OF THE INVENTION

The present invention relates to the field of network communications, and in particular provides a method and apparatus for dynamically shifting between switching and routing packets efficiently to provide high packet throughput to solve the problems discussed above.

According to an embodiment, the present invention provides a method for transmitting packets between an upstream node and a downstream node in a network, the downstream node being downstream from the upstream node. The method includes the steps of establishing default virtual channels between the upstream node and the downstream node, receiving a packet at the downstream node, and performing a flow classification at the downstream node on the packet to determine whether the packet belongs to a specified flow that should be redirected in the upstream node. The method also includes selecting a free label at the downstream node, and informing the upstream node that future packets belonging to the specified flow should be sent with the selected free label attached.

In another embodiment, the present invention provides a method for switching a flow at a first node, the first node having a downstream link to a second node and an upstream link to a third node. The method includes the steps of performing a flow classification at the first node on a first packet to determine whether the first packet belongs to a specified flow that should be redirected in the third node, selecting a first free label at the first node, informing the third node that future packets belonging to the specified flow should be sent with the selected first free label attached. The method also includes performing a flow classification at the second node on a second packet to determine whether the second packet belongs to the specified flow that should be redirected in the third node, selecting a second free label at the second node, and informing the first node that future packets belonging to the specified flow should be sent with the selected second free label attached. The method operates such that the specified flow from the upstream link may be switched in layer 2 by the first node to the downstream link.

According to another embodiment, the present invention provides a basic switching unit in a system for transmitting packets in a network. The basic switching unit includes switching hardware, and a controller coupled to the switching hardware. The controller, which includes a processor and memory, controls the switching hardware. The basic switching unit further includes software, fixed on tangible media, that enables the basic switching unit to dynamically shift between Layer 3 IP packet routing and Layer 2 switching to optimize packet traffic throughput.

In accordance with yet another embodiment, the present invention provides a switch gateway unit in a system for transmitting packets in a network. The system includes a basic switching unit coupled to the switch gateway unit via a communication link. The switch gateway unit includes a gateway controller, and software. The gateway controller includes a processor, memory, and multiple NICs. The software, fixed on tangible media, enables the switch gateway unit to redirect a flow of packets to a basic switching unit to enable dynamic shifting between packet routing and switching to optimize packet traffic throughput.

BRIEF DESCRIPTION OF THE DRAWINGS

FIG. 8d is a state diagram illustrating the operation of a sender system node when the incoming IFMP adjacency protocol message is not an RSTACK message;

FIG. 11c is a simplified diagram illustrating the operation of a sender entity upon receiving a packet with an incoming GSMP adjacency protocol message;

FIG. 11d is a state diagram illustrating the operation of a sender entity when the incoming IFMP adjacency protocol message is not an RSTACK message;

DETAILED DESCRIPTION OF SPECIFIC EMBODIMENTS

Contents

I. General
II. System Hardware
  A. Controller Hardware
  B. Switching Hardware
  C. Exemplary Hardware
III. System Software Functionality
  A. IFMP and Transmission of Flow Labelled Packets
  B. GSMP
IV. Conclusion I. General An improved method and apparatus for transmitting packets in a network are disclosed herein. The method and apparatus will find particular utility and is illustrated herein as it is applied in the high throughput transmission of IP packets capable of carrying voice, video, and data signals over a local area network (LAN), metropolitan area networks (MAN), wide area network (WAN), Internet, or the like, but the invention is not so limited. The invention will find use in a wide variety of applications where it is desired to transmit packets over a network.

The system described herein is a dynamic switching and routing system. The system is described generally as a "switching system," however it should be recognized that the system dynamically provides both switching functionality at the datalink layer 2 as well as routing and packet forwarding functionality at the network layer 3. Additionally, the "basic switching unit" of the system also dynamically provides both layer 2 switching functionality as well as layer 3 routing and packet forwarding functionality. A "switch gateway unit" of the system serves as an access device to enable connection of existing LAN and backbone environments to a network of basic switching units. The system is compatible with the Internet Protocol (IP) in its current version (IPv4) as well as with future versions (e.g., IPv6). The system provides dynamic shifting between switching and routing of packets over the network to provide optimal high-speed packet throughput while avoiding router bottlenecks.

Figures 1A, 1B:
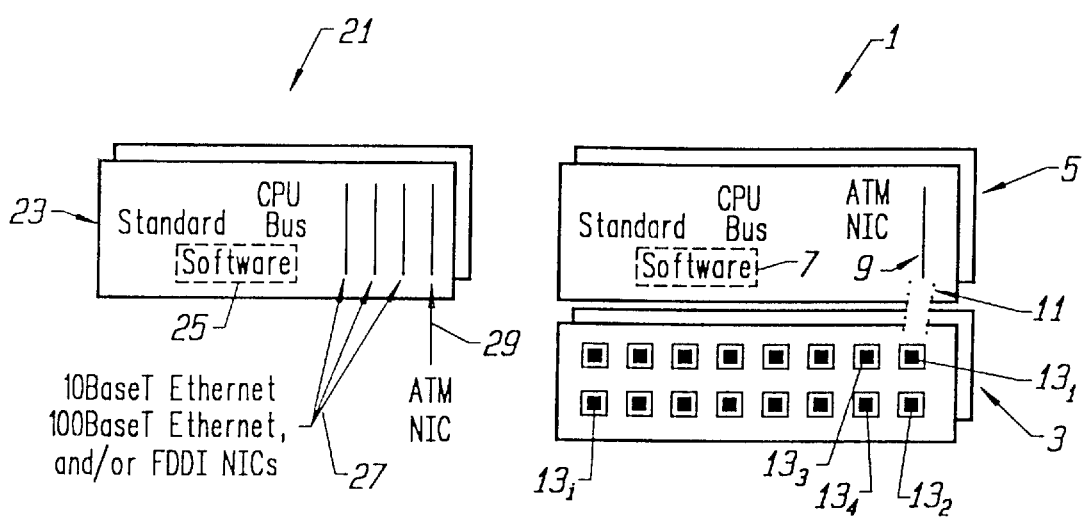
FIG. 1a is a simplified diagram of a basic switching unit of the system according to an embodiment of the invention.
FIG. 1b is a simplified diagram of a switch gateway unit of the system according to another embodiment of the invention.

As shown in FIG. 1a, a basic switching unit 1 of the switching system, according to an embodiment of the present invention, includes a switching engine 3, a switch controller 5, and system software 7 installed on switch controller 5. In particular, switching engine 3 utilizes conventional and currently available asynchronous transfer mode (ATM) switching hardware. Of course, other switching technologies such as for example fast packet switching, frame relay, or others may be used to provide the switching engine 3 of the present invention, depending on the application. In the present embodiment, switching engine 3 is an ATM switch. Any of the software normally associated with the ATM switch that is above the ATM Adaptation Layer type 5 (AAL-5) is completely removed. Thus, the signalling, any existing routing protocol, and any LAN emulation server or address resolution servers, etc. are removed.

Switch controller 5 is a computer having an ATM network adapter or network interface card (NIC) 9 connected to switching engine 3 via an ATM link 11. System software 7 is installed in basic switching unit 1, more particularly in the computer serving as switch controller 5.

Switching engine 3 of basic switching unit 1 has multiple physical ports $13_i$ capable of being connected to a variety of devices, including for example data terminal equipment (DTE), data communication equipment (DCE), servers, switches, gateways, etc. Each of the physical ports $13_i$ may be connected via an ATM link to a device equipped with an ATM adapter or NIC, or to a port of another basic switching unit. The ATM switching hardware providing the switching engine 3 of the basic switching unit operates at the datalink layer (Layer 2 of the OSI reference model).

Switching engine 3 serves to perform high-speed switching functions when required by the basic switching unit, as determined by the system software 7. The switching capability of the switching system is limited only by the hardware used in the switching engine 3. Accordingly, the present embodiment of the invention is able to take advantage of the high-speed, high capacity, high bandwidth capabilities of ATM technology. Of course, other switching technologies such as for example fast packet switching, frame relay, or others may be used to provide the switching engine 3 of the present invention, depending on the application.

In an embodiment of the present invention, the switch controller 5 is a computer connected to the ATM switch hardware 3 via an ATM link 9, and the system software is installed on the computer. In addition to performing standard connectionless IP routing functions at Layer 3, switch controller 5 also makes flow classification decisions for packets on a local basis.

As shown in FIG. 1b, a switch gateway unit 21 of the switching system, according to another embodiment of the present invention, includes a gateway switch controller 23, and system software 25 installed on gateway switch controller 23. Gateway switch controller 23 includes multiple network adaptors or NICs 27, and an ATM NIC 29. Similar to switch controller 5 of the basic switching unit 1, gateway switch controller 23 also is a computer equipped with an ATM NIC 29 having system software 25 installed on the computer. As discussed above, switch gateway unit 21 serves as an access device to enable connection of existing LAN and backbone environments to a network of basic switching units. Accordingly, NICs 27 may be of different types, such as for example 10BaseT Ethernet NICs, 100BaseT Ethernet NICs, Fiber Distributed Data Interface (FDDI) NICs, and others, or any combination of the preceding. Of course, the use of particular types of NICs 27 depends on the types of existing LAN and backbone environments to which switch gateway unit 21 provides access. It is recognized that multiple LANs may be connected to a switch gateway unit 21. ATM NIC 29 allows switch gateway unit 21 to connect via an ATM link to a basic switching unit 1. Of course, a NIC 27 may also be an ATM NIC to provide a connection between switch gateway unit 21 and another switch gateway unit as well.

In addition to basic switching units and switch gateway units, the present system may also include high performance host computers, workstations, or servers that are appropriately equipped. In particular, a subset of the system software can be installed on a host computer, workstation, or server equipped with an appropriate ATM NIC to enable a host to connect directly to a basic switching unit.

Figure 2A:
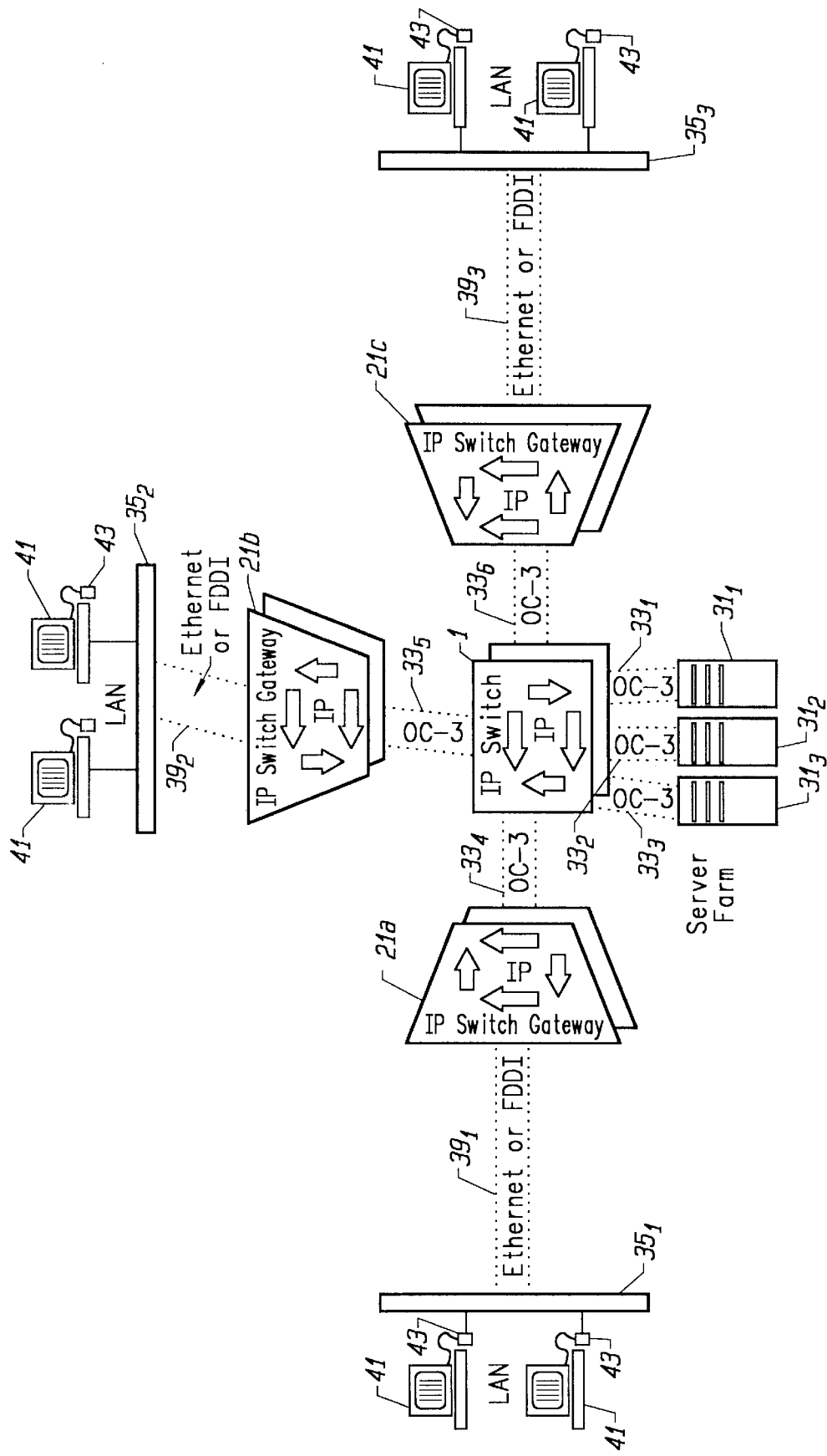
FIGS. 2a–2b are simplified diagrams of exemplary network configurations according an embodiment of the present invention.
Figure 2B:
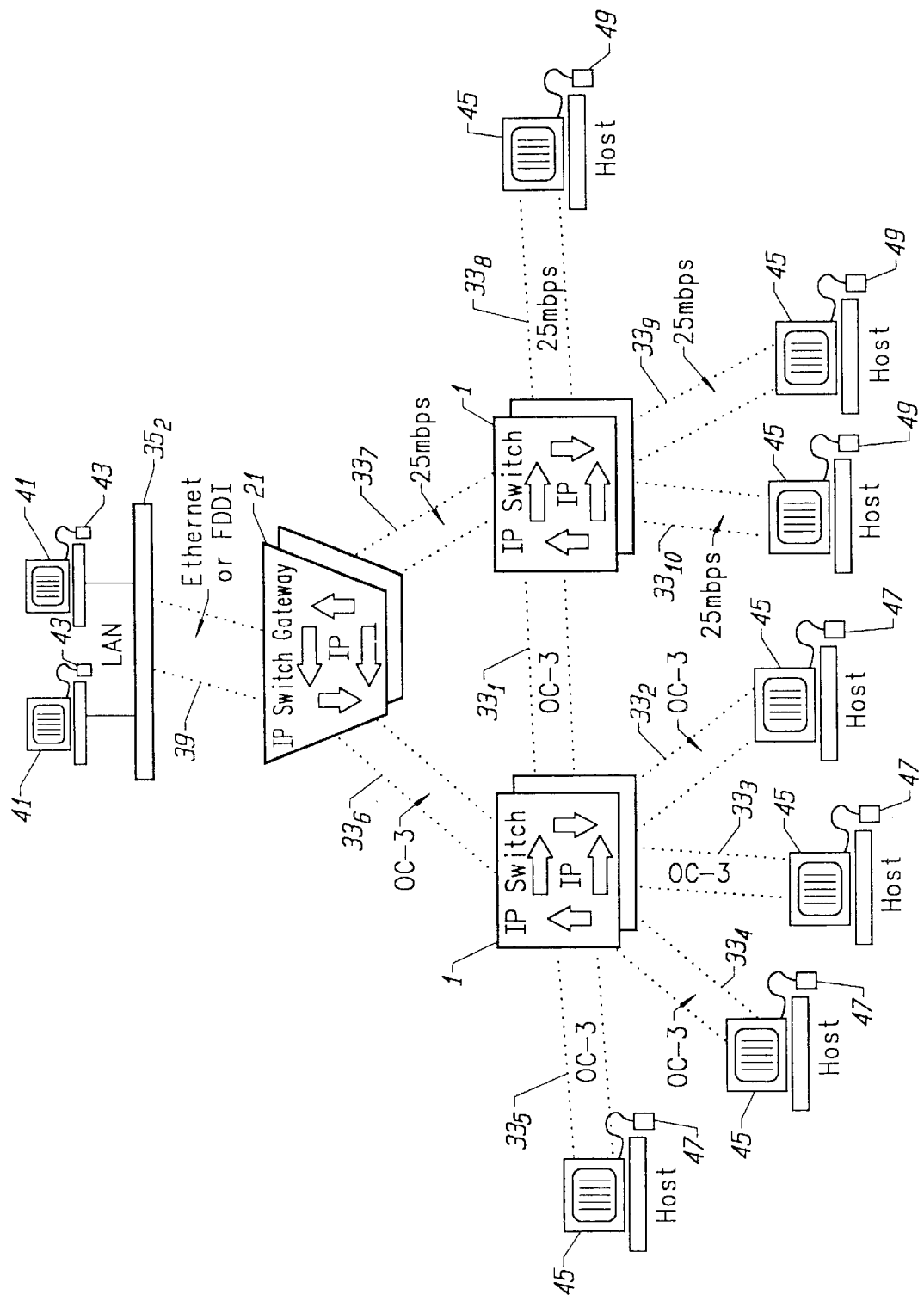

Basic switching units, switch gateway units, and system software allow users to build flexible IP network topologies targeted at the workgroup, campus, and WAN environments for high performance, scaleable solution to current campus backbone congestion problems. Using the present system, various network configurations may be implemented to provide end-to-end seamless IP traffic flow, with the network configurations featuring high bandwidth, high throughput, and component interoperability. FIGS. 2a–2b illustrate a few of the many network configurations possible according to the present invention. Of course, FIGS. 2a–2b are merely exemplary configurations and many alternate configurations are possible.

FIG. 2a shows a simplified diagram of a campus LAN configuration in which basic switching unit 1 serves as the centralized IP packet-forwarding device for the entire campus network with several switch gateway units 21 enabling connectivity to existing LANS. Basic switching unit 1 is connected to a server farm which includes three servers $31_n$ (where n=1 to 3). Each server $31_n$ is equipped with a subset of the system software and an ATM NIC to enable connection to basic switching unit 1 via corresponding ATM links $33_n$ (where n=1 to 3), which are OC-3 (155 Mbps) links. Having the servers attached directly to basic switching unit 1 over high speed ATM links operates to boost packet throughput for the frequently accessed servers. Basic switching unit 1 also connects to three switch gateway units 21 via corresponding ATM links $33_n$ (where n=4 to 6), also OC-3 links. A first switch gateway unit 21 connected to basic switching unit 1 via link $33_4$ also connects to a LAN backbone $35_1$, which may be some type of Ethernet or FDDI, via an appropriate link $39_1$. LAN backbone $35_1$ connects to PCs, terminals, or workstations 41 via the appropriate NICs 43. Similarly, second and third switch gateway units 21, connected to basic switching unit 1 via links $33_5$ and $33_6$ respectively, also connect to LAN backbones $35_2$ and $35_3$ respectively via Ethernet or FDDI links $39_2$ and $39_3$. The configuration of FIG. 2a therefore enables users connected to different LANs to communicate using seamless IP traffic flow without congestion in accordance with the present invention.

As another example, FIG. 2b shows a simplified diagram of a workgroup configuration. FIG. 2b illustrates a high performance workgroup environment in which several host computers 45 are connected via ATM links $33_m$ to multiple basic switching units 1, which connect to a switch gateway unit 21 that connects to a LAN 35 with user devices 41. In this configuration, a first basic switching unit 1 connects to a second basic switching unit 1 via ATM link $33_1$ (155 Mbps). Multiple host computers 45 connect to the first basic switching unit 1 via respective 155 Mbps ATM links $33_x$ (where x=2 to 5) through respective ATM NICs 47. In addition, multiple host computers 45 connect to the second basic switching unit 1 via respective 25 Mbps ATM links $33_y$ (where y=8 to 10) through respective ATM NICs 49. As discussed above, host computers 45 equipped with ATM NICs are installed with a subset of the system software, enabling the TCP/IP hosts to connect directly to a basic switching unit. The first and second basic switching units 1 connect to switch gateway unit 21 via ATM links $33_6$ (155 Mbps) and $33_7$ (25 Mbps) respectively. Connection of the first and second basic switching units 1 to switch gateway unit 21 via an Ethernet or FDDI link 39 enables users of host computers 45 to communicate with users devices 41 attached to LAN 35. User devices 41 may be PCs, terminals, or workstations having appropriate NICs 43 to connect to any Ethernet or FDDI LAN 35. The workgroup of host computers is thereby seamlessly integrated with the rest of the campus network.

According to the present invention, the system adds complete IP routing functionality on top of ATM switching hardware by using the system software, instead of any existing ATM switch control software, to control the ATM switch. Therefore, the present system is capable of moving between network layer IP routing when needed and datalink layer switching when possible in order to create high speed and capacity packet transmission in an efficient manner without the problem of router bottlenecks.

Using the Ipsilon Flow Management Protocol (IFMP), which is described in further detail later, the system software enables a system node (such as a basic switching unit, switch gateway unit, or host computer/server/workstation) to classify IP packets as belonging to a "flow" of similar packets based on certain common characteristics. A flow is a sequence of packets sent from a particular source to a particular (unicast or multicast) destination that are related in terms of their routing and any local handling policy they may require. The present invention efficiently permits different types of flows to be handled differently, depending on the type of flow. Some types of flows may be handled by mapping them into individual ATM connections using the ATM switching engine to perform high speed switching of the packets. Flows such as for example those carrying real-time traffic, those with quality of service requirements, or those likely to have a long holding time, may be configured to be switched whenever possible. Other types of flows, such as for example short duration flows or database queries, are handled by connectionless IP routing. A particular flow of packets may be associated with a particular ATM label (i.e., an ATM virtual path identifier (VPI) and virtual channel identifier (VCI)). It is assumed that virtual channels are unidirectional so an ATM label of an incoming direction of each link is owned by the input port to which it is connected. Each direction of transmission on a link is treated separately. Of course, flows travelling in each direction are handled by the system separately but in a similar manner.

Flow classification is a local policy decision. When an IP packet is received by a system node, the system node transmits the IP packet via the default channel. The node also classifies the IP packet as belonging to a particular flow, and accordingly decides whether future packets belonging to the same flow should preferably be switched directly in the ATM switching engine or continue to be forwarded hop-by-hop by the router software in the node. If a decision to switch a flow of packets is made, the flow must first be labelled. To label a flow, the node selects for that flow an available label (VPI/VCI) of the input port on which the packet was received. The node which has made the decision to label the flow then stores the label, flow identifier, and a lifetime, and then sends an IFMP REDIRECT message upstream to the previous node from which the packet came. The flow identifier contains the set of header fields that characterize the flow. The lifetime specifies the length of time for which the redirection is valid. Unless the flow state is refreshed, the association between the flow and label is deleted upon the expiration of the lifetime. Expiration of the lifetime before the flow state is refreshed results in further packets belonging to the flow to be transmitted on the default forwarding channel between the adjacent nodes. A flow state is refreshed by sending upstream a REDIRECT message having the same label and flow identifier as the original and having another lifetime. The REDIRECT message requests the upstream node to transmit all further packets that have matching characteristics to those identified in the flow identifier via the virtual channel specified by the label. The redirection decision is also a local decision handled by the upstream node, whereas the flow classification decision is a local decision handled by the downstream node. Accordingly, even if a downstream node requests redirection of a particular flow of packets, the upstream node may decide to accept or ignore the request for redirection. In addition, REDIRECT messages are not acknowledged. Rather, the first packet arriving on the new virtual channel serves to indicate that the redirection request has been accepted.

The system software also uses different encapsulations for the transmission of IP packets that belong to labelled flows on an ATM data link, depending on the different flow type of the flows. In the present embodiment, four types of encapsulations are used.

In addition to IFMP, the system software utilizes another protocol, General Switch Management Protocol (GSMP), to establish communication over the ATM link between the switch controller and ATM hardware switching engine of a basic switching unit of the system and thereby enable layer 2 switching when possible and layer 3 IP routing and packet forwarding when necessary. In particular, GSMP is a general purpose, asymmetric protocol to control an ATM switch. That is, the switch controller acts as the master with the ATM switch as the slave. GSMP runs on a virtual channel established at initialization across the ATM link between the switch controller and the ATM switch. A single switch controller may use multiple instantiations of GSMP over separate virtual channels to control multiple ATM switches. Also included in GSMP is a GSMP adjacency protocol, which is used to synchronize state across the ATM link between the switch controller and the ATM switch, to discover the identity of the entity at the other end of the link, and to detect changes in the identity of that entity.

GSMP allows the switch controller to establish and release connections across the ATM switch, add and delete leaves on a point-to-multipoint connection, manage switch ports, request configuration information, and request statistics. GSMP also allows the ATM switch to inform the switch controller of events such as a link going down.

A switch is assumed to contain multiple ports, where each port is a combination of an input port and an output port. ATM cells arrive at the ATM switch from an external communication link on incoming virtual channels at an input port, and depart from the ATM switch to an external communication link on outgoing virtual channels from an output port. As mentioned earlier, virtual channels on a port or link are referenced by their VPI/VCI. A virtual channel connection across an ATM switch is formed by connecting an incoming virtual channel (or root) to one or more outgoing virtual channels (or branches). Virtual channel connections are referenced by the input port on which they arrive and the VPI/VCI of their incoming virtual channel. In the switch, each port has a hardware look-up table indexed by the VPI/VCI of the incoming ATM cell, and entries in the tables are controlled by a local control processor in the switch.

For GSMP, each virtual channel connection may be established with a certain quality of service (QOS), by assigning it a priority when it is established. For virtual channel connections that share the same output port, an ATM cell on a connection with a higher priority would be more likely to depart the switch than an ATM cell on a connection with a lower priority, if they are both in the switch at the same time. The number of priorities each port of the switch supports is obtained from a port configuration message. It is recognized that different switches may support multicast in different ways. For example, the switch may have limits on numbers of branches for a multicast connection, limits on the number of multicast connections supported, limits on the number of different VPI/VCI values assignable to output branches of a multicast connection, and/or support only a single branch of a particular multicast connection on the same output port. Failure codes may be specified accordingly as required.

The switch assigns 32-bit port numbers to describe the switch ports. The port number may be structured into sub-fields relating to the physical structure of the switch (e.g., shelf, slot, port). Each switch port also maintains a port session number assigned by the switch. The port session number of a port remains the same while the port is continuously up. However, if a port returns to the up state after it has been down or unavailable or after a power cycle, the port session number of the port will change. Port session numbers are assigned using some form of random number, and allow the switch controller to detect link failures and keep state synchronized.

II. System Hardware

A. Controller Hardware

Figure 3:
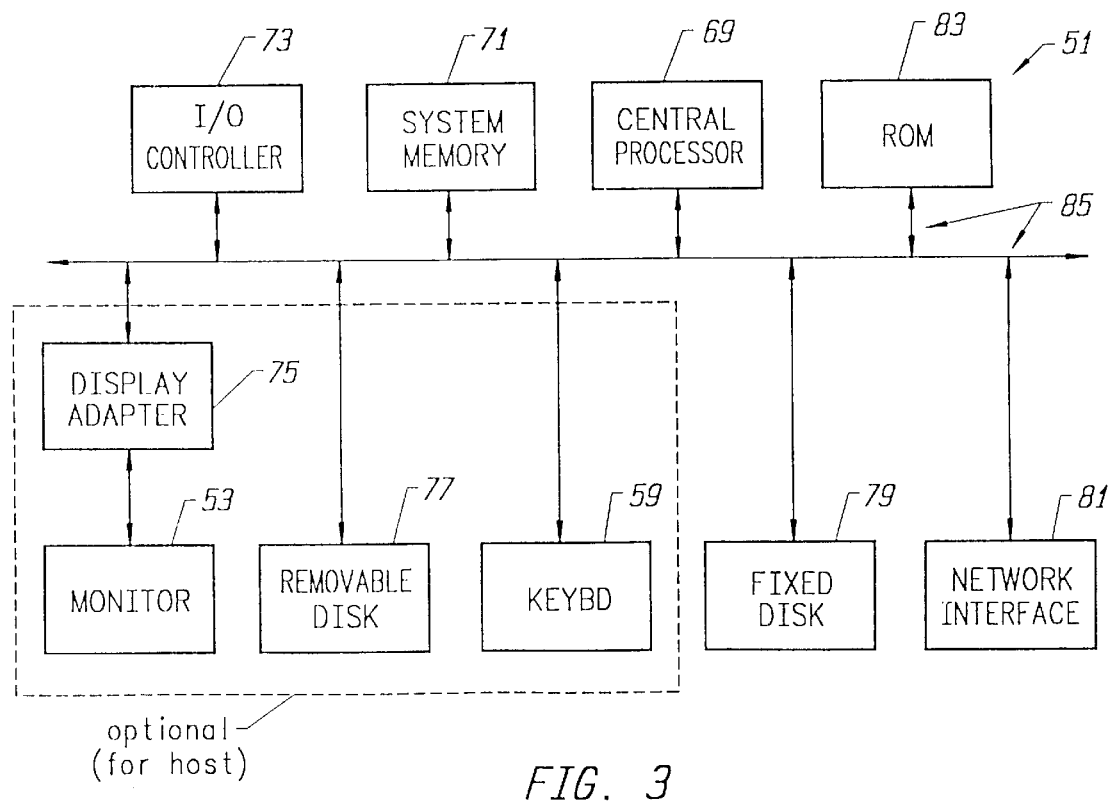
FIG. 3 is a general system block diagram of an exemplary computer system used according to embodiments of the invention.
Figure 4:
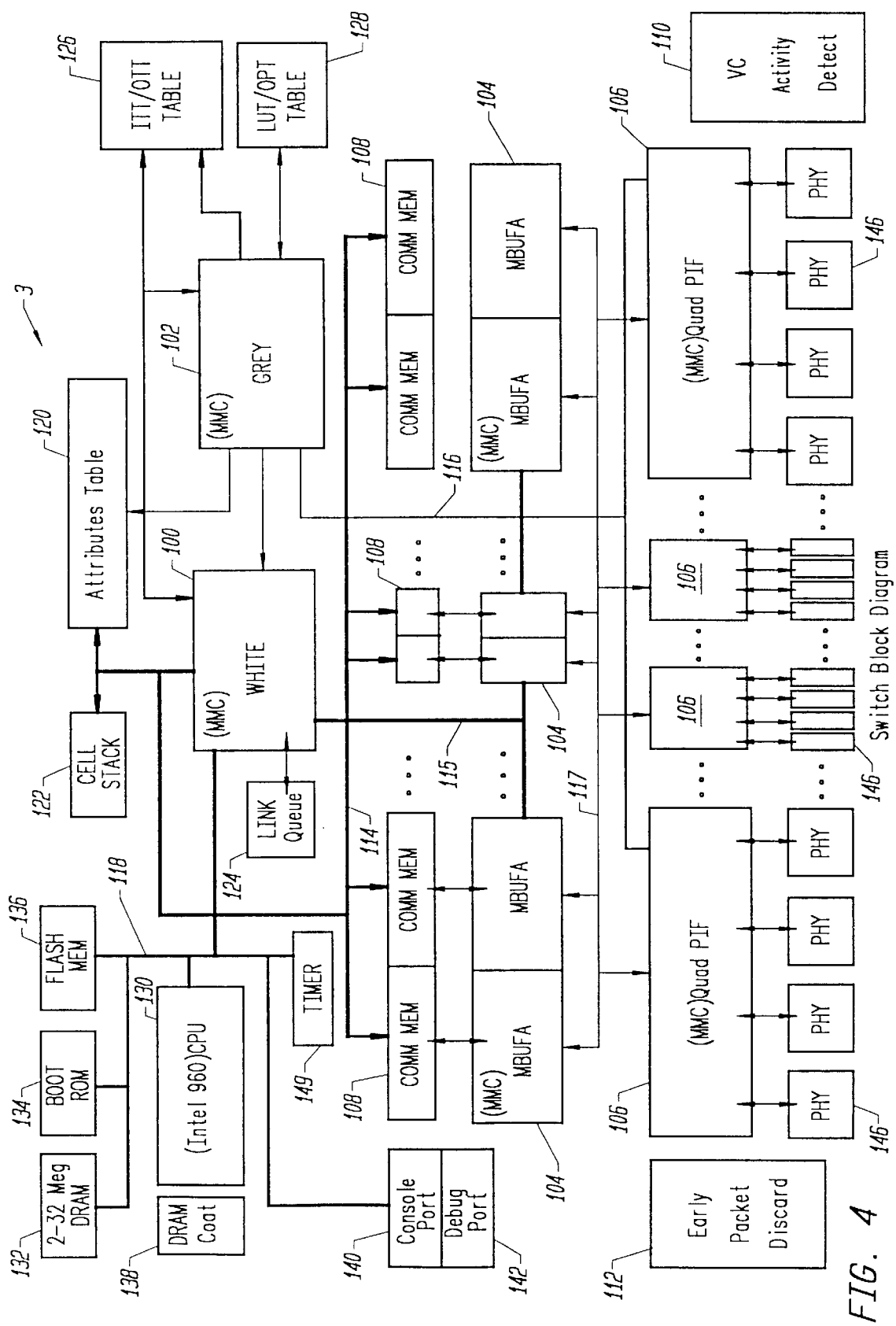
FIG. 4 is a general block diagram of an exemplary ATM switch according to an embodiment of the invention.

FIG. 3 is a system block diagram of a typical computer system 51 that may be used as switch controller 5 in a basic switching unit 1 (as shown in FIG. 1a) to execute the system software of the present invention. FIG. 3 also illustrates an example of the computer system that may be used as switch gateway controller 23 in a switch gateway unit 21 (as shown in FIG. 1b) to execute the system software of the present invention, as well as serving as an example of a typical computer which may be used as a host computer/server/workstation loaded with a subset of the system software. Of course, it is recognized that other elements such as a monitor, screen, and keyboard are added for the host.

As shown in FIG. 3, computer system 51 includes subsystems such as a central processor 69, system memory 71, I/O controller 73, fixed disk 79, network interface 81, and read-only memory (ROM) 83. Of course, the computer system 51 optionally includes monitor 53, keyboard 59, display adapter 75, and removable disk 77, for the host. Arrows such as 85 represent the system bus architecture of computer system 51. However, these arrows are illustrative of any interconnection scheme serving to link the subsystems. For example, a local bus could be utilized to connect central processor 69 to system memory 71 and ROM 83. Other computer systems suitable for use with the present invention may include additional or fewer subsystems. For example, another computer system could include more than one processor 69 (i.e., a multi-processor system) or a cache memory.

In an embodiment of the invention, the computer used as the switch controller is a standard Intel-based central processing unit (CPU) machine equipped with a standard peripheral component interconnect (PCI) bus, as well as with an ATM network adapter or network interface card (NIC). The computer is connected to the ATM switch via a 155 Megabits per second (Mbps) ATM link using the ATM NIC. In this embodiment, the system software is installed on fixed disk 79 which is the hard drive of the computer. As recognized by those of ordinary skill in the art, the system software may be stored on a CD-ROM, floppy disk, tape, or other tangible media that stores computer readable code.

Computer system 51 shown in FIG. 3 is but an example of a computer system suitable for use (as the switch controller of a basic switching unit, as the switch gateway controller of a switch gateway unit, or as a host computer/server/workstation) with the present invention. Other configurations of subsystems suitable for use with the present invention will be readily apparent to one of ordinary skill in the art. In addition, switch gateway unit may be equipped with multiple other NICs to enable connection to various types of LANs. Other NICs or alternative adaptors for different types of LAN backbones may be utilized in switch gateway unit. For example, SMC 10M/100M Ethernet NIC or FDDI NIC may be used.

Without in any way limiting the scope of the invention, Table 1 provides a list of commercially available components which are useful in operation of the controller, according to the above embodiments. It will be apparent to those of skill in the art that the components listed in Table 1 are merely representative of those which may be used in association with the inventions herein and are provided for the purpose of facilitating assembly of a device in accordance with one particular embodiment of the invention. A wide variety of components readily known to those of skill in the art could readily be substituted or functionality could be combined or separated.

TABLE 1

Controller Components

| | |
|---|---|
| Microprocessor | Intel Pentium 133 MHz processor |
| System memory | 16Mbyte RAM/256K cache memory |
| Motherboard | Intel Endeavor motherboard |
| ATM NIC | Zeitnet PCI ATM NIC (155 Mbps) |
| Fixed or Hard disk | 500Mbyte IDE disk |
| Drives | standard floppy, CD-ROM drive |
| Power supply | standard power supply |
| Chassis | standard chassis |

B. Switching Hardware

As discussed above, the ATM switch hardware provides the switching engine of a basic switching unit. The ATM switching engine utilizes vendor-independent ATM switching hardware. However, the ATM switching engine according to the present invention does not rely on any of its usual connection-oriented ATM routing and signaling software (SSCOP, Q.2931, UNI 3.0/3.1, and P-NNI). Rather, any ATM protocols and software are completely discarded, and a basic switching unit relies on the system software to control the ATM switching engine. The system software is described in detail later.

Separately available ATM components may be assembled into a typical ATM switch architecture. For example, FIG. 5 is a general block diagram of an architecture of an ATM switch 3 (the example shows a 16-port switch) that may be used as the switching hardware engine of a basic switching unit according to an embodiment of the present invention. However, commercially available ATM switches also may operate as the switching engine of the basic switching unit according to other embodiments of the present invention. The main functional components of switching hardware 3 include a switch core, a microcontroller complex, and a transceiver subassembly. Generally, the switch core performs the layer 2 switching, the microcontroller complex provides the system control for the ATM switch, and the transceiver subassembly provides for the interface and basic transmission and reception of signals from the physical layer. In the present example, the switch core is based on the MMC Networks ATMS 2000 ATM Switch Chip Set which includes White chip 100, Grey chip 102, MBUF chips 104, Port Interface Device (PIF) chips 106, and common data memory 108. The switch core also may optionally include VC Activity Detector 110, and Early Packet Discard function 112. Packet counters also are included but not shown. White chip 100 provides configuration control and status. In addition to communicating with White chip 100 for status and control, Grey chip 102 is responsible for direct addressing and data transfer with the switch tables. MBUF chips 104 are responsible for movement of cell traffic between PIF chips 106 and the common data memory 108. Common data memory 108 is used as cell buffering within the switch. PIF chips 106 manage transfer of data between the MBUF chips to and from the switch port hardware. VC Activity Detector 110 which includes a memory element provides information on every active virtual channel. Early Packet Discard 112 provides the ability to discard certain ATM cells as needed. Packet counters provide the switch with the ability to count all packets passing all input and output ports. Buses 114, 115, 116, 117, and 118 provide the interface between the various components of the switch. The microcontroller complex includes a central processing unit (CPU) 130, dynamic random access memory (DRAM) 132, read only memory (ROM) 134, flash memory 136, DRAM controller 138, Dual Universal Asynchronous Receiver-Transmitter (DUART) ports 140 and 142, and external timer 144. CPU 130 acts as the microcontroller. ROM 134 acts as the local boot ROM and includes the entire switch code image, basic low-level operation system functionality, and diagnostics. DRAM 132 provides conventional random access memory functions, and DRAM controller 138 (which may be implemented by a field programmable gate array (FPGA) device or the like) provides refresh control for DRAM 132. Flash memory 136 is accessible by the microcontroller for hardware revision control, serial number identification, and various control codes for manufacturability and tracking. DUART Ports 140 and 142 are provided as interfaces to communications resources for diagnostic, monitoring, and other purposes. External timer 144 interrupts CPU 130 as is required. Transceiver subassembly includes physical interface devices 146, located between PIF chips 106 and physical transceivers (not shown). Interface devices 146 perform processing of the data stream, and implement the ATM physical layer. Of course, the components of the switch may be on a printed circuit board that may reside on a rack for mounting or for setting on a desktop, depending on the chassis that may be used.

Without in any way limiting the scope of the invention, Table 2 provides a list of commercially available components which are useful in operation of the switching engine, according to the above embodiments. It will be apparent to those of skill in the art that the components listed in Table 2 are merely representative of those which may be used in association with the inventions herein and are provided for the purpose of facilitating assembly of a device in accordance with a particular embodiment of the invention. A wide variety of components or available switches readily known to those of skill in the art could readily be substituted or functionality could be combined or separated.

TABLE 2

Switch Components

| | |
|---|---|
| SWITCH CORE | |
| Core chip set | MMC Networks ATMS 2000 ATM Switch Chip Set (White chip, Grey chip, MBUF chips, PIF chips) |
| Common data memory | standard memory modules |
| Packet counters | standard counters |
| MICROCONTROLLER COMPLEX | |
| CPU | Intel 960CA/CF/HX |
| DRAM | standard DRAM modules |

TABLE 2-continued

Switch Components

| | |
|---|---|
| ROM | standard ROM |
| Flash memory | standard flash memory |
| DRAM controller | standard FPGA, ASIC, etc. |
| DUART | 16552 DUART |
| External timer | standard timer |
| TRANSCEIVER SUBASSEMBLY | |
| Physical interface | PMC-Sierra PM5346 |

III. System Software Functionality

As generally described above, IFMP is a protocol for instructing an adjacent node to attached a layer 2 "label" to a specified "flow" of packets. A flow is a sequence of packets sent from a particular source to a particular destination(s) that are related in terms of their routing and logical handling policy required. The label specifies a virtual channel and allows cached routing information for that flow to be efficiently accessed. The label also allows further packets belonging to the specified flow to be switched at layer 2 rather than routed at layer 3. That is, if both upstream and downstream links redirect a flow at a particular node in the network, that particular node may switch the flow at the datalink layer, rather than route and forward the flow at the network layer.

Figure 5A:
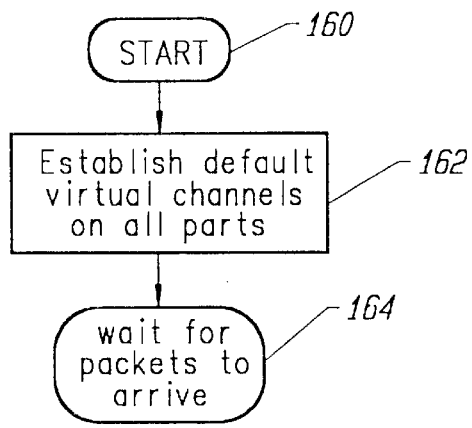
FIG. 5a is a simplified diagrams generally illustrating the initialization procedure in each system node according to an embodiment of the present invention.

FIG. 5a is a simplified diagrams generally illustrating the initialization procedure in each system node according to an embodiment of the present invention. Upon system startup at step 160, each system node establishes default virtual channels on all ports in step 162. Then at step 164 each system node waits for packets to arrive on any port.

Figure 5B:
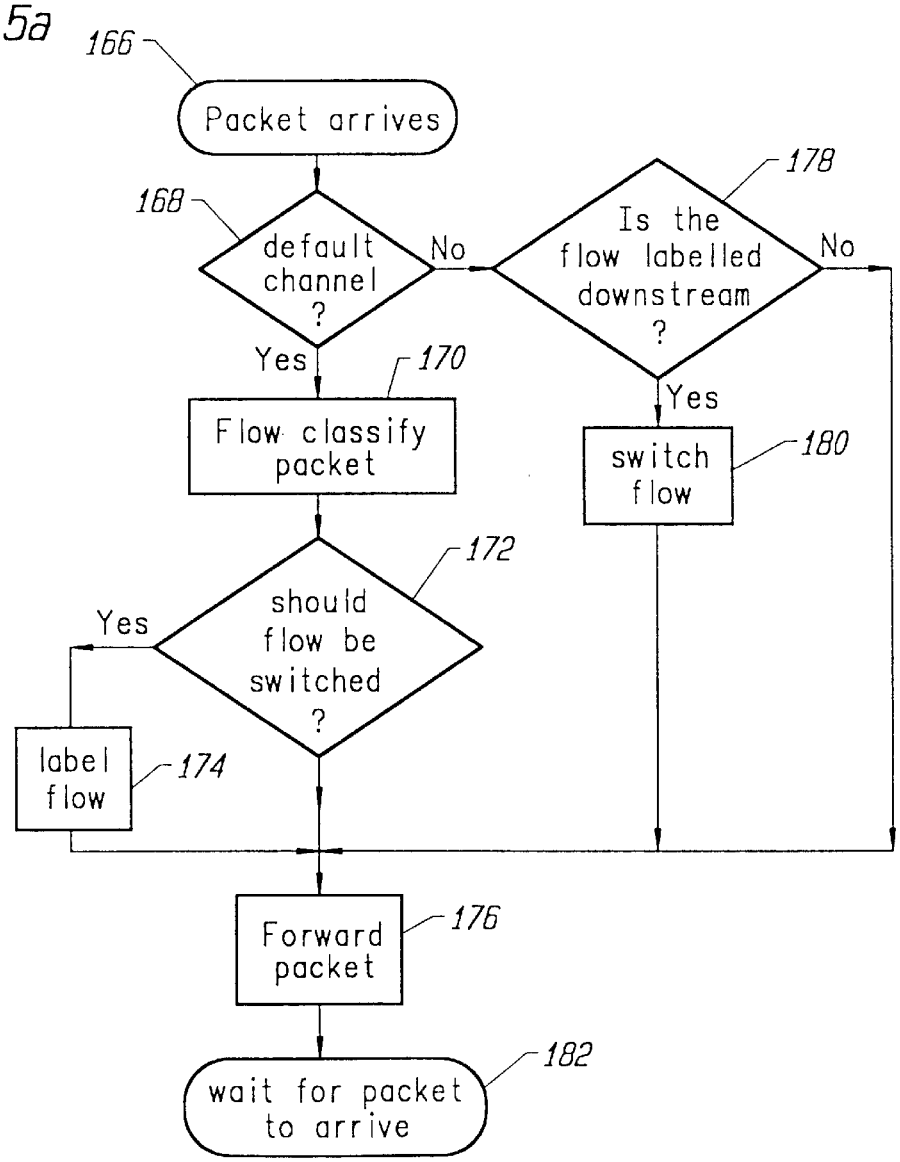
FIG. 5b is a simplified diagram that generally illustrates the operation of a system node.

FIG. 5b is a simplified diagram that generally illustrates the operation of a system node dynamically shifting between layer 3 routing and layer 2 switching according to the present invention. After initialization, a packet arrives on a port of the system node at step 166. If the packet is received on a default virtual channel (step 168), the system node performs a flow classification on the packet at step 170. Flow classification involves determining whether the packet belongs to a type of flow. At step 172, the system node determines whether that flow to which the packet belongs should preferably be switched. If the system node determines that the flow should be switched, the system node labels the flow in step 174 then proceeds to forward the packet in step 176. After forwarding the packet, the system node waits for a packet to arrive in step 182. Once a packet arrives, the system node returns to step 166. If the system node determines at step 168 that the packet did not arrive on the default virtual channel, the system node does not perform flow classification at step 170 on the packet. When a packet arrives on an alternate virtual channel, the packet belongs to a flow that has already been labelled. Accordingly, if the flow is also labelled downstream (step 178), the system node switches the flow in step 180. Switching the flow involves making a connection within the switch between the label of the upstream link and the label of the downstream link. After switching the flow in step 180, the system node at step 176 forwards the packet downstream. If the flow is not labelled downstream (step 178), the system node does not switch the flow but rather forwards the packet downstream in step 176. Of course, it is recognized that only a system node that is a basic switching unit performs step 180. Other system nodes (e.g., switch gateway unit or host) operate as shown in FIG. 5b but do not perform step 180 since the result of step 178 is no for a switch gateway unit or a host (as these types of system nodes have no downstream link).

Figure 6A:
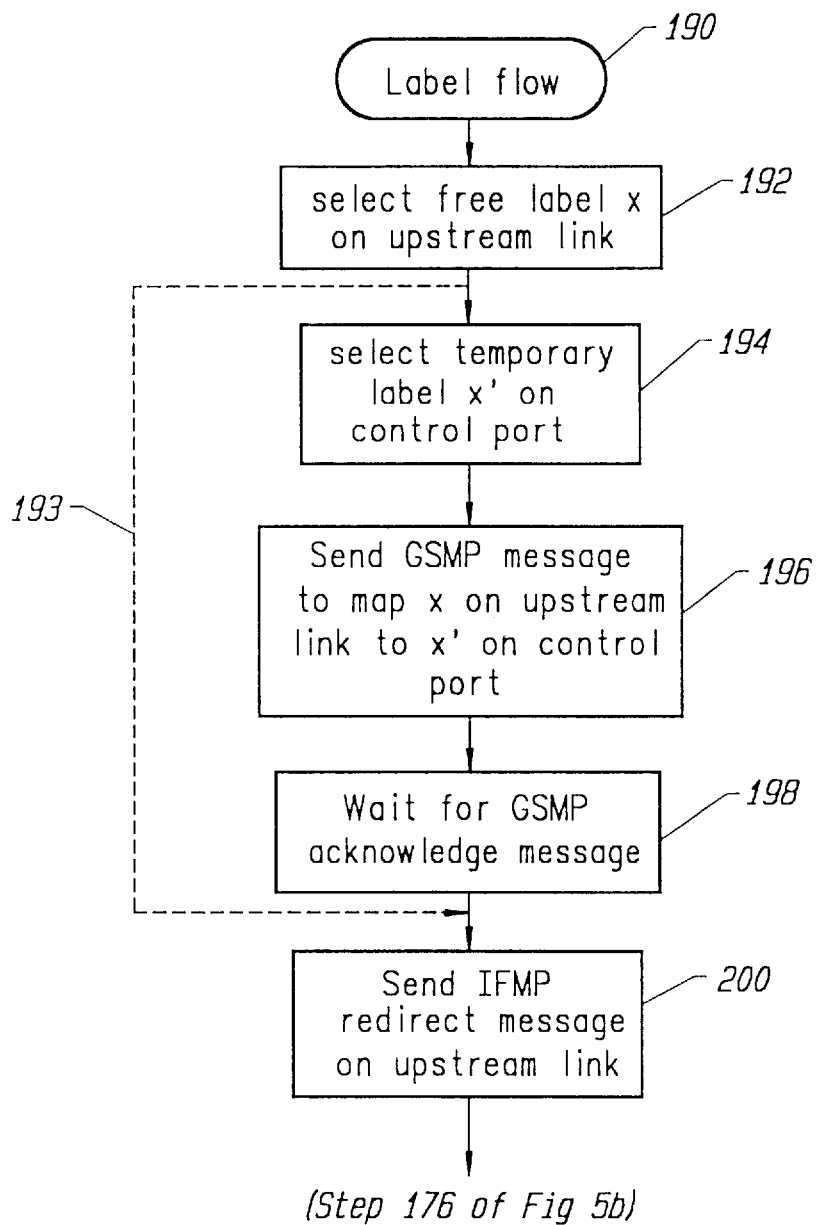
FIG. 6a is a diagram generally illustrating the steps involved in labelling a flow in a system node.

FIG. 6a is a diagram generally illustrating the steps involved in labelling a flow in the upstream link of a system node, such as shown by label flow step 174 of FIG. 5b. For a system node that is a switch gateway unit or a host, the system node labels a flow as shown in steps 190, 192, and 200 of FIG. 6a. When the label flow step begins (step 190), the system node selects a free label x on the upstream link in step 192. The system node then sends an IFMP REDIRECT message on the upstream link in step 200 (as indicated by dotted line 193). The system node then forwards the packet in step 176. For a system node that is a basic switching unit, labelling a flow is also illustrated by steps 194, 196, and 198. When the label flow step begins (step 190), the basic switching unit selects a free label x on the upstream link in step 192. The switch controller of basic switching unit then selects a temporary label x' on the control port of the switch controller in step 194. At step 196, the switch controller then sends to the hardware switching engine a GSMP message to map label x on the upstream link to label x' on the control port. The switch controller then waits in step 198 until a GSMP acknowledge message is received from the hardware switching engine that indicates that the mapping is successful. Upon receiving acknowledgement, the basic switching unit sends an IFMP REDIRECT message on the upstream link in step 200. After step 200, the system node returns to step 176 as shown in FIG. 5b.

Figure 6B:
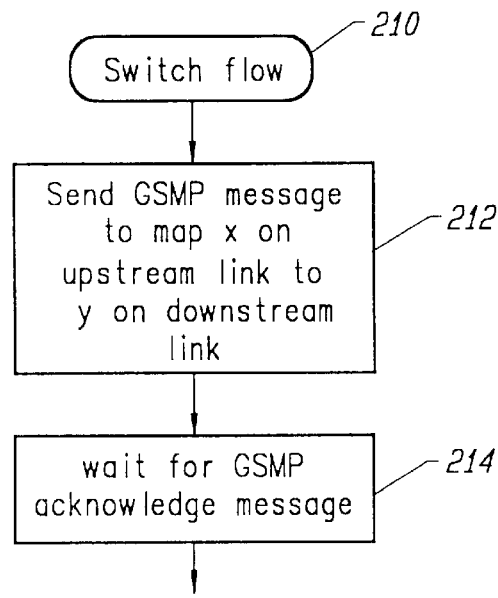
FIG. 6b is a diagram generally illustrating the steps involved in switching a flow in a basic switching unit.

FIG. 6b is a diagram generally illustrating the steps involved in switching a flow in a basic switching unit, such as shown by switch flow step 180 of FIG. 5b. As mentioned above, only system nodes that are basic switching units may perform the switch flow step. When the switch flow procedure starts in step 210, the switch controller in the basic switching unit sends at step 212 a GSMP message to map label x on the upstream link to the label y on the downstream link. Label y is the label which the node downstream to the basic switching unit has assigned to the flow. Of course, this downstream node has labelled the flow in the manner specified by FIGS. 5b and 6a, with the free label y being selected in step 192. After step 212, the switch controller in the basic switching unit waits in step 214 for a GSMP acknowledge message from a hardware switching engine in the basic switching unit to indicate that the mapping is successful. The flow is thereby switched in layer 2 entirely within the hardware switching engine in the basic switching unit. Then the basic switching unit proceeds to forward the packet in step 176.

Figure 6C:
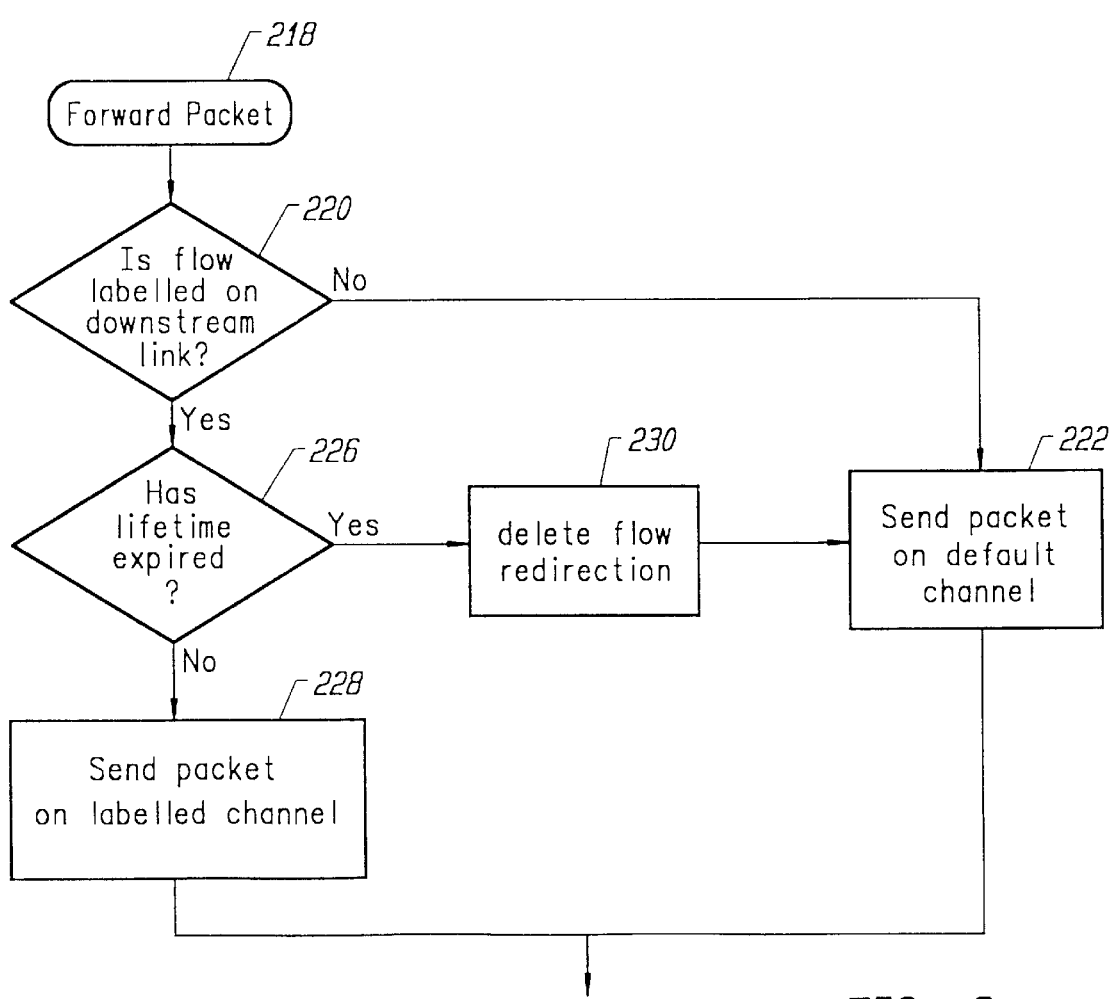
FIG. 6c is a diagram generally illustrating the steps involved in forwarding a packet in a system node.

FIG. 6c is a diagram generally illustrating the steps involved in forwarding a packet in a system node, such as shown by forward packet step 176 of FIG. 5b. A system node at step 218 starts the forward packet procedure. If the flow to which the packet belongs is not labelled on the downstream link (step 220), then the system node sends the packet on the default virtual channel on the downstream link in step 222 and then goes to a wait state 182 to wait for arrival of packets. However, if the flow to which the packet belongs is labelled on the downstream link indicating that the system node previously received an IFMP REDIRECT message to label that flow for a lifetime, then the system node checks at step 226 if the lifetime for the redirection of that flow has expired. If the lifetime has not expired, then the system node sends the packet on the labelled virtual channel in the IFMP REDIRECT message at step 228 then goes to wait state 224. If the lifetime has expired, then the system node automatically deletes the flow redirection at step 230. The system node then proceeds to send the packet on the default channel (step 222) and returns to the wait state of step 182 as shown in FIG. 5b. Additional details of the general description above are described as follows.

The source code of the system software (©Copyright, Unpublished Work, Ipsilon Networks, Inc., All Rights Reserved) for use with the basic switching unit, switch gateway unit, and host is included in the file wrapper. The system software for flow characterization, IFMP and GSMP protocols, router and host functionality, routing and forwarding, network management, device drivers, operating system interfaces, as well as drivers and modules.

A. IFMP & Flow Labelled Transmission on ATM Data Links

1. IFMP

The system software uses the Ipsilon Flow Management Protocol (IFMP) to enable a system node (such as a basic switching unit, switch gateway unit, or host computer/server/workstation) to classify IP packets as belonging to a flow of similar packets based on certain common characteristics. Flows are specified by a "flow identifier." The flow identifier for a particular flow gives the contents or values of the set of fields from the packet header that define the flow. The contents of the set of fields from the packet headers are the same in all packets belonging to that particular flow. Several "flow types" may be specified. Each flow type specifies the set of fields from the packet header that are used to identify the flow. For example, one flow type may specify the set of fields from the packet header that identify the flow as having packets carrying data between applications running on stations, while another flow type may specify the set of fields from the packet header that identify the flow as having packets carrying data between the stations.

Figure 7A:
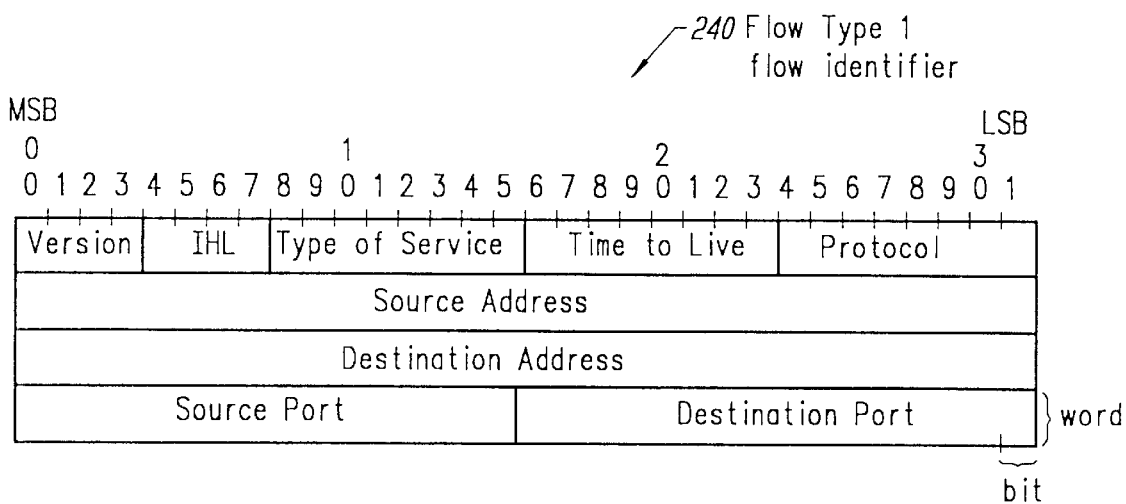
FIGS. 7a–7b illustrate the formats of flow identifiers for Flow Type 1 and Flow Type 2.
Figure 7B:
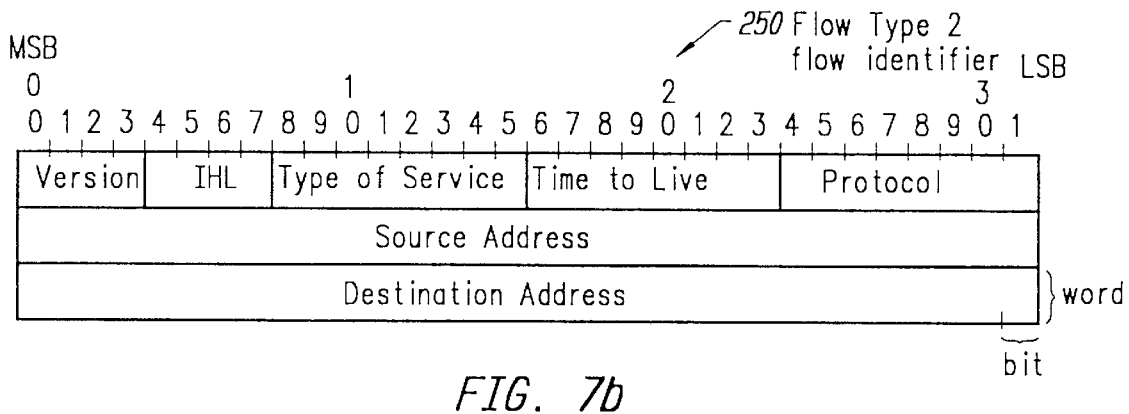

In an embodiment of the present invention, three flow types are specified: Flow Type 0, Flow Type 1, and Flow Type 2. Of course, different or additional flow types also may be specified. Flow Type 0 is used to change the encapsulation of IP packets from the default encapsulation. The format of a flow identifier for Flow Type 0 is null and accordingly has a zero length. Flow Type 1 is a flow type that specifies the set of fields from the packet header that identify the flow as having packets carrying data between applications running on stations. Flow Type 1 is useful for flows having packets for protocols such as UDP and TCP in which the first four octets after the IP header specify a source port number and a destination port number that are used to indicate applications. A flow identifier for Flow Type 1 has a length of four 32-bit words. The format of a flow identifer for Flow Type 1, indicated as reference number 240 shown in FIG. 7a, includes (described in order of most significant bit (MSB) to least significant bit (LSB)) the Version, Internet Header Length (IHL), Type of Service, and Time to Live, and Protocol fields as the first word; the Source Address field as the second word; and the Destination Address field as the third word. These fields in the flow identifier are from the header of the IP packet of Flow Type 1. The flow identifer for Flow Type 1 also includes the Source Port Number and the Destination Port Number fields (the first four octets in the IP packet after the IP header) as the fourth word. Flow Type 2 is a flow type that specifies the set of fields from the packet header that identify the flow as having packets carrying data between stations without specifying the applications running on the stations. A flow identifier for Flow Type 2 has a length of three 32-bit words. The format of a flow identifer for Flow Type 2, indicated by reference number 250 shown in FIG. 7b, includes the Version, Internet Header Length (IHL), Type of Service, Time to Live, Protocol, Source Address, and Destination Address fields from the header of the IP packet. The format of a flow identifier for Flow Type 2 is the same as that for Flow Type 1 without the fourth word. The hierarchical nature of the flow identifiers for the various flow types allows a most specific match operation to be performed on an IP packet to facilitate flow classification.

The present invention efficiently permits different types of flows to be handled differently, depending on the type of flow. Flows such as for example those carrying real-time traffic, those with quality of service requirements, or those likely to have a long holding time, may be configured to be switched whenever possible. Other types of flows, such as for example short duration flows or database queries, are handled by connectionless IP packet forwarding. In addition, each flow type also specifies an encapsulation that is to be used after this type of flow is redirected. Encapsulations for each flow type may be specified for different data link technologies. In the present embodiment, the system uses encapsulations for ATM data links, described in further detail later.

A particular flow of packets may be associated with a particular ATM label. According to the present embodiment, a label is a virtual path identifier and virtual channel identifier (VPI/VCI). A "range" of labels for a specific port is the set of labels (VPIs/VCIs) available for use at that port. It is assumed that virtual channels are unidirectional so a label of an incoming direction of each link is owned by the input port to which it is connected. Of course, for embodiments using other switching technologies such as frame relay, the data link connection identifier may be used as the label. For embodiments using fast packet switching technology, the data link channel multiplex identifier may be used as the label.

As discussed above, flow classification is a local policy decision. When an IP packet is received by a system node, the system node transmits the IP packet via the default channel. The node also classifies the IP packet as belonging to a particular flow, and accordingly decides whether future packets belonging to the same flow should be switched directly in the ATM switching engine or continue to be forwarded hop-by-hop by the router software in the node. If a decision to switch a flow of packets is made, the node selects for that flow an available label (VPI/VCI) of the input port on which the packet was received. The node which has made the decision to switch the flow then stores the label, flow identifier, and a lifetime, and then sends an IFMP REDIRECT message upstream to the previous node from which the packet came. As discussed above, the flow identifier contains the set of header fields that characterize the flow. The lifetime specifies the length of time for which the redirection is valid. Unless the flow state is refreshed, the association between the flow and label should be deleted upon the expiration of the lifetime. Expiration of the lifetime before the flow state is refreshed results in further packets belonging to the flow to be transmitted on the default forwarding channel between the adjacent nodes.

A flow state is refreshed by sending upstream a REDIRECT message having the same label and flow identifier as the original and having another lifetime. The REDIRECT message requests the upstream node to transmit all further packets that have matching characteristics to those identified in the flow identifier via the virtual channel specified by the label. The redirection decision is also a local decision handled by the upstream node, whereas the flow classification decision is a local decision handled by the downstream node. Accordingly, even if a downstream node requests redirection of a particular flow of packets, the upstream node may decide to accept or ignore the request for redirection. In addition, REDIRECT messages are not acknowledged. Rather, the first packet arriving on the new virtual channel serves to indicate that the redirection request has been accepted.

In the present invention, IFMP of the system software includes an IFMP adjacency protocol and an IFMP redirection protocol. The IFMP adjacency protocol allows a system node (host, basic switching unit, or switch gateway unit) to discover the identity of a system node at the other end of a link. Further, the IFMP adjacency protocol is used to synchronize state across the link, to detect when a system node at the other end of a link changes, and to exchange a list of IP addresses assigned to a link. Using the IFMP redirection protocol, the system may send REDIRECT messages across a link, only after the system has used the IFMP adjacency protocol to identify other system nodes at the other end of a link and to achieve state synchronization across a link. Any REDIRECT message received over a link that has not currently achieved state synchronization must be discarded. The IFMP adjacency protocol and IFMP redirection protocol are described in detail after the following detailed description of the operation of the system.

A specific example describing the flow classification and redirection of the present system, utilizing a LAN configuration such as that of FIG. 2a, is useful in illustrating advantages presented by the system. In particular, the example focuses on the interaction between the first and second gateway switch units 21 and basic switching unit 1 of FIG. 2a. At system startup, a default forwarding ATM virtual channel is established between the system software running on the controllers of basic switching unit 1 and of each of the neighboring nodes (in this example, first and second switch gateway units 21). When an IP packet is transmitted from LAN backbone $35_1$ over the network layer link $39_1$, the IP packet is received by the first switch gateway unit 21 via one of its appropriate LAN NICs. Then, the system software at first switch gateway unit 21 inspects the IP packet and then performs a default encapsulation of the IP packet contents for transmission via link $33_4$ (established between the ATM NIC of switch gateway unit 21 and a selected port of the ATM switching hardware in basic switching unit 1) to basic switching unit 1. The ATM switching hardware then forwards the ATM cells to ATM NIC 9 in switch controller 5 which then reassembles the packet and forwards the IP datagram to the system software in switch controller for IP routing. The switch controller forwards the packet in the normal manner across the default forwarding channel initially established between basic switching unit 1 and second switch gateway unit 21 at startup. In addition, the switch controller in basic switching unit 1 performs a flow classification on the packet to determine whether future packets belonging to the same flow should be switched directly in the ATM hardware or continue to be routed hop-by-hop by the system software. If the switch controller software decides locally that the flow should be switched, it selects a free label (label x) from the label space (label space is merely the range of VPI/VCI labels) of the input port (port i) on which the packet was received. The switch controller also selects a free label (label x') on its control port (the real or virtual port by which the switch controller is connected to the ATM switch). Using GSMP, the system software instructs the ATM switch to map label x on input port i to label x' on the control port c. When the switch returns a GSMP acknowledgement message to the switch controller, the switch controller sends an IFMP REDIRECT message upstream to the previous hop (in this example, the first switch gateway unit 21) from which the packet came. The REDIRECT message is simply a request from basic switching unit 1 to first switch gateway unit 21 to transmit all further packets with header fields matching those specified in the redirection message's flow identifier on the ATM virtual channel specified by the REDIRECT message's label. Unless the flow state is refreshed before the expiration of the REDIRECT message's lifetime, the association between the flow and the redirection message's label should be deleted, resulting in further packets in the flow being transmitted on the default forwarding channel (initially established at startup) between the first switch gateway unit 21 and basic switching unit 1.

If the first switch gateway unit 21 accepts the request made in the REDIRECT message sent by basic switching unit 1, the packets belonging to the flow will arrive at port c of switch controller with the ATM VPI/VCI label x'. The packets will continue to be reassembled and routed by the system software, but the process is speeded up as a result of the previous routing decision for the flow being cached and indexed by the label x' in the system software. Accordingly, it is seen that a flow may be labelled but not necessarily switched.

One of the important benefits of switching becomes evident in situations where the downstream node (in this example, the second switch gateway unit) also is involved in redirection for the same flow. When basic switching unit 1 routes the initial packet belonging to the flow to the second switch gateway unit 21 via the default forwarding channel between them, the downstream node (in this part of the example, second switch gateway unit 21) reassembles the packet and forwards it in the normal manner. For the packet received at its port j, second switch gateway unit 21 also performs a flow classification and decides based upon its local policy expressed in a table whether to switch future packets belonging to the flow or to continue packet forwarding in the controller. If second switch gateway unit 21 decides that the future packets of the flow should be switched, it sends its own REDIRECT message (with a free label y on its port j, flow identifier, and lifetime) upstream to basic switching unit 1. Basic switching unit 1 may of course accept or ignore the request for redirection. When basic switching unit 1 decides to switch the flow, the system software in switch controller of basic switching unit 1 maps label x on port i to label y on port j. Thus, the traffic is no longer sent to the switch control processor but is switched directly to the required output port of the ATM switch hardware. Accordingly, all further traffic belonging to the flow may be switched entirely within the ATM switching hardware of basic switching unit 1. When a packet arrives from a port of the ATM switch of basic switching unit 1, second switch gateway unit 21 using its ATM NIC receives the packet over ATM link $33_5$. Second switch gateway unit 21 then reassembles and sends the packet via one of its NICs over the link $39_2$ to LAN $35_2$. The user device 41 for which packet is intended receives it from LAN $35_2$ via the user device's NIC 43.

When a system node (in this example, basic switching unit 1) accepts a REDIRECT message, it also changes the encapsulation used for the redirected flow. Rather than using the default encapsulation used for IP packets on the default forwarding channel, the system node may use a different type of encapsulation depending on the flow type. Basic switching unit 1 thus encapsulates the future packets belonging to the flow and transmits them on the specified virtual channel noted in label y. Some types of encapsulation may remove certain fields from the IP packet. When these fields are removed, the system node that issued the REDIRECT message stores the fields and associates the fields with the specified ATM virtual channel. In the case of the present example, if basic switching unit 1 accepts the REDIRECT message sent by second switch gateway unit 21, then basic switching unit 1 stores fields and associates the fields with the ATM virtual channel specified by label y. Similarly, if first switch gateway unit 21 accepts the REDIRECT message sent by first switching unit 1, then first switch gateway unit 21 stores fields and associates the fields with the ATM virtual channel specified by label x. A complete packet may be reconstructed using the incoming label to access the stored fields. This approach provides a measure of security by for example preventing a user from establishing a switched flow to a permitted destination or service behind a firewall and then changing the IP packet header to gain access to a prohibited destination.

Each system node maintains a background refresh timer. When the background refresh timer expires, the state of every flow is examined. If a flow has received traffic since the last refresh period, the system node refreshes the state of that flow by sending a REDIRECT message upstream with the same label and flow identifier as the original REDIRECT message and a new lifetime. If the flow has received no traffic since the last refresh period, the system node removes the flow's cached state. A system node removes the flow's state by issuing an IFMP RECLAIM message upstream to reclaim the label for reuse. However, until the upstream node sends an IFMP RECLAIM ACK message which is received by the node issuing the IFMP RECLAIM message, the flow state is not deleted and the label may not be reused. An IFMP RECLAIM ACK message acknowledges release of the requested label. A system node determines if a flow has received traffic in two different ways, depending on whether the flow is switched or not. For flows that are labelled but not switched, the controller for the system node examines its own state to see whether the flow has received any traffic in the previous refresh period. For flows that are switched, the controller for the system node queries the ATM switch hardware using a GSMP message to see whether a specific channel has been active recently. Accordingly, in the present example, basic switching unit 1 monitors traffic for a flow if that particular flow is mapped from first switch gateway unit 21 to the control port of basic switching unit 1 or is mapped from first switch gateway unit 21 to second switch gateway unit 21 via the ATM switch in basic switching unit 1. If that flow has no recent traffic in the previous refresh period, basic switching unit will send the IFMP RECLAIM message and remove the flow state when an IFMP RECLAIM ACK message is received. Also, second switch gateway unit 21 monitors traffic for a flow if that particular flow is mapped from the control port of basic switching unit 1 to second switch gateway unit 21. Additionally, a host computer/server/workstation equipped with the appropriate system software is also equipped with a background refresh timer. Monitoring traffic for any flow mapped to it, the host can send an IFMP RECLAIM message and remove a flow state upon receiving an IFMP RECLAIM ACK message.

As discussed above, the IFMP adjacency protocol is used to establish state synchronization, as well as identifying adjacent system nodes and exchanging IP addresses. For IFMP adjacency protocol purposes, a system node has three possible states for a particular link: SYNSENT (synchronization message sent), SYNRCVD (synchronization message received), ESTAB (synchronization established). State synchronization across a link (when a system node reaches the ESTAB state for a link) is required before the system may send any redirection messages using the IFMP redirection protocol.

Figure 8A:
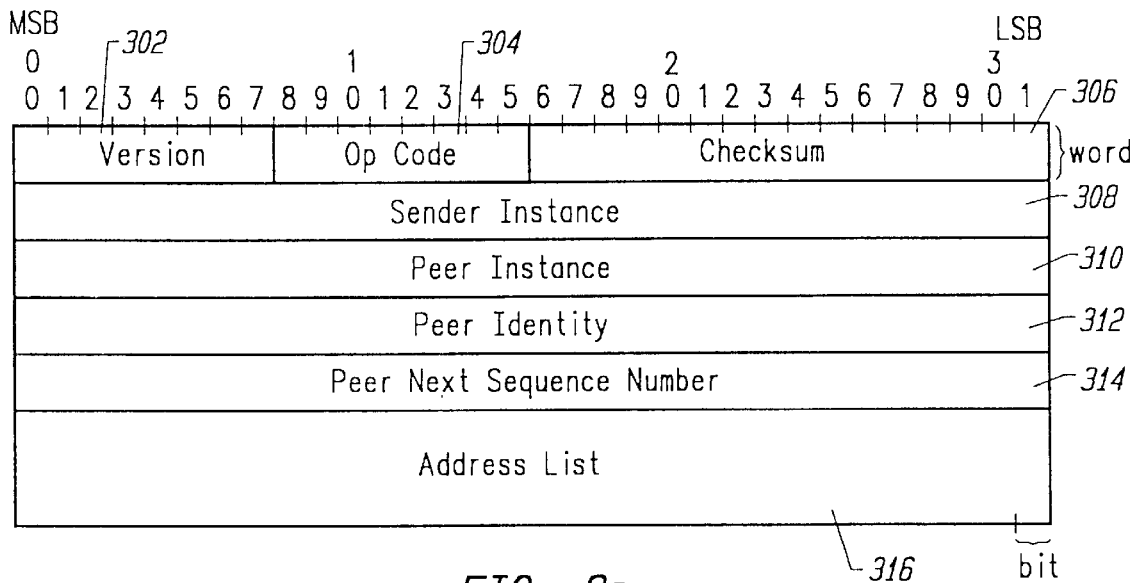
FIG. 8a illustrates the structure of a generic IFMP adjacency protocol message, according to an embodiment of the present invention.
Figure 8B:
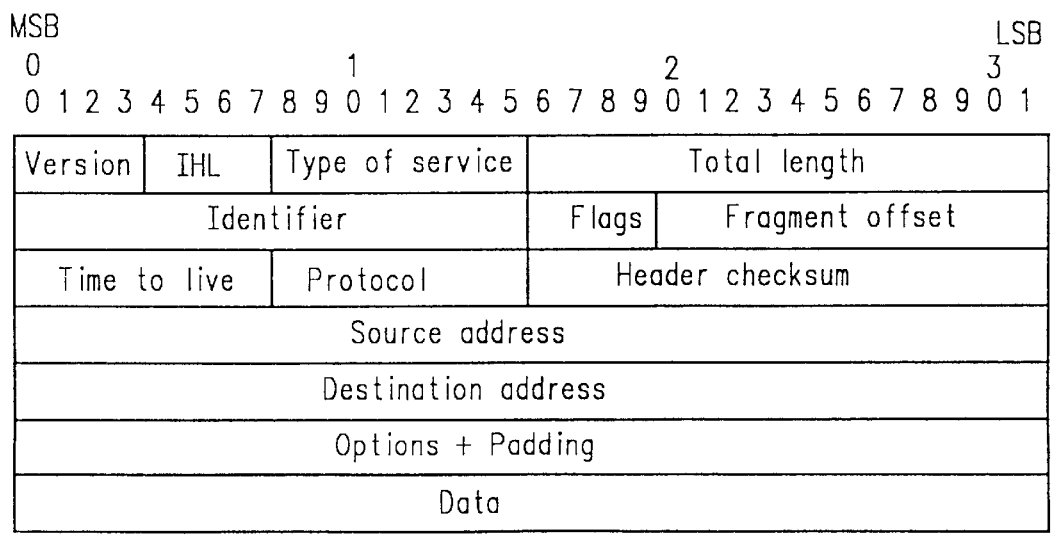
FIG. 8b illustrates a generic IP packet (in its current version IPv4) with a variable length Data field into which an IFMP message may be encapsulated.

FIG. 8a illustrates the structure of a generic IFMP adjacency protocol message 300. All IFMP adjacency protocol messages are encapsulated within an IP packet. FIG. 8b illustrates a generic IP packet (in its current version IPv4) with a variable length Data field into which an IFMP adjacency protocol message may be encapsulated. As an indication that the IP packet contains an IFMP message, the Protocol field in the IP header of the encapsulating IP packet must contain the decimal value 101. The Time to Live field in the header of the IP packet encapsulating the IFMP message is set to 1. Also, all IFMP adjacency protocol messages are sent to the limited broadcast IP Destination Address (255.255.255.255), using the address in the Destination Address field of the IP header. As seen in FIG. 8a, an IFMP adjacency protocol message 300 includes (described in order of MSB to LSB) the following fields: an 8-bit Version (302), an 8-bit Op Code (304), and a 16-bit Checksum (306) as the first 32-bit word; Sender Instance (308) as the second 32-bit word; Peer Instance (310) as the third 32-bit word; Peer Identity (312) as the fourth 32-bit word; Peer Next Sequence Number (314) as the fifth 32-bit word; and Address List (316) which is a field of a variable number of 32-bit words.

In an IFMP adjacency protocol message, Version field 302 specifies the version of the IFMP protocol which is currently in use (as other versions may evolve). Op Code 304 specifies the function of the IFMP adjacency protocol message. In the present embodiment, there are four possible Op Codes, i.e., functions of IFMP adjacency protocol messages: SYN (synchronization message, Op Code=0), SYNACK (synchronization acknowledge message, Op Code=1), RSTACK (reset acknowledge message, Op Code=2), and ACK (acknowledge message, Op Code=3). In each system node, a timer is required for the periodic generation of SYN, SYNACK, and ACK messages. In the present embodiment, the period of the timer is one second, but other periods may be specified. If the timer expires and the system node is in the SYNSENT state, the system node resets the timer and sends a SYN IFMP adjacency protocol message. If the timer expires and the system node is in the SYNRCVD state, the system node resets the timer and sends a SYNACK IFMP adjacency protocol message. If the timer expires and the system node is in the ESTAB state, the system node resets the timer and sends an ACK IFMP adjacency protocol message.

Checksum 306 is the 16-bit one's complement of the one's complement sum of: the source address, destination address and protocol fields from the IP packet encapsulating the IFMP adjacency protocol message, and the total length of the IFMP adjacency protocol message. Checksum 306 is used by the system for error control purposes.

In discussing IFMP, a "sender" is the system node which sends the IFMP message, and a "peer" is the system node to which the sender sends the IFMP message for a link.

In SYN, SYNACK, and ACK IFMP adjacency protocol messages, Sender Instance 308 is the sender's "instance number" for the link. Indicating a specific instance of a link, an instance number is a 32-bit non-zero number that is guaranteed to be unique within the recent past, and to change when the link or system node comes back after going down. Accordingly, each link has its own unique instance number. Sender Instance is used to detect when a link comes back after going down, or when the identity of a peer at the other end of the link changes. (Sender Instance 308 is used in a similar manner to the initial sequence number (ISN) in TCP.)

For a RSTACK IFMP adjacency protocol message, Sender Instance 308 is set to the value of the Peer Instance field 310 from the incoming message that caused the RSTACK message to be generated.

In SYN, SYNACK, and ACK IFMP adjacency protocol messages, Peer Instance field 310 is what the sender believes is the peer's current instance number for the link. If the sender does not know the peer's current instance number for the link, the Peer Instance field 310 will be set to zero. In an RSTACK IFMP adjacency protocol message, Peer Instance field 310 is set to the value of the Sender Instance field 308 from the incoming message that caused the RSTACK message to be generated.

For SYN, SYNACK, and ACK IFMP adjacency protocol messages, Peer Identity field 312 is the IP address of the peer that the sender of the message believes is at the other end of the link. The sender takes the IP address that is in the Source Address field of the IP header encapsulating the SYN or SYNACK message received by the sender, and uses that IP address in the Peer Identity field 312 of an IFMP adjacency protocol message it is sending. When the sender does not know the IP address of the peer at the other end of the link, Peer Identity field 312 is set to zero. For an RSTACK message, Peer Identity field 312 is set to the value of the IP address of the Source Address field from the IP header of the incoming IFMP adjacency protocol message that caused the RSTACK message to be generated.

Peer Next Sequence Number field 314 gives the value of the peer's Sequence Number field that the sender expects to arrive in the next IFMP redirection protocol message. If the value of the Peer Next Sequence Number 314 in an incoming IFMP adjacency protocol ACK message is greater than the value of one plus the value of the Sequence Number (from the last IFMP redirection protocol message transmitted out of the port on which the incoming IFMP adjacency protocol ACK message was received), then the link should be reset.

Address List field 316 is a list of one or more IP addresses that are assigned to the link by the sender of the IFMP adjacency protocol message. The list must have at least one entry which is identical to the Source Address of the IP header of the IFMP adjacency protocol message. The contents of the list are not used by the IFMP but rather may be made available to the routing protocol.

Figure 8C:
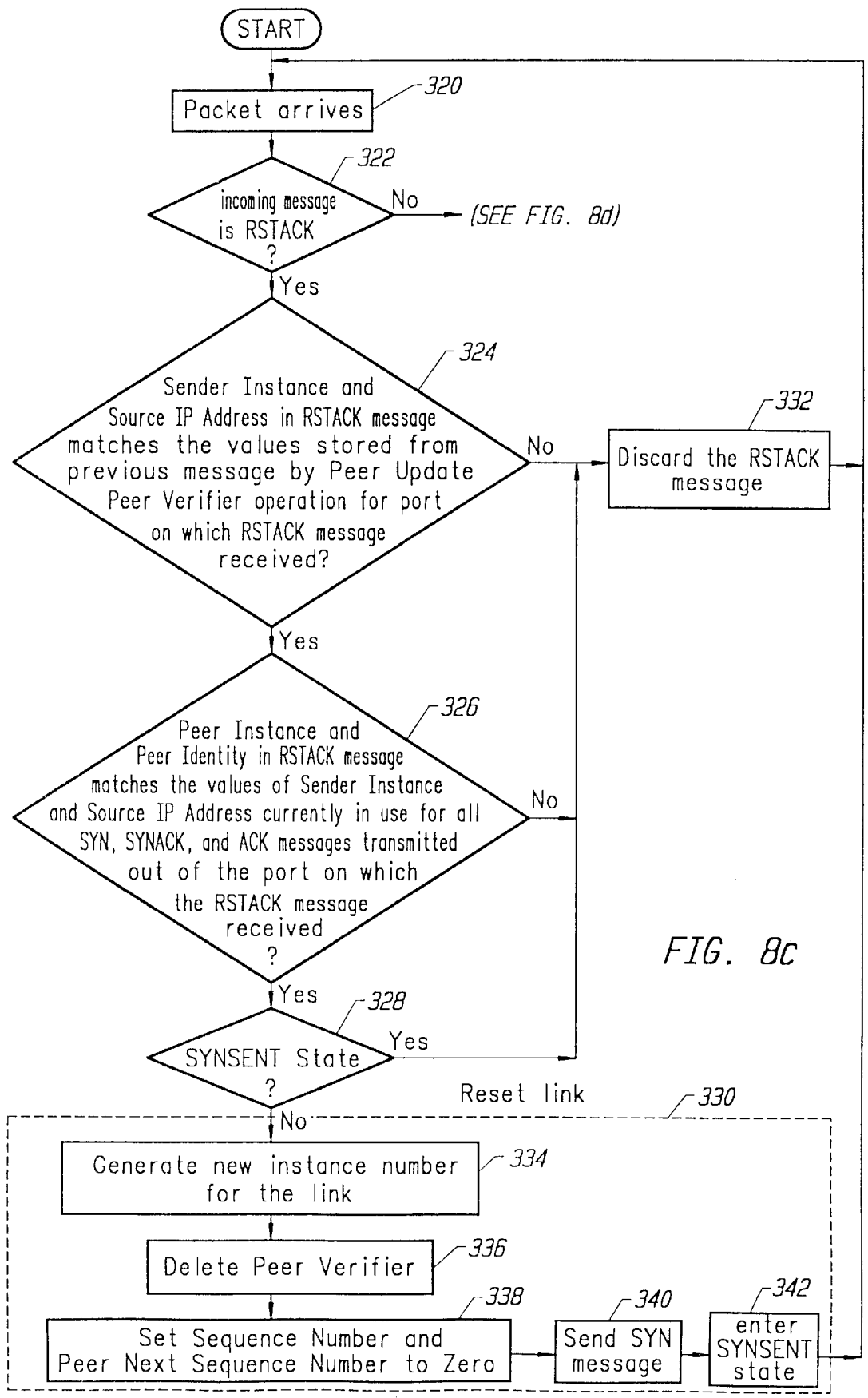
FIG. 8c is a simplified diagram illustrating the operation of a system node upon receiving a packet with an incoming IFMP adjacency protocol message.

FIG. 8c is a simplified diagram illustrating the operation of a system node upon receiving a packet with an incoming IFMP adjacency protocol message. After startup of the system, the system node receives a packet with an incoming IFMP adjacency protocol message (step 320). At step 322, the system node determines if the incoming IFMP adjacency protocol message is an RSTACK message. If the incoming IFMP adjacency protocol message is not an RSTACK message (e.g., a SYN, SYNACK, or ACK message), then the system node operates in the manner illustrated in the state diagram of FIG. 8d. If the incoming IFMP adjacency protocol message is an RSTACK message, then the system node checks at step 324 whether the Sender Instance and Source IP Address in the incoming RSTACK message matches the values stored from a previous message by the Update Peer Verifier operation for the port on which the incoming RSTACK message was received. For IFMP adjacency protocol, the Update Peer Verifier operation is defined as storing the Sender Instance and Source IP Address from a SYN or SYNACK message received from the peer on a particular port. If the values match from step 324, then the system node determines at step 326 whether the Peer Instance and Peer Identity in the incoming RSTACK message matches the values of Sender Instance and Source IP Address currently in use for all SYN, SYNACK, and ACK messages transmitted out of the port on which the incoming RSTACK message was received. If the values match from step 326, the system node determines at step 328 if the system node is in the SYNSENT state. If the system node is not in the SYNSENT state, the system node proceeds to reset the link at step 330. If the values do not match from step 324, or the values do not match from step 326, or the system node is in the SYNSENT state, then the system node discards the incoming RSTACK message at step 332 and waits for another packet to arrive. Accordingly when a RSTACK IFMP adjacency protocol message arrives at a system node, the system node resets the link, as indicated by steps 334, 336, 338, 340, and 342. In step 334, the system node generates a new instance number for the link. Then the system node in step 336 deletes the Peer Verifier (i.e., sets the stored values of Sender Instance and Source IP Address of the peer to zero). At step 338, the system node sets the Sequence Number and Peer Next Sequence Number to zero. The system node then sends a SYN IFMP adjacency protocol message in step 340, and enters the SYNSENT state in step 342. The system node then receives another packet for processing.

FIG. 8d is a state diagram illustrating the operation of a sender system node when the incoming IFMP adjacency protocol message is not an RSTACK message. For the following description of FIG. 8d, condition "%B" is defined as: Sender Instance and Source IP Address in the incoming message matches the values stored from a previous message by the Update Peer Verifier operation for the port on which the incoming IFMP adjacency protocol message was received. Condition "%C" in FIG. 8d is defined as: the Peer Instance and Peer Identity in the incoming message matches the values of Sender Instance and Source IP Address currently in use for all SYN, SYNACK, and ACK messages transmitted out of the port on which the incoming IFMP adjacency protocol message was received. In FIG. 8d, condition "A" signifies that the sender system node receives an incoming SYNACK IFMP adjacency protocol message and that condition %C is met; condition "B" signifies that the sender system node receives an incoming SYNACK IFMP adjacency protocol message and that condition %C is not met; condition "C" signifies that the sender system node receives an incoming ACK IFMP adjacency protocol message and that conditions %B and %C are both met; and condition "D" signifies that the sender system node receives an incoming ACK IFMP adjacency protocol message and that conditions %B and %C are not both met.

If the sender is in the SYNSENT state 350 and receives an incoming SYN IFMP adjacency protocol message from a peer on the other end of a link, the sender performs an Update Peer Verifier operation and sends a SYNACK IFMP adjacency protocol message to the peer (indicated as step 352). Then the sender goes from SYSENT state 350 to the SYNRCVD state 354. If the sender receives an incoming SYN IFMP adjacency protocol message while in SYNRCVD state 354, the sender in step 352 performs an Update Peer Verifier operation and sends a SYNACK IFMP adjacency protocol message to the peer, but remains in the SYNRCVD state 354. If the sender is in SYNRCVD state 354 and either condition B or condition D is met, then the sender sends an RSTACK IFMP adjacency protocol message to the peer (indicated as step 356), and remains in SYNRCVD state 354. If the sender is in the SYNRCVD state 354 and condition C is met, then the sender sends an ACK IFMP adjacency protocol message to the peer (indicated as step 358), and moves to the ESTAB state 360. If the sender is in SYNRCVD state 354 and condition A is met, then the sender performs an Update Peer Identifier operation and sends an ACK IFMP adjacency protocol message to the peer (indicated as step 362), and moves to ESTAB state 360. The sender is and remains in ESTAB state 360, if the sender receives either a SYN or SYNACK IFMP adjacency protocol message or if condition C is met. If condition D is met while the sender is in ESTAB state 360, then the sender remains in ESTAB state 360 and sends a RSTACK IFMP adjacency protocol message (indicated as step 356). While in SYNSENT state 350, if either the sender receives an ACK IFMP adjacency protocol message or condition B is met, then the sender remains in SYNSENT state 350 and sends a RSTACK IFMP adjacency protocol message (step 356). If condition A is met when the sender is in SYNSENT state 350, then the sender performs an Update Peer Verifier operation and sends an ACK IFMP adjacency protocol message (step 362) and enters ESTAB state 360.

As discussed above, the IFMP redirection protocol is used to send redirection messages across a link, after the system has used the IFMP adjacency protocol to identify other system nodes at the other end of a link and to achieve state synchronization across a link. Any IFMP redirection message received over a link that has not currently achieved state synchronization must be discarded.

Figure 9A:
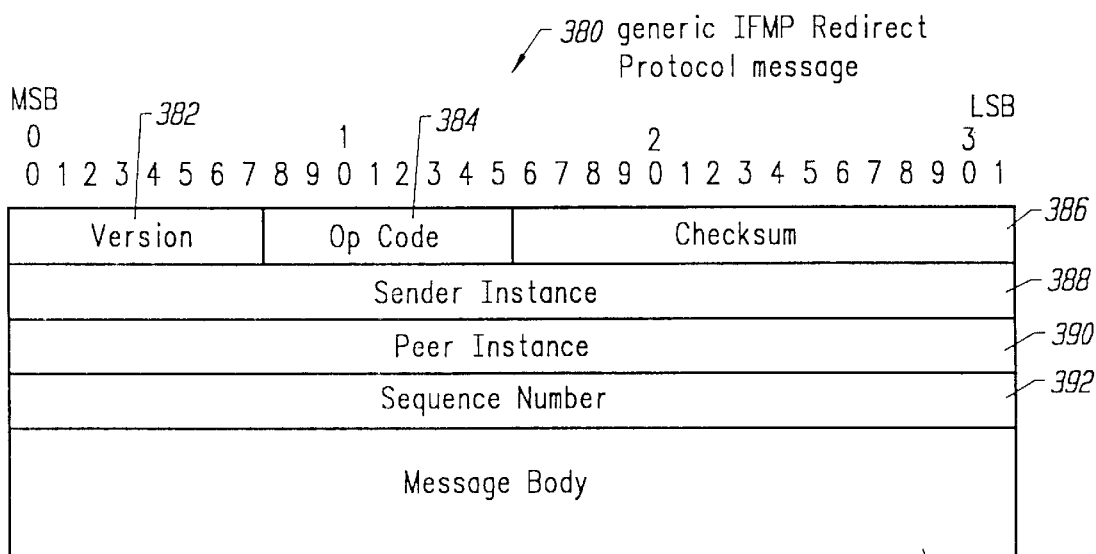
FIG. 9a illustrates the structure of a generic IFMP redirection protocol message, according to an embodiment of the present invention.

FIG. 9a illustrates the structure of a generic IFMP redirection protocol message 380. Like all IFMP adjacency protocol messages, all IFMP redirection protocol messages are encapsulated within an IP packet. FIG. 8b illustrates a generic IP packet (in its current version IPv4) with a variable length Data field into which an IFMP redirection protocol message may be encapsulated. As an indication that the IP packet contains an IFMP message, the Protocol field in the IP header of the encapsulating IP packet must contain the decimal value 101, and the Time to Live field in the header of the IP packet encapsulating the IFMP message is set to 1. An IFMP redirection protocol message is sent to the IP address of the peer at the other end of the link (the IP address being obtained from the IFMP adjacency protocol), using the IP address in the Destination Address field of the IP header. As seen in FIG. 9a, an IFMP redirection protocol message 380 includes (described in order of MSB to LSB) the following fields: an 8-bit Version (382), an 8-bit Op Code (384), and a 16-bit Checksum (386) as the first 32-bit word; Sender Instance (388) as the second 32-bit word; Peer Instance (390) as the third 32-bit word; Sequence Number (392) as the fourth 32-bit word; and a Message Body (394) which is a field of a variable number of 32-bit words.

In an IFMP redirection protocol message, Version field 382 specifies the version of the IFMP protocol which is currently in use (as other versions may evolve). Op Code 384 specifies the function of the IFMP redirection protocol message. In the present embodiment, there are five possible Op Codes, i.e., functions of IFMP redirection protocol messages: REDIRECT (redirect flow message, Op Code=4), RECLAIM (reclaim label message, Op Code=5), RECLAIM ACK (reclaim label acknowledge message, Op Code=6), LABEL RANGE (label range message, Op Code= 7), and ERROR (error message, Op Code=8).

Checksum 386 is the 16-bit one's complement of the one's complement sum of: the source address, destination address and protocol fields from the IP packet encapsulating the IFMP redirection protocol message, and the total length of the IFMP redirection protocol message. Checksum 386 is used by the system for error control purposes.

In IFMP redirection protocol messages, Sender Instance 388 is the sender's instance number for the link, as obtained from the IFMP adjacency protocol. In IFMP redirection protocol messages, Peer Instance field 390 is what the sender believes is the peer's current instance number for the link, as obtained from the IFMP adjacency protocol.

Sequence Number field 392 allows the system node receiving the IFMP redirection protocol message to process IFMP redirection protocol messages in order. Sequence Number 392 is incremented by one, modulo $2^{32}$, for every IFMP redirection protocol message sent across a link. The IFMP adjacency protocol sets the Sequence Number to zero when the link is reset.

Message Body field 316 contains a list of one or more IFMP redirection protocol message elements. All of the message elements in the list have the same message type because Op Code field 384 applies to the entire IFMP redirection protocol message. The number of message elements included in a single packet must not cause the total size of the IFMP redirection protocol message to exceed the maximum transmission unit (MTU) size of the underlying data link. For Label Range or Error IFMP redirection protocol messages, a single message element is used.

Figure 9C:
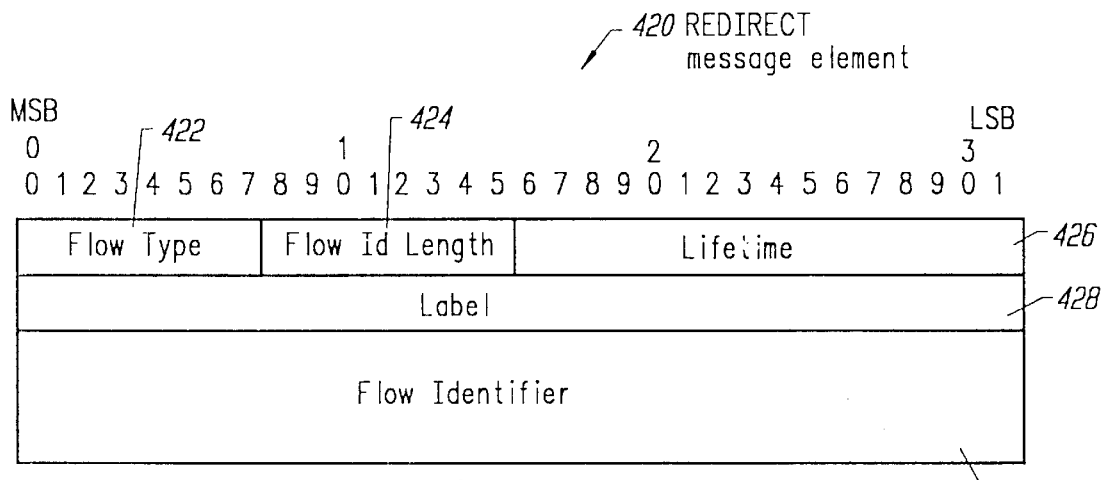
FIGS. 9c–9g illustrate the structures for a REDIRECT message element, RECLAIM message element, RECLAIM ACK message element, LABEL RANGE message element, and ERROR message element in the Message Body 394 of the respective IFMP redirection protocol messages.
Figure 9D:
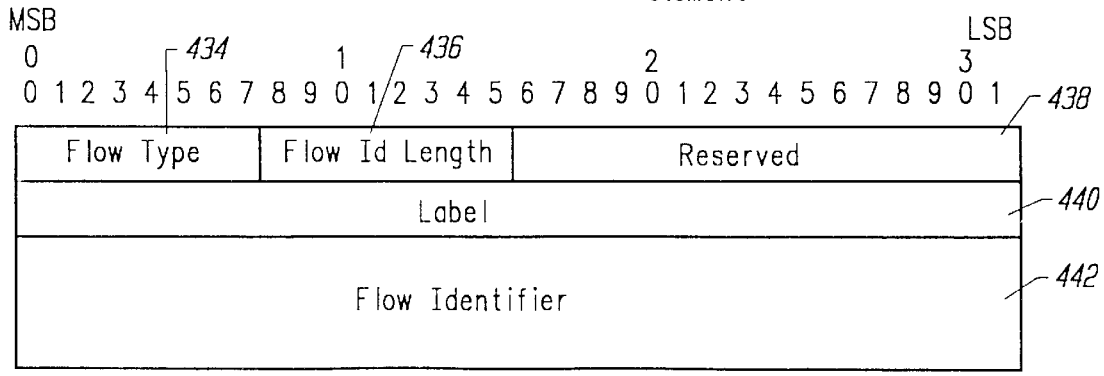
Figure 9B:
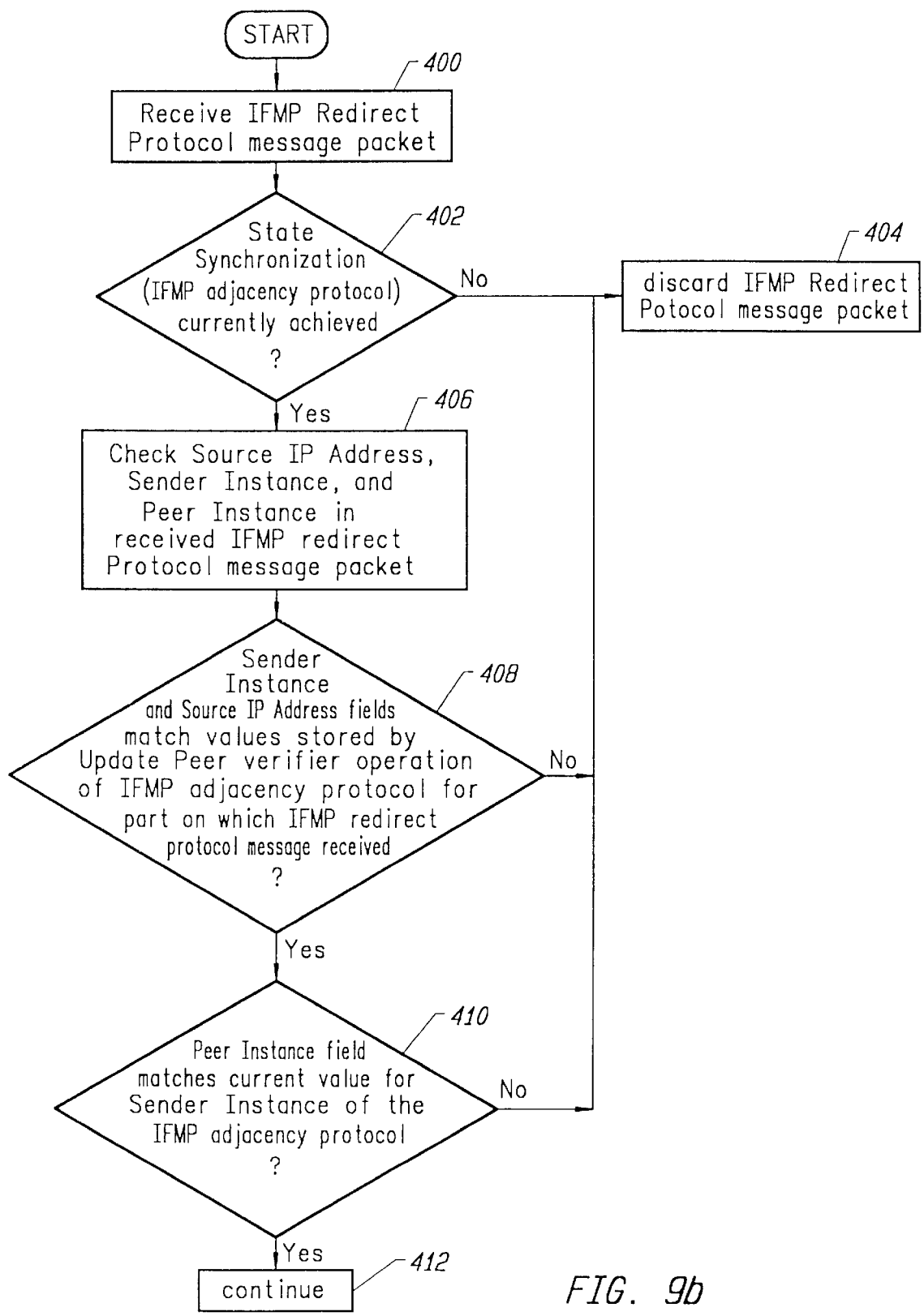
FIG. 9b is a general diagram describing the operation of a system node upon receiving an IFMP redirection protocol message.

FIG. 9b is a general diagram describing the operation of a system node upon receiving an IFMP redirection protocol message. After startup, the system node receives a packet encapsulating an IFMP redirection protocol message at step 400. In step 402, the system node checks if the IFMP adjacency protocol has currently achieved state synchronization for the link. If state synchronization is not achieved, the system node discards the packet encapsulating the received IFMP redirection protocol message (indicated by step 404). If state synchronization is achieved, the system node in step 406 checks the Source IP Address from the IP header, the Sender Instance 388, and the Peer Instance 390 of the IFMP redirection protocol message packet. If the system node at step 408 determines that the Sender Instance 388 and Source IP Address fields of the incoming IFMP redirection protocol message do not match the values stored by the Update Peer Verifier operation of the IFMP adjacency protocol for the port on which the incoming IFMP redirection protocol message is received, the system node discards the incoming IFMP redirection protocol message packet (step 404). If the values match in step 408, then the system node determines in step 410 whether the Peer Instance field 390 matches the current value for the Sender Instance of the IFMP adjacency protocol. If the values do not match in step 408, then the system node discards the packet (step 404). However, if the values do match in step 408, then the system node continues (step 412) to process the received IFMP redirection protocol message as necessary.

As discussed generally above, an IFMP redirection protocol message may be a REDIRECT message, which is used to instruct an adjacent node to attach one or more labels to packets belonging to one or more specified flows each for a specified period of time. The system node receiving a REDIRECT message from a downstream node decides whether or not to accept the redirection request made by the REDIRECT message and redirect a flow. The REDIRECT message is not acknowledged in a formal manner. Rather, the actual redirection of packets having attached labels for specified flows indicates the system node's acceptance of the redirection request made by the REDIRECT message. Each REDIRECT message element in the Message Body 394 of the REDIRECT message has the structure shown in FIG. 9c. Described from MSB to LSB, REDIRECT message element 420 includes 8-bit Flow Type field 422, 8-bit Flow ID Length field 424, and 16-bit Lifetime field 426 in a first 32-bit word; 32-bit Label field 428 as the second 32-bit word; and Flow Identifier 430 which is field of integer multiples of 32-bit words. Flow Type field 422 specifies the flow type of the flow identifier contained in Flow Identifier field 430, and Flow ID Length field 424 specifies the length of the Flow Identifier field 430 in integer multiples of 32-bit words. The Lifetime field 426 specifies the length of time (seconds) for which the redirection is valid. As described generally above, after the expiration of the time period specified in the Lifetime field 426, the association of flow identifier and label should be discarded. The Label field 428 contains the label for the specified flow, with the format of the label depending on the type of physical link across which the IFMP redirection protocol message is sent. The Flow Identifier field 430 identifies the flow with which the specified label in the Label field 428 should be associated.

In IFMP redirection protocol message elements, Flow Type 0 has Flow Type=0 and Flow ID Length=0; Flow Type 1 has Flow Type=1 and Flow ID Length=4; and Flow Type 2 has Flow Type=2 and Flow ID Length=3.

The general operation of REDIRECT messages by sender and peer nodes has been discussed in detail above. In addition, other features of the REDIRECT message element include label management and error control. If the label in Label field 428 of REDIRECT message element 420 is outside the range that can be handled across the relevant link, a LABEL RANGE message may be returned to the sender of the REDIRECT message element. The LABEL RANGE message informs the sender of the range of labels that may be sent across the link. If a system node receives a REDIRECT message element specifying a flow that is already redirected, the system node checks the Label field in the received REDIRECT message element against the label stored for the redirected flow. If the labels match, then the system node resets the lifetime of the redirected flow to that contained in Lifetime field 426 of the received REDIRECT message element. If the labels do not match, then the system node ignores the received REDIRECT message element and the flow is returned to the default state. If the system node detects an error in any of the fields in REDIRECT message element, that particular errored REDIRECT message element is discarded. However, any other error-free REDIRECT message elements that may be in the same IFMP REDIRECT Message Body are not discarded or affected in any way. The system node returns an ERROR message to the adjacent node that sent the errored REDIRECT message element if the system node does not understand the version of the IFMP protocol in the received IFMP message. Also, if the system node does not understand a Flow Type in any of the REDIRECT message elements in the received IFMP message, the system node sends an ERROR message for each Flow Type that is not understood to the adjacent node that sent each particular REDIRECT message element.

As discussed generally above, an IFMP redirection protocol message may be a RECLAIM message, which is used to instruct an adjacent node to unbind or disassociate one or more flows from the labels to which they may be currently bound, and to release the labels for reuse. The system node receiving a RECLAIM message element from a downstream node therefore releases the label and sends to the downstream node a RECLAIM ACK message element as formal acknowledgement of the RECLAIM message. Each RECLAIM message element in the Message Body 394 of a RECLAIM message has the structure shown in FIG. 9d. Described from MSB to LSB, RECLAIM message element 432 includes 8-bit Flow Type field 434, 8-bit Flow ID Length field 436, and 16-bit Reserved field 438 in a first 32-bit word; 32-bit Label field 440 as the second 32-bit word; and Flow Identifier 442 which is field of integer multiples of 32-bit words. Flow Type field 434 specifies the flow type of the flow identifier contained in Flow Identifier field 442, and Flow ID Length field 436 specifies the length of the Flow Identifier field 442 in integer multiples of 32-bit words. In the present embodiment, the Reserved field 438 is unused and set to zero by the system node sending the RECLAIM message element, and is ignored by the system node receiving the RECLAIM message element. The Label field 440 contains the label to be released. The Flow Identifier field 442 identifies the flow with which the specified label in the Label field 440 should be unbound. Each RECLAIM message element applies to a single flow and a single label. After a system node receives a RECLAIM message element, unbinds a flow from a label, returns the flow to the default forwarding state, and releases the label, the system node must issue a RECLAIM ACK message element. RECLAIM ACK message elements may be grouped together into one or more RECLAIM ACK messages and returned to the sender as acknowledgement of the completion of the reclaim operation.

In addition, other features of the RECLAIM message element include label management and error control. If a system node receives a RECLAIM message element specifying an unknown flow, then the system node returns a RECLAIM ACK message element with the same Label 440 and Flow Identifier 442 fields to the sender of the RECLAIM message element. If the system node receives a RECLAIM message element that indicates a known flow but a label in Label field 440 that is not currently bound to that flow, then the system node unbinds that flow and returns that flow to a default forwarding state, as well as issuing a RECLAIM ACK message element containing the actual label to which the flow was previously bound to the sender of the RECLAIM message element. If the system node detects an error in any of the fields in the RECLAIM message element, that particular errored RECLAIM message element is discarded. However, any other error-free RECLAIM message elements that may be in the same IFMP RECLAIM Message Body are not discarded or affected in any way. The system node returns an ERROR message to the adjacent node that sent the errored RECLAIM message element if the system node does not understand the version of the IFMP protocol in the received IFMP message. Also, if the system node does not understand a Flow Type in any of the RECLAIM message elements in the received IFMP message, the system node sends an ERROR message for each Flow Type that is not understood to the adjacent node that sent each particular RECLAIM message element.

Figure 9E:
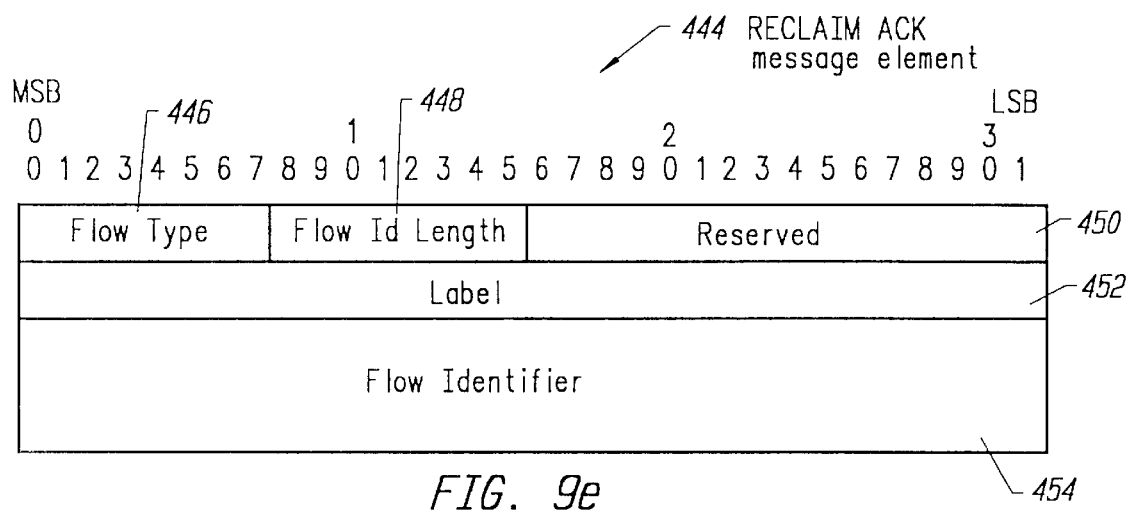

As mentioned above, an IFMP redirection protocol message may be a RECLAIM ACK message, which is used to acknowledge the successful release of one or more reclaimed labels. After a system node receiving a RECLAIM message element from a downstream node releases the label, a RECLAIM ACK message element is sent to the node that sent the RECLAIM message element. If possible, each RECLAIM ACK message element should not be sent until all data queued for transmission on the link, using the label specified for release, has been sent. Each RECLAIM ACK message element in the Message Body 394 of a RECLAIM ACK message has the structure shown in FIG. 9e. Described from MSB to LSB, RECLAIM ACK message element 444 includes 8-bit Flow Type field 446, 8-bit Flow ID Length field 448, and 16-bit Reserved field 450 in a first 32-bit word; 32-bit Label field 452 as the second 32-bit word; and Flow Identifier 454 which is field of integer multiples of 32-bit words. Flow Type field 446 specifies the flow type of the flow identifier contained in Flow Identifier field 454, and Flow ID Length field 448 specifies the length of the Flow Identifier field 454 in integer multiples of 32-bit words. In the present embodiment, the Reserved field 450 is unused and set to zero by the system node sending the RECLAIM ACK message element, and is ignored by the system node receiving the RECLAIM ACK message element. The Label field 452 contains the label released from the flow specified by the Flow Identifier field 454. The Flow Identifier field 454 contains the Flow Identifier from the RECLAIM message element that requested release of the label specified in the Label field 452.

Other features of the RECLAIM ACK message element include label management and error control. If a system node receives a RECLAIM ACK message element specifying a flow for which no RECLAIM message element was issued, that RECLAIM ACK message element is ignored. If a system node receives a RECLAIM ACK message element specifying a different label from the label sent in the RECLAIM message for that flow, the system node handles the received RECLAIM ACK message element as if the reclaim operation for the label sent in the RECLAIM message were successful. If the system node detects an error in any of the fields in the RECLAIM ACK message element, that particular errored RECLAIM ACK message element is discarded. However, any other error-free RECLAIM ACK message elements that may be in the same IFMP RECLAIM ACK Message Body are not discarded or affected in any way. The system node returns an ERROR message to the adjacent node that sent the errored RECLAIM ACK message element if the system node does not understand the version of the IFMP protocol in the received IFMP message. Also, if the system node does not understand a Flow Type in any of the RECLAIM ACK message elements in the received IFMP message, the system node sends an ERROR message for each Flow Type that is not understood to the adjacent node that sent each particular RECLAIM ACK message element.

Figure 9F:
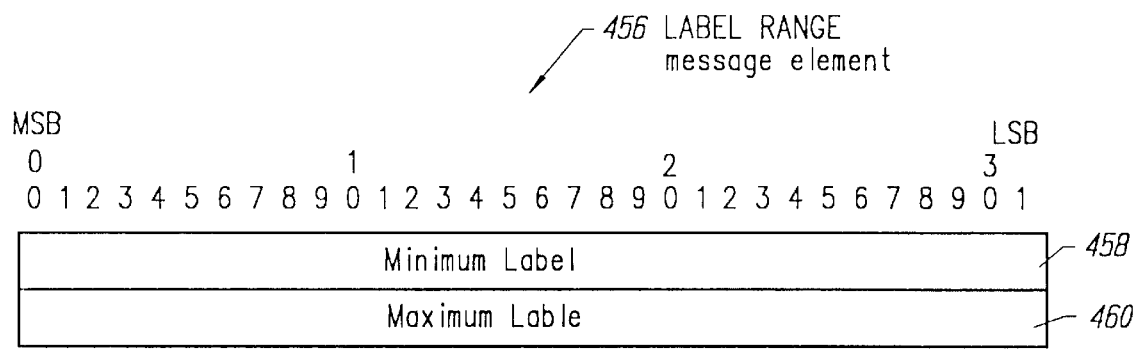

As discussed above, an IFMP redirection protocol message may be a LABEL RANGE message, which is used in response to a REDIRECT message if the label requested in one or more of the REDIRECT message elements is outside the range that the system node receiving the REDIRECT message can handle. The LABEL RANGE message informs the sender of the REDIRECT message of the label range that can be handled on that link. A single LABEL RANGE message element is used in a LABEL RANGE message. The LABEL RANGE message element in the Message Body 394 of a LABEL RANGE message has the structure shown in FIG. 9f. LABEL RANGE message element 456 includes Minimum Label field 458 as a first 32-bit word, and Maximum Label field 460 as a second 32-bit word. Minimum Label field 458 and Maximum Label field 460, respectively, are the minimum and maximum value of label that can be specified in an IFMP redirection protocol message across a particular link. Only those values of labels within the range from Minimum Label to Maximum Label (inclusive) may be specified in the IFMP redirection protocol message across the link.

Figure 9G:
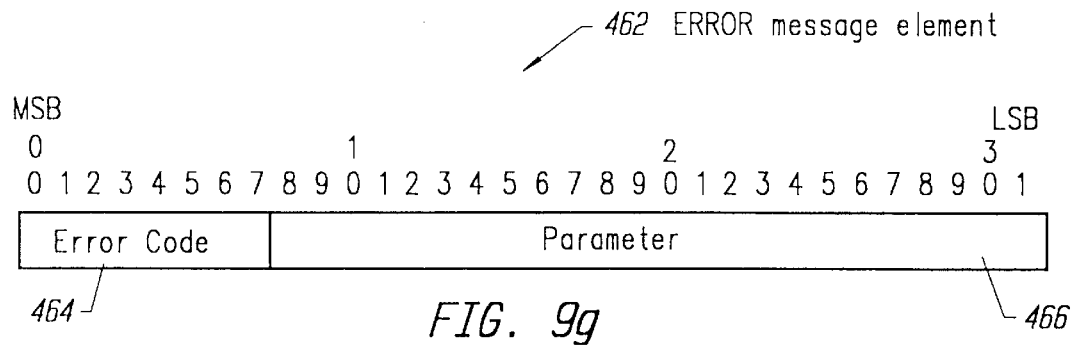

As described above, an IFMP redirection protocol message may also be an ERROR message, which may be sent in response to any IFMP redirection protocol message. A single ERROR message element is used in an ERROR message. The ERROR message element in the Message Body 394 of an ERROR message has the structure shown in FIG. 9g. Described from MSB to LSB, ERROR message element 462 includes 8-bit Error Code field 464 and 24-bit Parameter field 466 as a 32-bit word. Error Code field 464 specifies what type of error has occurred. Each ERROR message may specify a single Parameter. If a system node detects an error in any of the fields in an IFMP redirection protocol message element, that particular errored message element is discarded and an ERROR message is issued. If the system node cannot process or does not understand the particular version of the IFMP protocol in the received IFMP message, the system node sends an ERROR message with Error Code 464 set to the value 1 and with Parameter 466 providing the most recent version of IFMP protocol that the sender is able to understand or process. Also, if the system node does not understand a Flow Type in any of the received IFMP redirect protocol message elements that caused the error, the system node sends an ERROR message with Error Code 464 set to the value 2 and with Parameter 466 providing the Flow Type that caused the error.

2. Flow Labelled Transmission on ATM Data Links

The present invention uses ATM data links to transmit IP packets between system nodes. Packets transmitted on the ATM data links are flow labelled and are encapsulated differently depending on the type of flow, as mentioned above. Using flow classification, the present invention efficiently permits different types of flows to be handled differently (layer 2 routing or layer 3 switching), depending on the type of flow. In addition, each flow type also specifies an encapsulation that is to be used after this type of flow is redirected. In the present embodiment, the system uses encapsulations for ATM data links, as described in detail herein. Of course, encapsulations for each flow type may be specified for different data link technologies for the different hardware switching engines that may be used with the present invention.

Figure 10A:
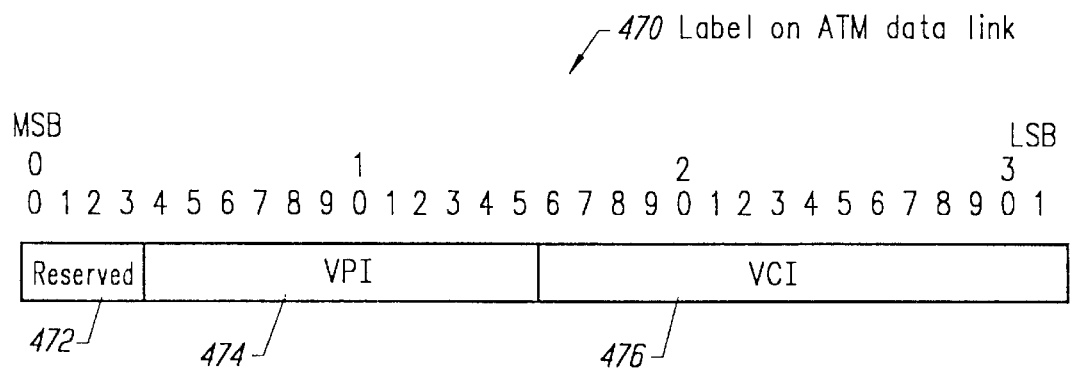
FIG. 10a illustrates the format of a Label field on an ATM data link, according to an embodiment of the present invention.

A particular flow of packets may be associated with a particular ATM label. FIG. 10a illustrates the format of the 32-bit Label field for ATM labels in the present system. As discussed previously, a label is a virtual path identifier and virtual channel identifier (VPI/VCI), assuming unidirectional virtual channels. Described from MSB to LSB, ATM Label field 470 shown in FIG. 10a includes 4-bit Reserved field 472, 12-bit VPI field 474, and 16 bit VCI field 476. In the present embodiment, Reserved field 472 is set to zero by the sender system node and ignored by the system node receiving the ATM label. For a link that does not support a full 12-bit VPI, the unused bits in the VPI field 474 are the MSBs in the field 474 and are set to zero. Also, for a link that does not support a full 16-bit VCI, the unused bits in the VCI field 476 are the MSBs in the field 476 and are set to zero.

For any packets in a flow that is not redirected, a system node uses a default encapsulation for the IP packets. If a system node decides that a particular flow type will be redirected, the system node uses an encapsulation particular to each flow type. Upon redirecting a flow, a system node changes the encapsulation used for the redirected flow from the default encapsulation normally used. Rather than using the default encapsulation used for IP packets on the default forwarding channel, the system node uses a different type of encapsulation depending on the flow type that is redirected. It is recognized that an ATM encapsulated IP packet may be an IP packet that is itself encapsulating an IFMP message to and/or from a host computer/server/workstation running a subset of the system software, a basic switching unit, or a switch gateway unit.

As discussed above, in an embodiment of the present invention, three flow types are specified: Flow Type 0, Flow Type 1, and Flow Type 2. Flow Type 0 is used to change the encapsulation of IP packets from the default encapsulation.

Flow Type 1 is used for packets carrying data between applications running on stations. Flow Type 2 is used for packets carrying data between stations without identifying the applications that may be running on the stations.

Figure 10B:
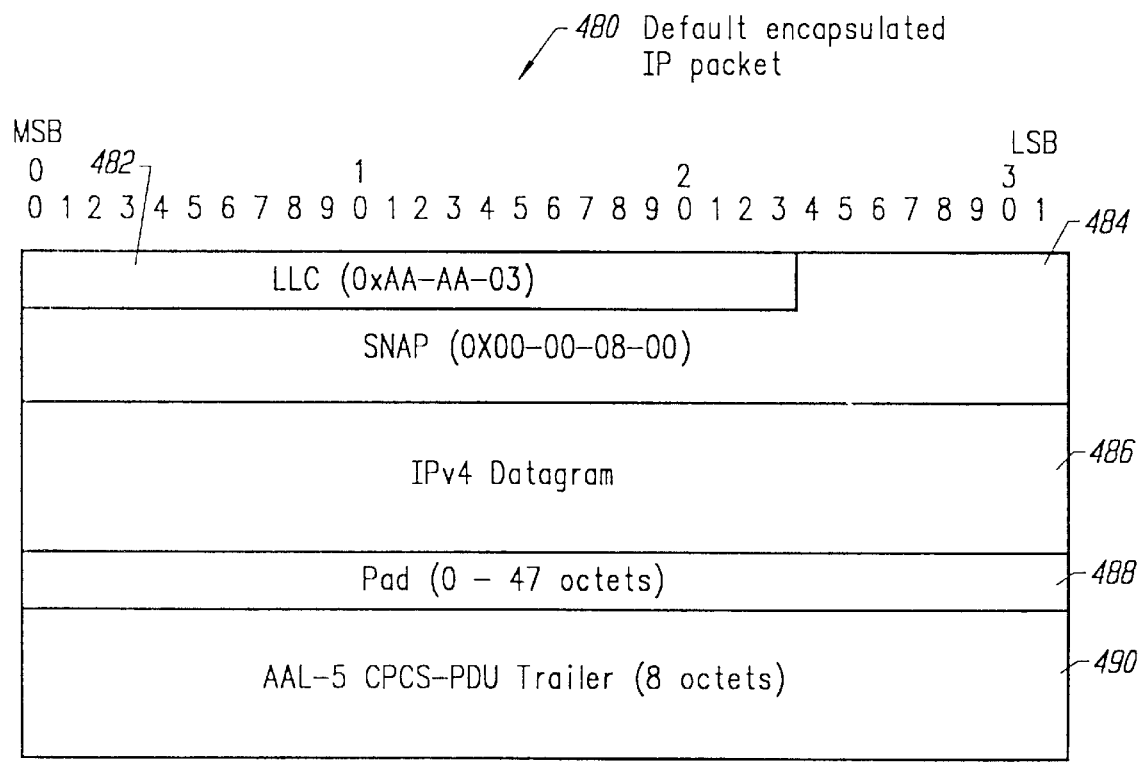
FIG. 10b–10e respectively illustrate default, Flow Type 0, Flow Type 1, and Flow Type 2 encapsulated IP packets, according to embodiments of the present invention.

In the present invention, the default encapsulation for IP packets on ATM data links is the Logical Link Control/ SubNetwork Attachment Point (LLC/SNAP) encapsulation shown in FIG. 10b. FIG. 10b illustrates a default encapsulated IP packet 480. Basically, the default encapsulation prefixes an LLC/SNAP header to the IP packet which is encapsulated within the payload of an ATM Adaptation Layer type 5 Common Part Convergence Sublayer Protocol Data Unit (AAL-5 CPCS-PDU). Described from MSB to LSB, default encapsulated IP packet 480 includes an LLC/SNAP header (24-bit LLC field 482 followed by an 8-bit portion of SNAP header 484 in the first 32-bit word, and the remaining 32-bit word portion of SNAP header 484), IP packet 486 (which has a length of an integer multiple of 32-bit words), Pad field 488, and AAL-5 CPCS-PDU Trailer field 490. Pad field 488 may range from 0 to 47 octets, and Trailer field 490 is 8 octets (four 32-bit words). The MTU of the IP packet 486 using default encapsulation is 1500 octets. The packets using default encapsulation are sent to VPI=0, VCI=1 (forwarded on default virtual channel).

Figure 10C:
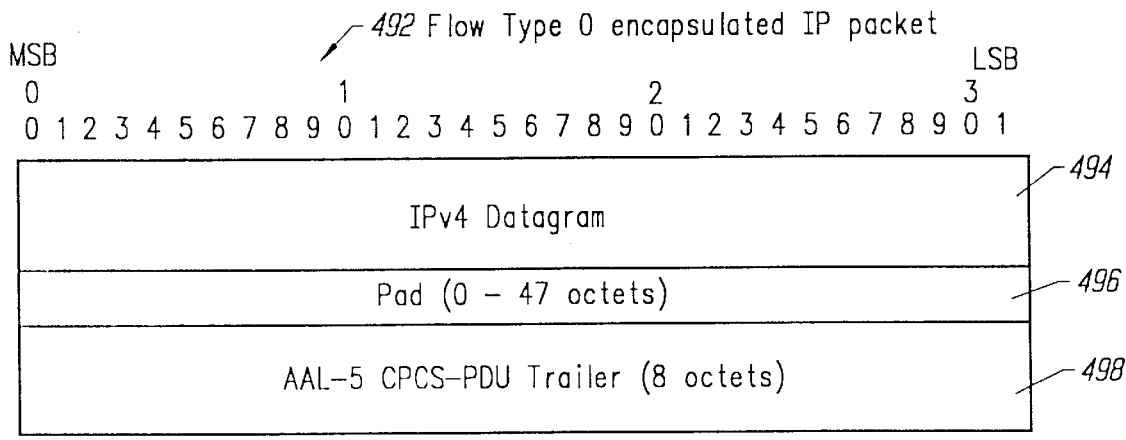

Flow Type 0 encapsulation is used to change the encapsulation of IP packets from the default encapsulation. FIG. 10c illustrates a Flow Type 0 encapsulated IP packet 492. IP packets using Flow Type 0 are encapsulated directly in the payload of an AAL-5 CPCS-PDU without a prefixed LLC/SNAP header. Described from MSB to LSB, Flow Type 0 encapsulated IP packet 492 includes IP packet 494 (which has a length of an integer multiple of 32-bit words), Pad field 496, and AAL-5 CPCS-PDU Trailer field 498. Pad field 496 may range from 0 to 47 octets, and Trailer field 498 is 8 octets (four 32-bit words). The MTU of the IP packet 494 using Flow Type 0 encapsulation is 1500 octets. The packets belonging to the flow redirected from the default virtual channel use Flow Type 0 encapsulation and are sent to the VPI/VCI specified in the Label field of the IFMP REDIRECT message element encapsulated in IP packet 494 (the IFMP REDIRECT message element encapsulated in IP packet 494 is sent in Flow Type 0 encapsulation).

Default and Flow Type 0 encapsulations do not involve removal of any fields from the IP packet being encapsulated. However, Flow Type 1 and Flow Type 2 "encapsulations" involve removal of certain fields from the IP packet. When these fields are removed, the system node that issued the REDIRECT message stores the removed fields and associates the fields with the ATM virtual channel specified in the ATM label. Accordingly, a complete IP packet may be reconstructed at a destination using the incoming ATM label to access the stored fields.

Figure 10D:
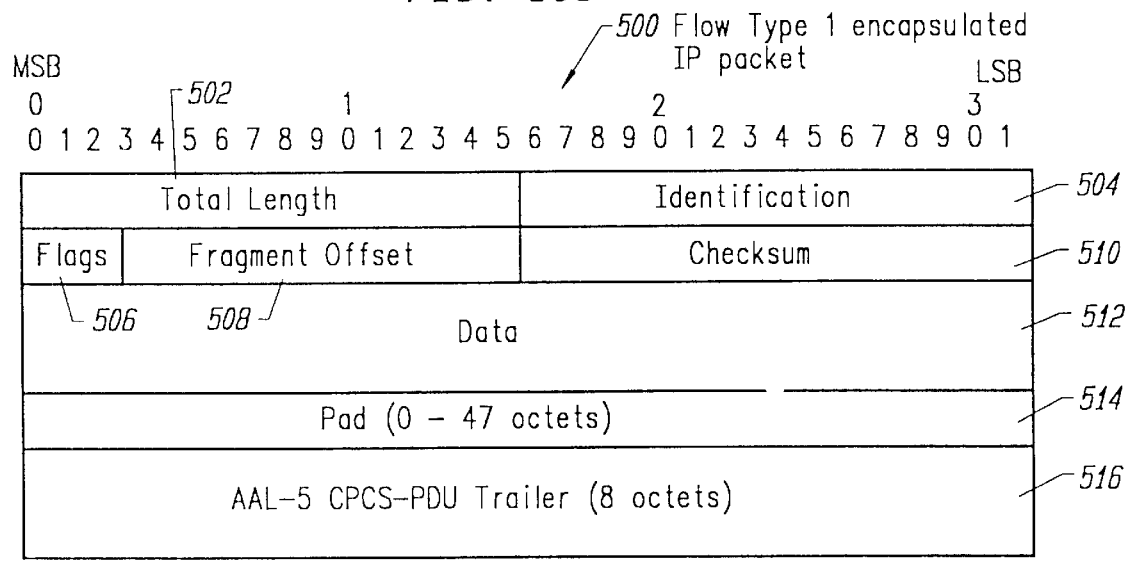

Flow Type 1 is used for packets carrying data between applications running on stations. FIG. 10d illustrates a Flow Type 1 encapsulated IP packet. IP packets using Flow Type 1 encapsulation are essentially disassembled and selected portions of the disassembled IP packet are encapsulated directly in the payload of an AAL-5 CPCS-PDU, without a prefixed LLC/SNAP header. Described from MSB to LSB, Flow Type 1 encapsulated IP packet 500 includes 16-bit Total Length field 502 and 16-bit Identification field 504 from the IP header of the disassembled IP packet, as a first 32-bit word. The value of the Total Length field 502 is not changed, but remains the total length of the IP packet before disassembly. Flow Type 1 encapsulated IP packet 500 also includes the 8-bit Flags field 506, 12-bit Fragment Offset field 508, and 16-bit Checksum field 510 from the IP header of the disassembled IP packet, as a second 32-bit word. The transmitted value of Checksum field 510 is the checksum value that would have been computed for the entire IP header if the TTL field had been set to zero. The Version, IHL, TOS, TTL, Protocol, Source Address, and Destination Address fields in the IP header are not transmitted as part of the Flow Type 1 encapsulated IP packet 500. In addition, the first four octets immediately following the IP header (as determined by the IHL) are not transmitted as part of the Flow Type 1 encapsulated IP packet 500. These first four octets correspond to the source port and destination port for TCP and UDP datagrams, as an example. The source port and destination port fields identify the applications running on the stations. Further, Flow Type 1 encapsulated IP packet 500 includes Data 512. Data field 512 is followed by Pad field 514 and AAL-5 CPCS-PDU Trailer field 516. Pad field 514 may range from 0 to 47 octets, and Trailer field 516 is 8 octets (four 32-bit words). The MTU of the IP packet using Flow Type 1 encapsulation is 1484 octets. The packets belonging to the flow redirected using Flow Type 1 encapsulation are sent to the VPI/VCI specified in the Label field of the corresponding Flow Type 1 IFMP REDIRECT message element encapsulated in the disassembled IP packet (the Label field may be configured to correspond to the source and destination port fields in the TCP or UDP messages).

Figure 10E:
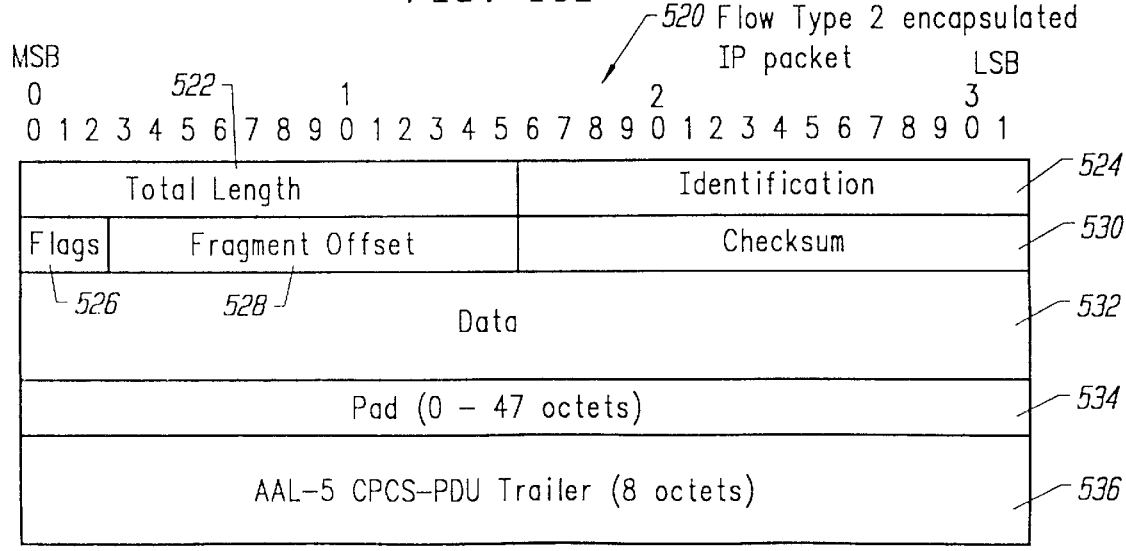

Flow Type 2 is used for packets carrying data between stations without regard to what applications are running on the stations. FIG. 10e illustrates a Flow Type 2 encapsulated IP packet. IP packets using Flow Type 2 encapsulation are essentially disassembled and selected portions of the disassembled IP packet are encapsulated directly in the payload of an AAL-5 CPCS-PDU, without a prefixed LLC/SNAP header. Described from MSB to LSB, Flow Type 2 encapsulated IP packet 520 includes 16-bit Total Length field 522 and 16-bit Identification field 524 from the IP header of the disassembled IP packet, as a first 32-bit word. The value of the Total Length field 522 is not changed, but remains the total length of the IP packet before disassembly. Flow Type 2 encapsulated IP packet 520 also includes the 8-bit Flags field 526, 12-bit Fragment Offset field 528, and 16-bit Checksum field 530 from the IP header of the disassembled IP packet, as a second 32-bit word. The transmitted value of Checksum field 530 is the checksum value that would have been computed for the entire IP header if the TTL field had been set to zero. The Version, IHL, TOS, TTL, Protocol, Source Address, and Destination Address fields in the IP header are not transmitted as part of the Flow Type 2 encapsulated IP packet 520. Unlike Flow Type 1 encapsulation, the first four octets immediately following the IP header (as determined by the IHL) are transmitted as part of the Flow Type 2 encapsulated IP packet 520. Further, Flow Type 2 encapsulated IP packet 520 includes Data 532. Data field 532 is followed by Pad field 534 and AAL-5 CPCS-PDU Trailer field 536. Pad field 534 may range from 0 to 47 octets, and Trailer field 536 is 8 octets (four 32-bit words). The MTU of the IP packet using Flow Type 2 encapsulation is 1488 octets. The packets belonging to the flow redirected using Flow Type 2 encapsulation are sent to the VPI/VCI specified in the Label field of the corresponding Flow Type 2 IFMP REDIRECT message element encapsulated in the disassembled IP packet.

For Flow Type 0, Flow Type 1, and Flow Type 2 encapsulations, the system node that accepts an IFMP REDIRECT message sent by a downstream node stores the removed fields and associates the fields with the ATM virtual channel specified by ATM label to enable cached access information for redirected packets, as discussed above.

B. GSMP

The system software also utilizes the GSMP protocol to establish communication over the ATM link between the switch controller and ATM hardware switching engine of a basic switching unit of the system and thereby enable layer 2 switching when possible and layer 3 IP routing when necessary. In particular, GSMP, a general purpose asymmetric protocol to control an ATM switch, runs on a virtual channel established at initialization across the ATM link between the switch controller and the ATM switch. A single switch controller may use multiple instantiations of GSMP over separate virtual channels to control multiple ATM switches. GSMP also includes a GSMP adjacency protocol. The GSMP adjacency protocol is used to synchronize state across the ATM link between the switch controller and the ATM switch, to discover the identity of the entity at the other end of the link, and to detect changes in the identity of that entity.

GSMP allows the switch controller to establish and release connections across the ATM switch, add and delete leaves on a point-to-multipoint connection, manage switch ports, request configuration information, and request statistics. GSMP also allows the ATM switch to inform the switch controller of events such as a link going down.

As stated earlier, GSMP is a master-slave protocol. The switch controller issues request messages to the switch. Each request message indicates whether a response from the switch is required and contains a transaction identifier to enable the response to be associated with the particular request. The switch replies with a response message indicating success or failure. In the present embodiment, GSMP has five classes of messages: Connection Management, Port Management, Statistics, Configuration, and Event. Except for the Event message class, the other four classes are request-response message classes, each having a format for the request message and a format for the success response. Unless otherwise indicated, a failure response message is the same as the request message that caused the failure except that the Code field indicates the nature of the failure. In addition to the four request-response message classes, GSMP includes an Event message class, that enables the switch to generate asynchronous Event messages to inform the switch controller of asynchronous events. As Event messages are not acknowledged by the switch controller, Event messages have a single format. In the present embodiment, there are many different message types, i.e., functions of GSMP messages. Each of the five GSMP message classes, except for Port Management, has a number of different message types.

Also, GSMP includes the GSMP adjacency protocol message, which is allocated a particular message type. The GSMP adjacency protocol is used to establish synchronization across the ATM link and maintain a handshake. Except for GSMP adjacency protocol messages, no other GSMP messages may be sent across the ATM link until the GSMP adjacency protocol has achieved state synchronization. All GSMP messages received on the ATM link that does not currently have state synchronization are discarded.

Figure 11A:
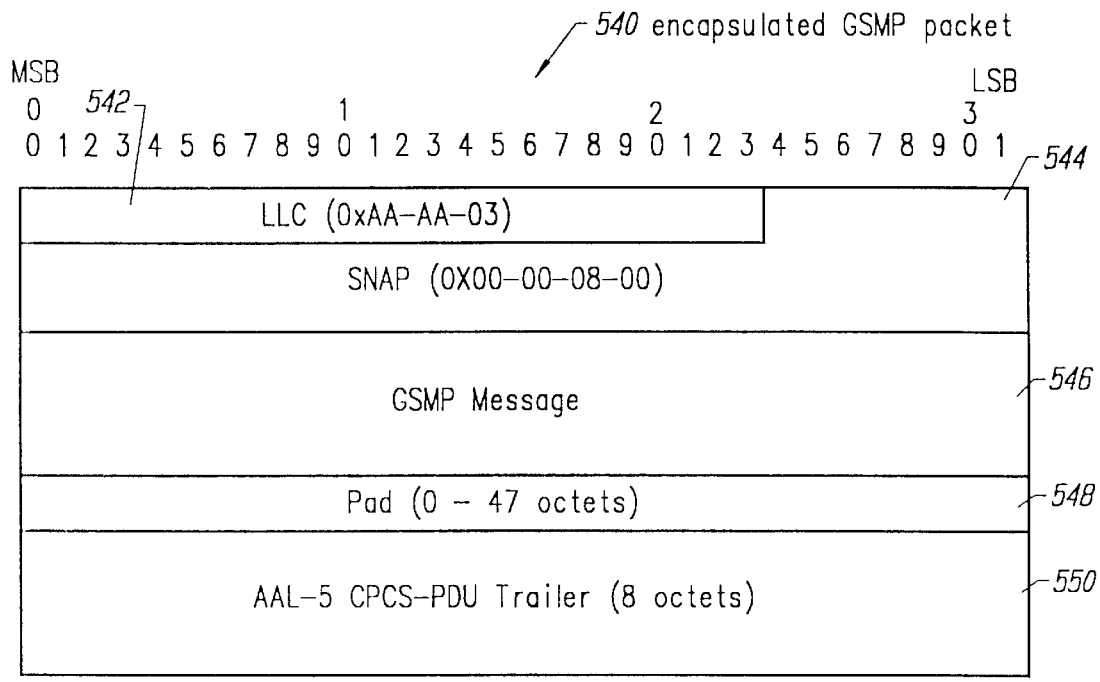
FIG. 11a illustrates the format of an encapsulated GSMP packet.

In the present invention, GSMP packets are variable length and encapsulated directly in an AAL-5 CPCS-PDU with a prefixed LLC/SNAP header, in a similar manner as the default encapsulation for IP packets on ATM data links described above in relation to FIG. 10b. FIG. 11a illustrates an encapsulated GSMP packet 540. Basically, the default encapsulation prefixes an LLC/SNAP header to the GSMP packet which is encapsulated within the payload of an AAL-5 CPCS-PDU. Described from MSB to LSB, default encapsulated GSMP packet 540 includes an LLC/SNAP header (24-bit LLC field 542 followed by an 8-bit portion of SNAP header 544 in the first 32-bit word, and the remaining 32-bit word portion of SNAP header 544), GSMP message 546 (which has a length of an integer multiple of 32-bit words), Pad field 548, and AAL-5 CPCS-PDU Trailer field 550. Pad field 548 may range from 0 to 47 octets, and Trailer field 550 is 8 octets (four 32-bit words). The MTU of the GSMP message 546 using default encapsulation is 1500 octets. The packets using default encapsulation are sent to VPI=0, VCI=1 (default virtual channel).

Figure 11B:
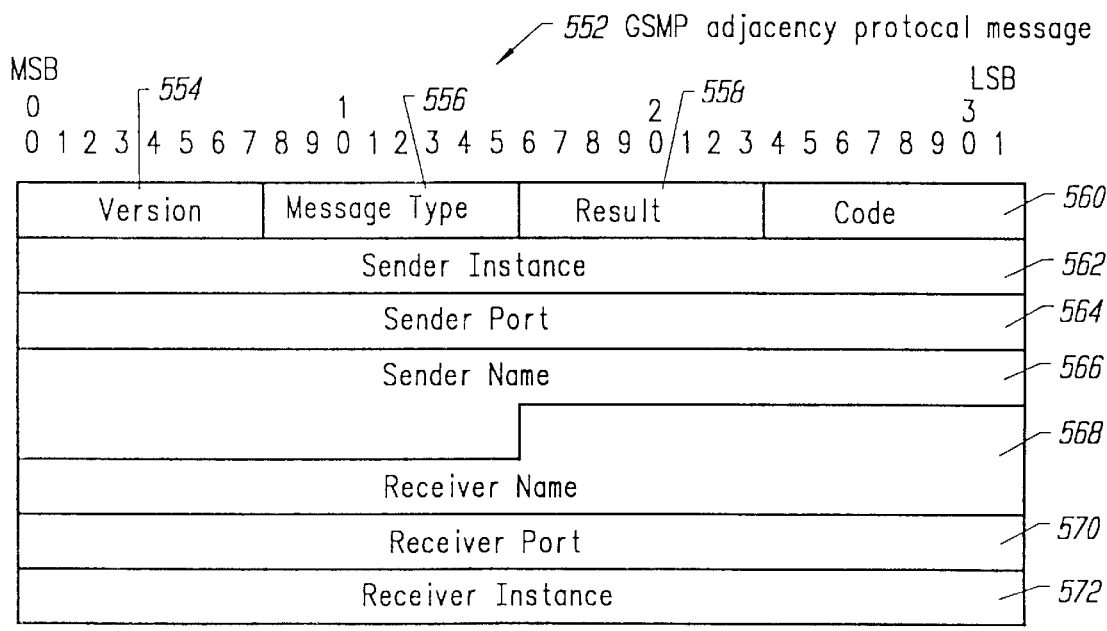
FIG. 11b illustrates the format of a GSMP adjacency protocol message.

FIG. 11b illustrates the structure of a GSMP adjacency protocol message 552 that may be contained in GSMP Message field 546 of the encapsulated GSMP packet 540 in FIG. 11a. As seen in FIG. 11b, a GSMP adjacency protocol message 552 includes (described in order of MSB to LSB) the following fields: an 8-bit Version field 554, an 8-bit Message Type field 556, an 8-bit Result field 558, and an 8-bit Code field 560 as a first 32-bit word; Sender Instance field 562 as a second 32-bit word; Sender Port field 564 as a third 32-bit word; Sender Name field 566 as the next 48 bits; Receiver Name field 568 as the next 48 bits; Receiver Port field 570 as the next 32 bits; and Receiver Instance field 572 as the next 32 bits. In discussing GSMP messages, a "sender" is the entity which sends the GSMP message, and a "peer" is the entity to which the sender sends the GSMP message over the ATM link. An entity may be a switch controller or ATM switch.

In a GSMP adjacency protocol message 552, Version field 554 specifies the version of the GSMP protocol which is currently in use (as other versions may evolve). Message Type field 554 is set to a particular value (Message Type=96) to specify the GSMP message as being a GSMP adjacency protocol message. Not used for GSMP adjacency protocol messages, Result field 556 is set to zero by a sender entity and ignored by the entity receiving the GSMP adjacency protocol message.

Code field 560 for GSMP adjacency protocol messages specifies the function of the message. In the present embodiment, there are four possible values for Code field 560, i.e., functions of GSMP adjacency protocol messages: SYN (synchronization message, Code=0), SYNACK (synchronization acknowledge message, Code=1), RSTACK (reset acknowledge message, Code=2), and ACK (acknowledge message, Code=3). In each entity, a timer is required for the periodic generation of SYN, SYNACK, and ACK GSMP messages. For GSMP adjacency protocol purposes, an entity has three possible states for a particular link: SYNSENT (synchronization message sent), SYN-RCVD (synchronization message received), ESTAB (synchronization established). State synchronization across a link (when an entity reaches the ESTAB state for a link) is required before the entities may send GSMP messages that are not GSMP adjacency protocol messages. In the present embodiment, the period of the timer is one second, but other periods may be specified. If the timer expires and the sender entity is in the SYNSENT state, the sender entity resets the timer and sends a SYN GSMP adjacency protocol message. If the timer expires and the sender entity is in the SYN-RCVD state, the sender entity resets the timer and sends a SYNACK GSMP adjacency protocol message. If the timer expires and the sender entity is in the ESTAB state, the sender entity resets the timer and sends an ACK GSMP adjacency protocol message.

In SYN, SYNACK, and ACK GSMP adjacency protocol messages, Sender Instance 562 is the sender entity's instance number for the link. Indicating a specific instance of a link, an instance number is a 32-bit non-zero number that is guaranteed to be unique within the recent past, and to change when the link comes back after going down or when the identity of the entity at the other end of the link changes. Accordingly, each link has its own unique instance number. Sender Instance 562 is used to detect when a link comes back after going down, or when the identity of an entity at the other end of the ATM link changes. For a RSTACK GSMP adjacency protocol message, Sender Instance 562 is set to the value of the Receiver Instance field 572 from the incoming GSMP adjacency protocol message that caused the RSTACK message to be generated.

In SYN, SYNACK, and ACK GSMP adjacency protocol messages, Sender Port field 564 is the local port number of the link across which the GSMP message is being sent. As discussed above, port numbers are locally assigned 32-bit values. For RSTACK GSMP adjacency protocol messages, Sender Port field 564 is set to the value of the Receiver Port field 570 from the incoming GSMP adjacency protocol message that caused the RSTACK message to be generated.

For SYN, SYNACK, and ACK GSMP adjacency protocol messages, Sender Name field 566 is the name of the sender entity. The 48-bit Sender Name 566 is unique within the operational context of the basic switching unit. For example, an IEEE 802 MAC address may be used for the Sender Name field. For a RSTACK GSMP adjacency protocol message, the Sender Name field 566 is set to the value of the Receiver Name field 566 from the incoming GSMP adjacency protocol message that caused the RSTACK message to be generated.

For SYN, SYNACK, and ACK GSMP adjacency protocol messages, Receiver Name field 568 is the name of the entity that the sender entity believes is on the other end of the ATM link. If the sender entity does not know the name of that entity, Receiver Name field 568 is set to zero. For a RSTACK GSMP adjacency protocol message, the Receiver Name field 568 is set to the value of the Sender Name field 566 from the incoming GSMP adjacency protocol message that caused the RSTACK message to be generated.

In SYN, SYNACK, and ACK GSMP adjacency protocol messages, Receiver Port field 570 is what the sender entity believes is the local port number for the link that has been allocated by the entity at the other end of the link. If the sender entity does not know the port number of that entity, Receiver Port field 570 is set to zero. For RSTACK GSMP adjacency protocol messages, Receiver Port field 570 is set to the value of the Sender Port field 564 from the incoming GSMP adjacency protocol message that caused the RSTACK message to be generated.

In SYN, SYNACK, and ACK GSMP adjacency protocol messages, Receiver Instance 572 is what the sender entity believes is the current instance number for the link that has been allocated by the entity at the other end of the link. If the sender entity does not know the current instance number at the other end of the link, Receiver Instance field 572 is set to zero. For a RSTACK GSMP adjacency protocol message, Receiver Instance 572 is set to the value of the Sender Instance field 562 from the incoming GSMP adjacency protocol message that caused the RSTACK message to be generated.

FIG. 11*c* is a simplified diagram illustrating the operation of a sender entity upon receiving an incoming GSMP adjacency protocol message. After startup, the sender entity receives a GSMP adjacency protocol packet at step 582. At step 584, the sender entity determines if the incoming GSMP adjacency protocol message is a RSTACK message. If the incoming GSMP adjacency protocol message is not a RSTACK message (e.g., a SYN, SYNACK, or ACK message), then the sender entity operates in the manner illustrated in the state diagram of FIG. 11*d*. If the incoming GSMP adjacency protocol message is a RSTACK message, then the sender entity checks at step 584 whether the Sender Instance, Sender Port, and Sender Name fields in the incoming message match the values stored from a previous message by the Update Peer Verifier operation. For the GSMP adjacency protocol, the Update Peer Verifier operation is defined as: storing the values of the Sender Instance, Sender Port, and Sender Name fields from a SYN or SYNACK message received from the entity at the other end of the link. If the values match from step 584, then the sender entity determines at step 586 whether the Receiver Instance, Receiver Port, and Receiver Name fields in the incoming RSTACK message match the values of Sender Instance, Sender Port, and Sender Name fields currently sent in outgoing SYN, SYNACK, and ACK messages for that the port on which the incoming RSTACK message was received. If the values match from step 586, the sender entity determines at step 588 if the sender entity is in the SYNSENT state. If the sender entity is not in the SYNSENT state, the sender entity proceeds to reset the link at step 590. If the values do not match from step 584, or the values do not match from step 586, or the sender entity is in the SYNSENT state, then the sender entity discards the incoming RSTACK message at step 592 and waits for another packet to arrive. Accordingly when a RSTACK GSMP adjacency protocol message arrives at a sender entity, the sender entity resets the link, as indicated by steps 594, 596, 598, and 600. In step 594, the sender entity generates a new instance number for the link. Then the sender entity in step 596 deletes (i.e., sets to zero) the stored values of Sender Instance, Sender Port, and Sender Name previously stored by the Update Peer Verifier operation. At step 598, the sender entity then sends a SYN GSMP adjacency protocol message, and enters the SYNSENT state in step 600. The sender entity then receives another packet for processing.

FIG. 11*d* is a state diagram illustrating the operation of a sender entity when the incoming GSMP adjacency protocol message is not a RSTACK message. For the following description of FIG. 11*d*, condition "%B" is defined as: Sender Instance, Sender Port, and Sender Name fields in the incoming message match the values stored from a previous message by the Update Peer Verifier operation. Condition "%C" in FIG. 11*d* is defined as: the Receiver Instance, Receiver Port, and Receiver Name in the incoming message match the values of Sender Instance, Sender Port, and Sender Name currently sent in outgoing SYN, SYNACK, and ACK messages. In FIG. 11*d*, condition "A" signifies that the sender entity receives an incoming SYNACK GSMP adjacency protocol message and that condition %C is met; condition "B" signifies that the sender entity receives an incoming SYNACK GSMP adjacency protocol message and that condition %C is not met; condition "C" signifies that the sender entity receives an incoming ACK GSMP adjacency protocol message and that conditions %B and %C are both met; and condition "D" signifies that the sender entity receives an incoming ACK GSMP adjacency protocol message and that conditions %B and %C are not both met.

If the sender entity is in the SYNSENT state 602 and receives an incoming SYN GSMP adjacency protocol message from a peer on the other end of a link, the sender entity performs an Update Peer Verifier operation and sends a SYNACK GSMP adjacency protocol message to the peer (indicated as step 604). Then the sender goes from SYSENT state 602 to the SYNRCVD state 606. If the sender receives an incoming SYN GSMP adjacency protocol message while in SYNRCVD state 606, the sender in step 604 performs an Update Peer Verifier operation and sends a SYNACK GSMP adjacency protocol message to the peer, but remains in the SYNRCVD state 606. If the sender is in SYNRCVD state 606 and either condition B or condition D is met, then the sender sends an RSTACK GSMP adjacency protocol message to the peer (indicated as step 608), and remains in SYNRCVD state 606. If the sender is in the SYNRCVD state 606 and condition C is met, then the sender sends an ACK GSMP adjacency protocol message to the peer (indicated as step 610), and moves to the ESTAB state 612. If the sender is in SYNRCVD state 606 and condition A is met, then the sender performs an Update Peer Identifier operation and sends an ACK GSMP adjacency protocol message to the peer (indicated as step 614), and moves to ESTAB state 612. The sender is and remains in ESTAB state 612, if the sender receives either a SYN or SYNACK GSMP adjacency protocol message or if condition C is met. If condition D is met while the sender is in ESTAB state 612, then the sender remains in ESTAB state 612 and sends a RSTACK GSMP adjacency protocol message (indicated as step 608). While in SYNSENT state 602, if either the sender receives an ACK GSMP adjacency protocol message or condition B is met, then the sender remains in SYNSENT state 602 and sends a RSTACK GSMP adjacency protocol message (step 608). If condition A is met when the sender is in SYNSENT state 602, then the sender performs an Update Peer Verifier operation and sends an ACK GSMP adjacency protocol message (step 614) and enters ESTAB state 612.

In addition to GSMP adjacency protocol messages, other types of GSMP messages 546 include GSMP Connection Management (CM) messages, which are request-response messages. In a basic switching unit, switch controller uses GSMP CM messages to establish, delete, modify, and verify virtual channel connections across the ATM switch. GSMP CM messages may be issued regardless of the status of the switch port, and connections may be established or deleted when a switch port is up, down or otherwise unavailable. Connection Management messages include: Add Branch, Delete Branch, Delete Tree, Verify Tree, Delete All, Move Root, and Move Branch. As mentioned earlier, a virtual channel connection is unidirectional and includes an input virtual channel and at least one output virtual channel or branch. That is, a unicast virtual connection has one output branch, and a multicast virtual connection has two or more output branches.

The Add Branch message is a GSMP CM message used to establish a virtual channel connection or to add an additional branch to an existing virtual channel connection. In present embodiment, no distinction is made between unicast and multicast connections. A first Add Branch message for a particular Input Port, Input VPI, and Input VCI establishes a unicast connection. A second Add Branch message with the same Input Port, Input VPI, and Input VCI converts the unicast connection to a multicast connection by adding another output branch. Other output branches may be added in the same manner with further Add Branch messages. Also, an Add Branch message may be used to check the connection state stored in the ATM switch. The Delete Branch message is a GSMP CM message used to delete a single branch of a virtual channel connection. For example, use of Delete Branch message on a multicast virtual channel connection with two branches removes a branch converting the multicast connection into a unicast connection. The Delete Branch message may also be used to delete a connection by deleting the last branch in a virtual channel connection. Another GSMP CM message, the Delete Tree message is used to delete an entire virtual connection by deleting all remaining branches of the connection. The Verify Tree message is a GSMP CM message used to verify the number of branches on a virtual channel connection. The Delete All message is a GSMP CM message that is used to delete all connections on a switch input port. The Move Root message is a GSMP CM message used to move an entire virtual connection tree from its current Input Port, Input VPI, and Input VCI, to a new Input Port, Input VPI and Input VCI. Another GSMP CM message, the Move Branch message is used to move a single output branch of a virtual channel connection from its current Output Port, Output VPI, and output VCI, to a new Output Port, Output VPI, and Output VCI on the same virtual channel connection.

Figure 12:
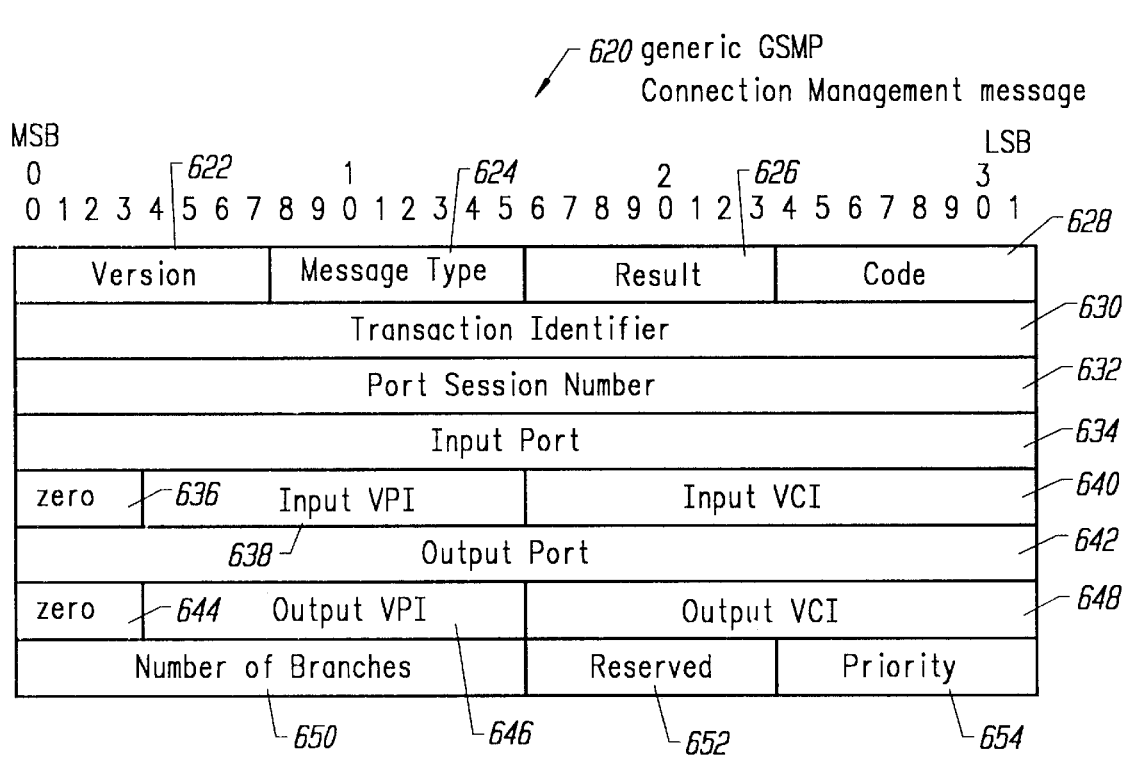
FIG. 12 illustrates the format of a generic GSMP Connection Management message.

FIG. 12 illustrates the structure for generic GSMP CM message 620, used as both request and response for Add Branch, Delete Branch, Delete Tree, Verify Tree, and Delete All messages. Generic GSMP CM message 620 may be contained in GSMP Message field 546 of the encapsulated GSMP packet 540 in FIG. 11a. As seen in FIG. 12, generic GSMP CM message 620 includes (described in order of MSB to LSB) the following fields: an 8-bit Version field 622, an 8-bit Message Type field 624, an 8-bit Result field 626, and an 8-bit Code field 628; 32-bit word Transaction Identifier field 630; 32-bit word Port Session Number field 632; 32-bit word Input Port field 634; 32bit word Input Label field that includes 4-bit word 636 set to zero, 12-bit Input VPI field 638, and 16-bit Input VCI field 640; 32-bit word Output Port field 642; 32-bit word Output Label field 644 that includes 8-bit word 644 set to zero, 12-bit Output VPI field 646, and 16-bit Output VCI field 648; 16-bit Number of Branches field 650; 8-bit Reserved field 652; and 8-bit Priority field 654.

Except for GSMP adjacency protocol messages, all GSMP messages include the Version field 622, Message Type field 624, Result field 626, Code field 628, and Transaction Identifier field 630, which are used generally in the same manner. For example, Version field 622 in a GSMP message specifies the version of the GSMP protocol which is currently in use (as other versions may evolve). Message Type field 624 is set to a particular value to specify the GSMP message type. For example, a GSMP CM Add Branch message is assigned a specific value for Message Type field 624, and other types of messages are assigned other specific values.

For a GSMP message that is a request message, Result field 626 indicates whether a response is required to the request message when the outcome is successful. Result field 626 in a request message may contain values for NoSuccessAck (indicating no response required if outcome successful) or AckAll (indicating response required if outcome successful). For some types of GSMP request messages, AckAll is the default and a NoSuccessAck value in Result field 626 is ignored. For a GSMP message that is a response message, Result field 626 may contain values for Success (indicating that the request was successful) or Failure (indicating that the request was not successful). A GSMP success response message is not sent until the request has been successfully completed. A GSMP success response message is a copy of the corresponding GSMP request message returned with a Result field 626 indicating Success. For a GSMP request message that does not have a successful outcome, a GSMP failure response message is generated. A GSMP failure response message is a copy of the corresponding GSMP request message returned with Result field 626 indicating Failure. A switch issuing a GSMP failure response message in response to the failed outcome of a GSMP request message does not modify the connection state within the switch.

In a GSMP response message, Code field 628 provides further information concerning the result. For example, the Code field 628 in a GSMP failure response message may contain an error code specifying the type of error causing the failure. It is recognized that a variety of different codes, failure or other types, may be defined for use in Code field 628. Examples of failure codes that may be defined include: failure specific to the particular message type, unspecified reason not covered by other failure codes, invalid request message, specified request message not implemented on this switch, invalid port session number, at least one specified port does not exist, at least one specified port is down, at least one specified VPI/VCI is out of range on at least one specified port, the specified connection does not exist, the specified output branch does not exist, specified output branch already established for the specified multicast connection on the specified output port, reached the maximum limit of multicast connections supported by switch, reached the maximum limit of branches that the specified multicast connection can support, or general problem relating to multicast capability supported by switch. Of course, other codes may be provided. In addition, Code field 628 may provide further information in a successful response message or an Event message. Code field 628 is not used in GSMP request messages and is set to zero.

Transaction Identifier field 630 is used to associate a GSMP request message with its GSMP response message. In a GSMP request message, the switch controller selects any transaction identifier value for field 630. In a GSMP response message, the value of Transaction Identifier field 630 is set to the value of the transaction identifier from the GSMP request message to which the GSMP response message is responding. Since a GSMP Event message does not require a response, Transaction Identifier field 630 is set to zero.

It is recognized that the above general description of Version, Message Type, Result, Code, and Transaction Identifier fields applies to all GSMP messages, except GSMP adjacency protocol messages. Differences from the general description are described when appropriate.

For GSMP CM messages, Port Session Number field 632 provides the session number of the input port. In particular, the value in Port Session Number field 632 gives the port session number of the switch input port indicated in Input Port field 634. Each switch port maintains a port session number that is assigned by the switch. The port session number remains unchanged while the port is continuously up. However, a new and different port session number is generated after a port is up after being down or unavailable. It is preferred that the new port session number be randomly selected. If the switch controller sends a GSMP CM request message that has an invalid value in Port Session Number field 632, then the switch rejects the GSMP CM request message by sending a GSMP CM failure response message with Code field 628 indicating an invalid port session number causing the failure. A current port session number may be obtained using a GSMP Configuration message.

In a GSMP CM message, Input Port field 634 indicates a switch input port using a 32-bit value assigned by the switch. Input VPI field 638 identifies an ATM virtual path arriving at the switch input port indicated in the Input Port field 634, and Input VCI field 640 identifies an ATM virtual channel arriving on that virtual path identified in Input VPI field 638.

In a GSMP CM message, Output Port field 642 indicates a switch output port using a 32-bit value assigned by the switch. Output VPI field 646 identifies an ATM virtual path departing from the switch output port indicated in the Output Port field 642, and Output VCI field 648 identifies an ATM virtual channel departing on that virtual path identified in Output VPI field 646.

For a GSMP CM message, Number of Branches field 650 gives the number of output branches on a virtual channel connection. Field 650 is used in a GSMP CM Verify Tree message. For all other GSMP CM messages, field 650 is set to zero by the sender entity and ignored by the receiver entity. In the present embodiment, Reserved field 652 which is not used for GSMP CM messages is set to zero by the sender entity and ignored by the receiver entity.

Priority field 654 in a GSMP CM message gives the priority of the connection. The highest priority is numbered zero and the lowest priority is numbered q–1, where q=number of priorities that the switch output port can support. The q for each switch output port may be obtained from the GSMP Port Configuration message. Each virtual channel connection may be established with a certain quality of service (QOS), by assigning it a priority when it is established. For virtual channel connections that share the same output port, an ATM cell on a connection with a higher priority would be more likely to depart the switch than an ATM cell on a connection with a lower priority, if they are both in the switch at the same time. Priority field 654 is used in GSMP CM Add Branch and Move Branch messages. If a GSMP CM request message (for either Add Branch or Move Branch) has a value in Priority field 654 that the switch does not support, the switch instead assigns the closest priority that it is capable of supporting. In the other GSMP CM messages, Priority field 654 is set to zero by the sender entity and ignored by the receiver entity.

Figure 13A:
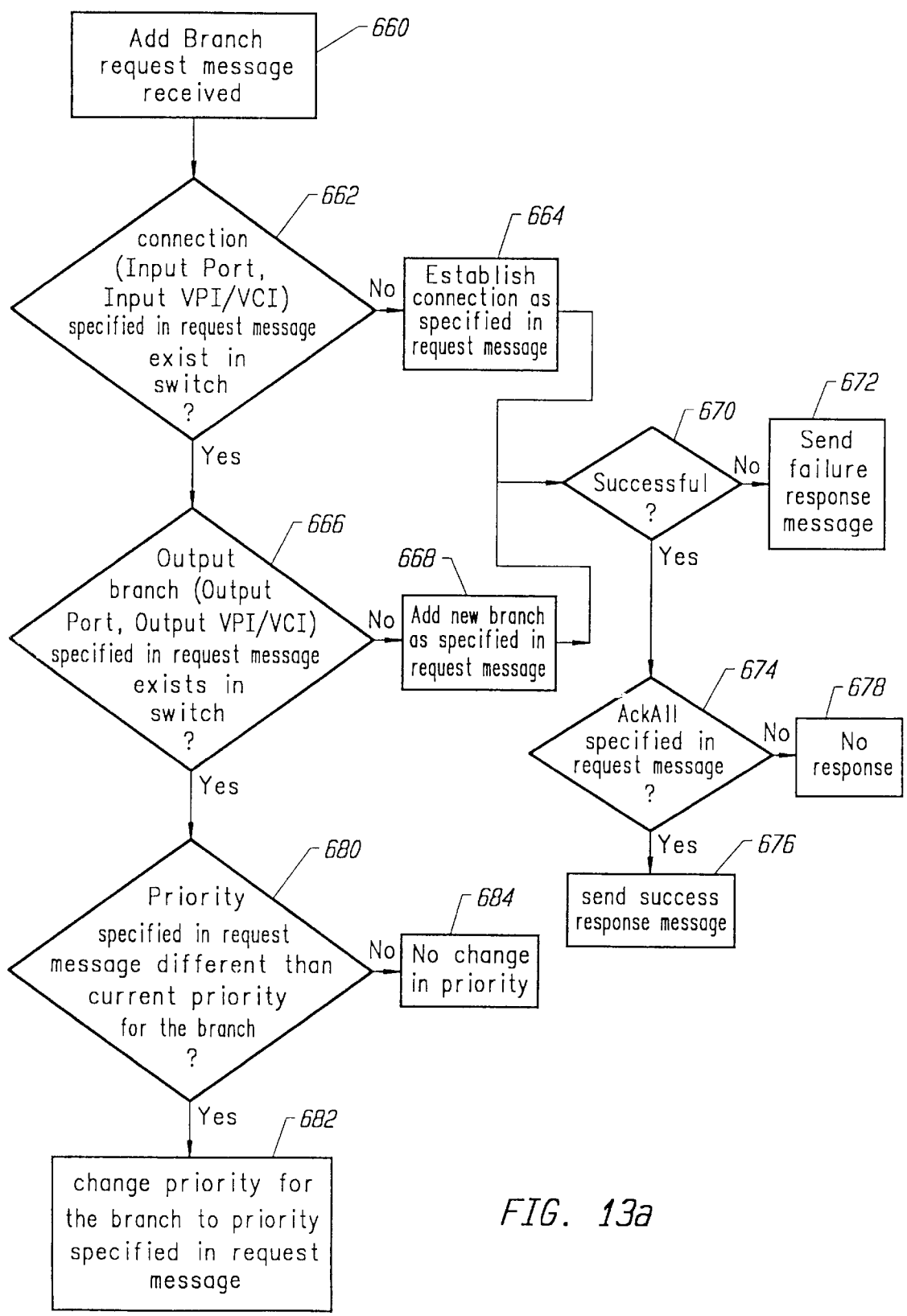
FIGS. 13a–13e are simplified diagrams illustrating the operation of a receiver entity upon receiving GSMP Connection Management Add Branch, Delete Branch, Delete Tree, Verify Tree, and Delete All messages respectively.

The Add Branch message is a GSMP CM message used to establish a virtual channel connection or to add an additional branch to an existing virtual channel connection. The connection is specified by Input Port field 634, Input VPI field 638, and Input VCI field 640, and the output branch is specified by Output Port field 642, Output VPI field 646, and Output VCI field 648, with the priority of the connection specified by Priority field 654. Also, an Add Branch message may be used to check the connection state stored in the ATM switch. FIG. 13a is a general diagram illustrating the operation of the ATM switch that receives a GSMP Add Branch request message from switch controller. At step 660, switch controller sends a GSMP Add Branch request message that is received by the ATM switch. The ATM switch determines whether the virtual channel connection, as specified in Input Port field 634, Input VPI field 638, and Input VCI field 640 of the received Add Branch request message, exists in the switch, at a step 662. If the switch determines at step 662 that the virtual channel connection does not exist, the ATM switch at step 664 proceeds to establish the connection as specified in the Add Branch request message. If the switch determines at step 662 that the virtual channel connection does exist, then the switch determines at step 666 whether the output branch, as specified by Output Port field 642, Output VPI field 646, and Output VCI field 648 of the received Add Branch request message, exists in the switch. If it is determined that the output branch does not exist, then the ATM switch proceeds to add a new output branch as specified in the Add Branch request message in step 668. After either steps 664 or 668, the switch determines at step 670 whether the operation was successful. If the operation was not successful, the ATM switch at step 672 sends to the switch controller an Add Branch response message that is a copy of the received Add Branch request message with Result field 626 indicating Failure. The Add Branch response message also may specify the type of failure with the appropriate failure code in its Code field 628. If the operation is determined at step 670 to be successfully completed, the ATM switch at step 674 checks Result field 626 of the Add Branch request message to determine whether a response is required when the request is successful. If the Result field of the request message indicates AckAll, the ATM switch sends a success response to the switch controller in step 676. The Add Branch success response message is a copy of the received Add Branch request message with Result field 626 indicating Success. If the switch determines at step 666 that the output branch specified in the Add Branch request message already exists, then the switch checks in step 680 whether the priority specified in Priority field 654 of the request message is different from the current priority of the output branch. If the switch determines that the requested priority is different than the current priority, the switch changes the priority of the output branch to that specified by the Add Branch request message in step 682. If the priorities are the same, the switch does not change the priority (indicated by 684).

Figure 13B:
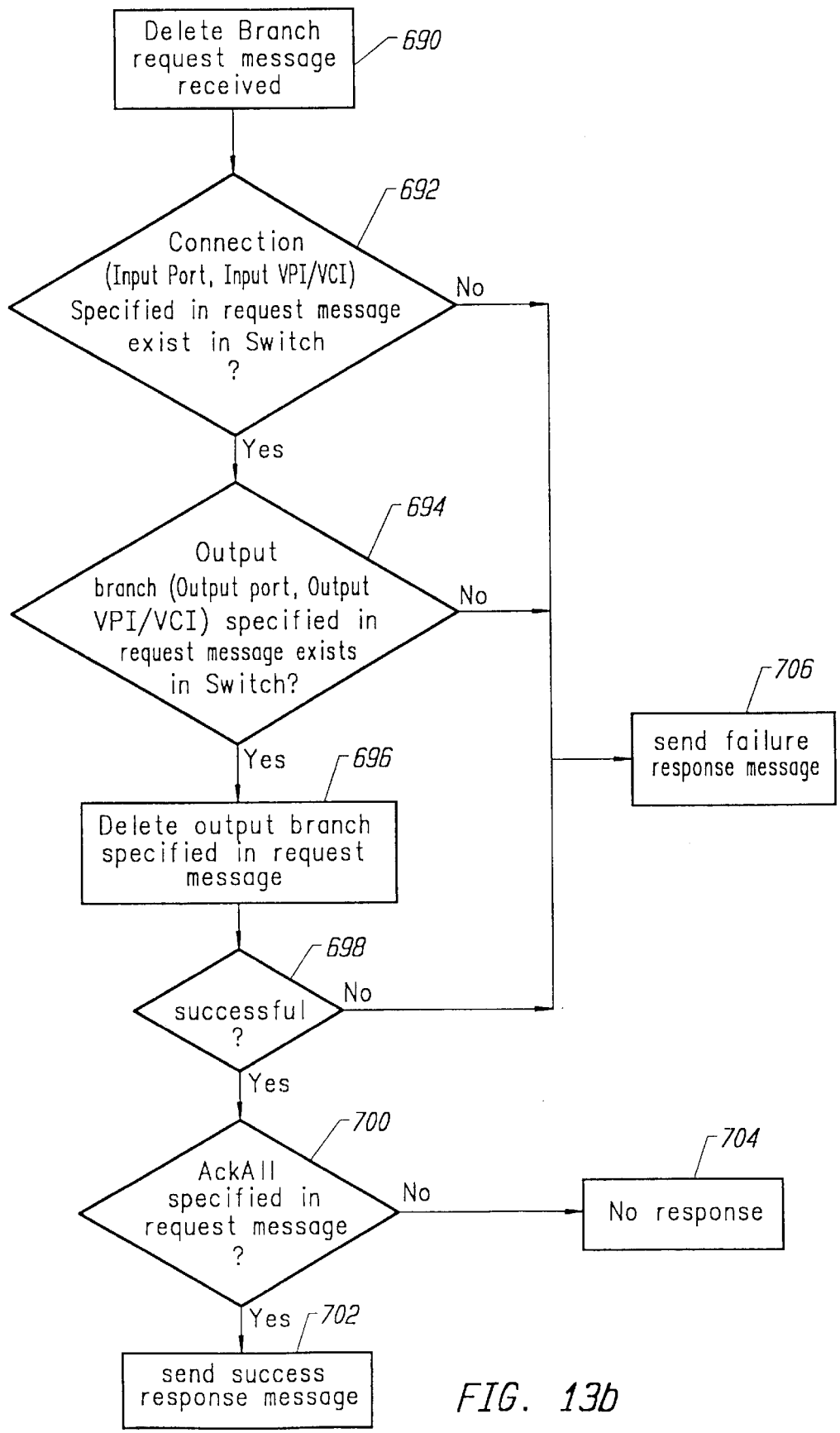

The Delete Branch message is a GSMP CM message used to delete a single branch of a virtual channel connection, or in the case of the last branch to delete the connection. The connection is specified by Input Port field 634, Input VPI field 638, and Input VCI field 640, and the output branch is specified by Output Port field 642, Output VPI field 646, and Output VCI field 648. FIG. 13b is a general diagram illustrating the operation of the ATM switch that receives a GSMP Delete Branch request message from switch controller. At step 690, switch controller sends a GSMP Delete Branch request message that is received by the ATM switch. The ATM switch determines whether the virtual channel connection, as specified in Input Port field 634, Input VPI field 638, and Input VCI field 640 of the received Delete Branch request message, exists in the switch, at a step 692. If the switch determines at step 692 that the virtual channel connection does exist, the switch at step 694 determines whether the output branch, as specified by Output Port field 642, Output VPI field 646, and Output VCI field 648 of the received Delete Branch request message, exists in the switch. If it is determined that the output branch does exist, then the switch proceeds to delete the output branch as specified in the Delete Branch request message in step 696. After step 696, the switch determines at step 698 whether the deletion operation was successful. If the deletion is determined to be successfully completed, the switch at step 700 determines from Result field 626 of the Delete Branch request message whether a response is required when the request is successful. If the Result field of the request message indicates AckAll (success response required), the switch sends a Delete Branch success response message to the switch controller in step 702. The Delete Branch success response message is a copy of the received Delete Branch request message with Result field 626 indicating Success. If it is determined at step 700 that a success response is not required, then the switch provides no response (indicated as 704). If the switch determines at step 692 that the connection specified in the Delete Branch request message does not exist, or if the switch determines at step 694 that the output branch specified in the Delete Branch request message does not exist, or if the switch determines at step 698 that the deletion operation is unsuccessful, then the switch at step 706 sends a Delete Branch failure response message to the switch controller with the appropriate failure code. A Delete Branch failure response message is a copy of the received Delete Branch request message with Result field 626 indicating Failure and with the type of failure indicated by the appropriate failure code in its Code field 628.

Figure 13C:
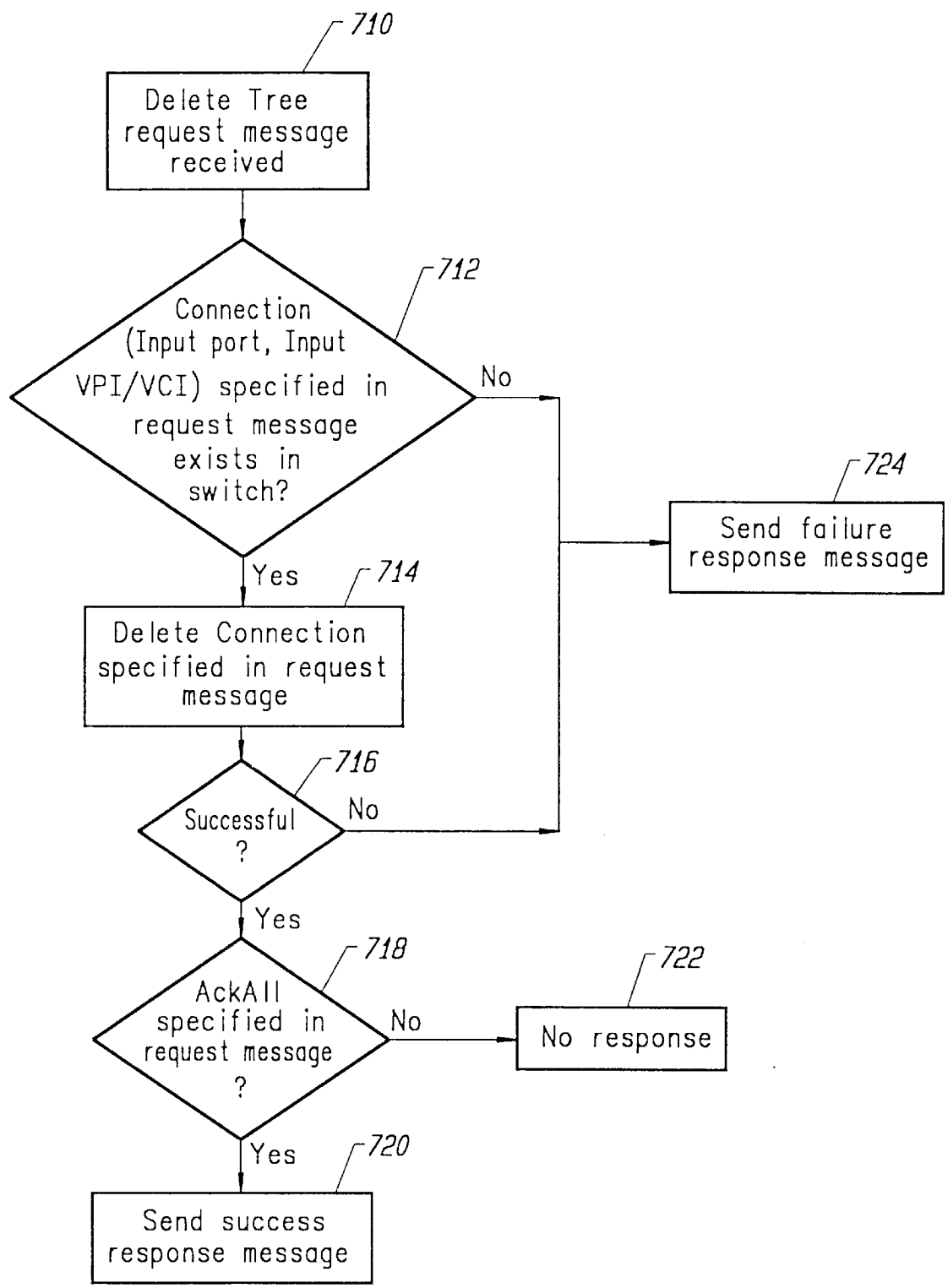

The Delete Tree message is used to delete an entire virtual channel connection by deleting all remaining branches of the connection. The connection is specified by Input Port field 634, Input VPI field 638, and Input VCI field 640. Output Port field 642, Output VPI field 646, and Output VCI field 648 in a Delete Tree message are not used, and are set to zero by the switch controller and ignored by the switch. FIG. 13c is a general diagram illustrating the operation of an ATM switch that receives a GSMP Delete Tree request message from switch controller. At step 710, switch controller sends a GSMP Delete Tree request message that is received by the ATM switch. The ATM switch determines whether the virtual channel connection, as specified in Input Port field 634, Input VPI field 638, and Input VCI field 640 of the received Delete Tree request message, exists in the switch, at a step 712. If the switch determines at step 712 that the virtual channel connection does exist, then the switch proceeds to delete the connection (and thereby the entire tree) as specified in the Delete Tree request message in step 714. After step 714, the switch determines at step 716 whether the deletion operation was successful. If the deletion is determined to be successfully completed, the switch at step 718 determines from Result field 626 of the Delete Tree request message whether a response is required when the request is successful. If the Result field of the request message indicates AckAll (success response required), the switch sends a Delete Tree success response message to the switch controller in step 720. The Delete Tree success response message is a copy of the received Delete Tree request message with Result field 626 indicating Success. If it is determined at step 716 that a success response is not required, then the switch has no response (indicated as 722). If the switch determines at step 712 that the connection specified in the Delete Tree request message does not exist, or if the switch determines at step 716 that the deletion operation is unsuccessful, then the switch at step 724 sends a Delete Tree failure response message to the switch controller with the appropriate failure code. A Delete Tree failure response message is a copy of the received Delete Tree request message with Result field 626 indicating Failure and with the type of failure indicated by the appropriate failure code in its Code field 628.

Figure 13D:
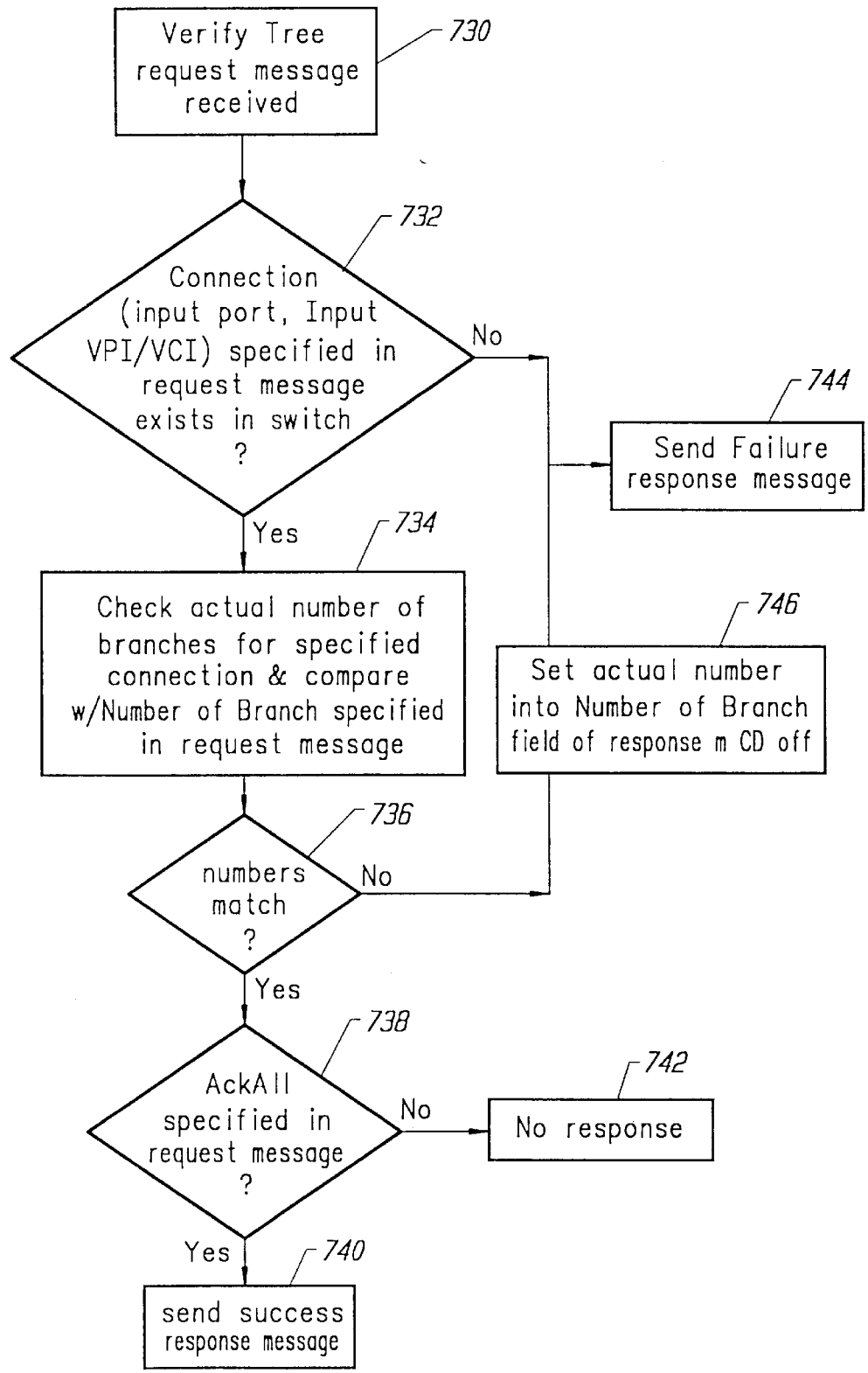

The Verify Tree message is a GSMP CM message used to verify the number of branches on a virtual channel connection. The connection is specified by Input Port field 634, Input VPI field 638, and Input VCI field 640. Output Port field 642, Output VPI field 646, and Output VCI field 648 in a Verify Tree message are not used, and are set to zero by the switch controller and ignored by the switch. The number of branches that the switch believes the specified virtual channel connection should contain is given by Number of Branches field 650 in the Verify Tree request message. FIG. 13d is a general diagram illustrating the operation of an ATM switch that receives a GSMP Verify Tree request message from switch controller. At step 730, switch controller sends a GSMP Verify Tree request message that is received by the ATM switch. The ATM switch determines whether the virtual channel connection, as specified in Input Port field 634, Input VPI field 638, and Input VCI field 640 of the received Verify Tree request message, exists in the switch, at a step 732. If the switch determines at step 732 that the virtual channel connection does exist, then the switch at step 734 checks the actual number of branches for the specified connection and compares the actual number with that in Number of Branches field 650 of the received Verify Tree request message. If the switch determines at step 736 that the numbers match then the verification operation was successful. If the verification is determined to be successfully completed, the switch at step 738 determines from Result field 626 of the Verify Tree request message whether a response is required when the request is successful. If the Result field of the request message indicates AckAll (success response required), the switch sends a Verify Tree success response message to the switch controller in step 740. The Verify Tree success response message is a copy of the received Verify Tree request message with Result field 626 indicating Success. If it is determined at step 738 that a success response is not required, then the switch has no response (indicated as 742). If the switch determines at step 732 that the connection specified in the Verify Tree request message does not exist, then the switch at step 744 sends a Verify Tree failure response message to the switch controller with the appropriate failure code. A Verify Tree failure response message is a copy of the received Verify Tree request message with Result field 626 indicating Failure and with the type of failure indicated by the appropriate failure code in its Code field 628. If the switch determines at step 736 that the verification operation is unsuccessful, then the switch at step 746 sets the actual number of branches into the Number of Branches field 650 of the Verify Tree failure response message and sends it to the switch controller with the Code field 628 set to zero.

Figure 13E:
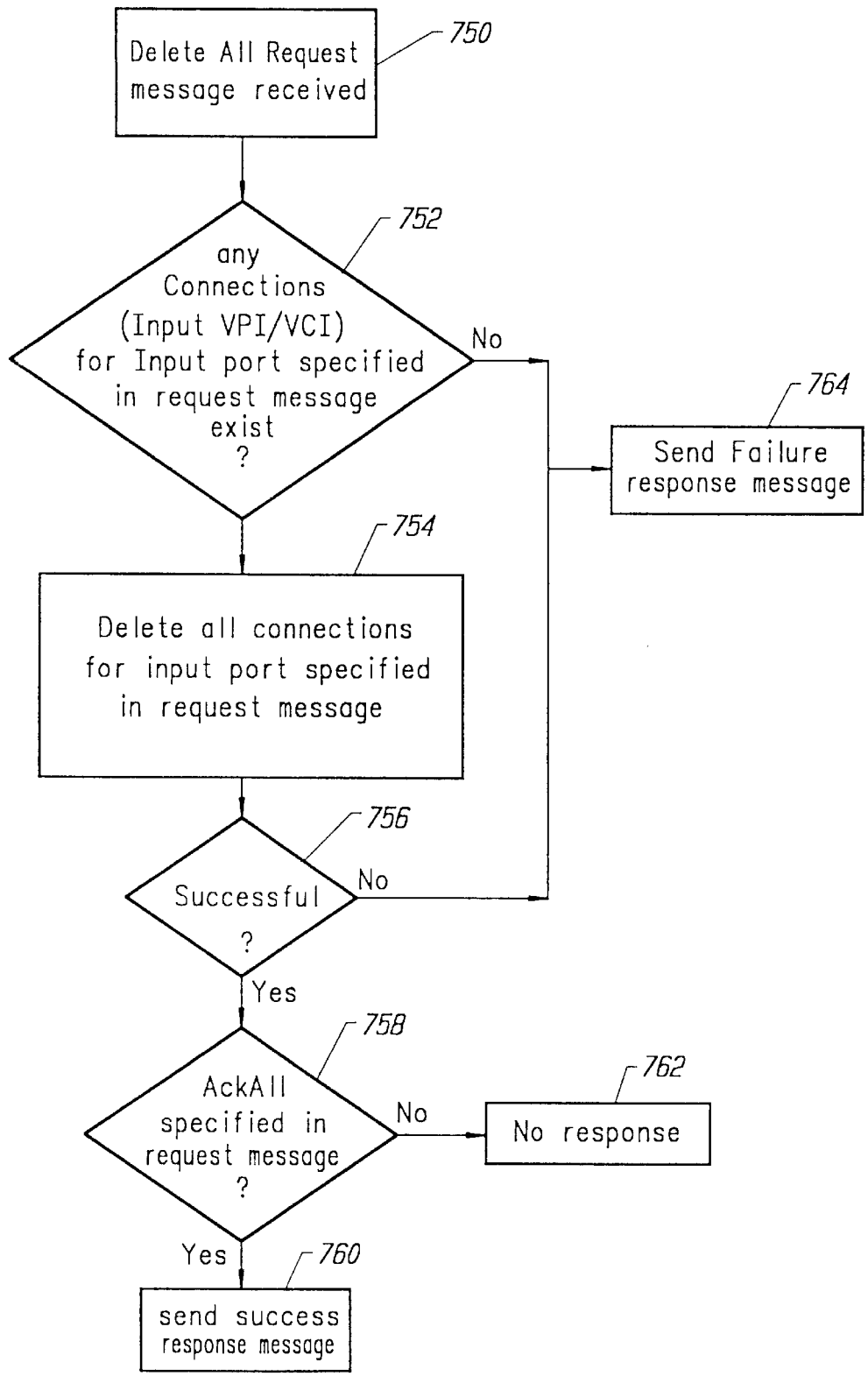

The Delete All message is a GSMP CM message that is used to delete all connections on a switch input port. The switch input port is specified by Input Port field 634. In a Delete All message, Input VPI field 638, and Input VCI field 640, Output Port field 642, Output VPI field 646, and Output VCI field 648 are not used, and are set to zero by the switch controller and ignored by the switch. FIG. 13e is a general diagram illustrating the operation of an ATM switch that receives a GSMP Delete All request message from switch controller. At step 750, switch controller sends a GSMP Delete All request message that is received by the ATM switch. In step 752, the ATM switch determines whether any connections exist on the switch input port specified in Input Port field 634 of the received Delete All request message. If the switch determines at step 752 that connections do exist, then the switch at step 754 proceeds to delete all connections for the switch input port specified in the received Delete All request message. Then the switch determines at step 756 that the complete deletion operation was successful. If the operation is determined to be successfully completed, the switch at step 758 determines from Result field 626 of the Delete All request message whether a response is required when the request is successful. If the Result field of the request message indicates AckAll (success response required), the switch sends a Delete All success response message to the switch controller in step 760. The Delete All success response message is a copy of the received Delete All request message with Result field 626 indicating Success. If it is determined at step 758 that a success response is not required, then the switch has no response (indicated as 762). If the switch determines at step 752 that no connections exist on the switch input port specified in the Delete All request message, then the switch at step 764 sends a Delete All failure response message to the switch controller with the appropriate failure code. A Delete All failure response message is a copy of the received Delete All request message with Result field 626 indicating Failure and with the type of failure indicated by the appropriate failure code in its Code field 628.

Figure 13F:
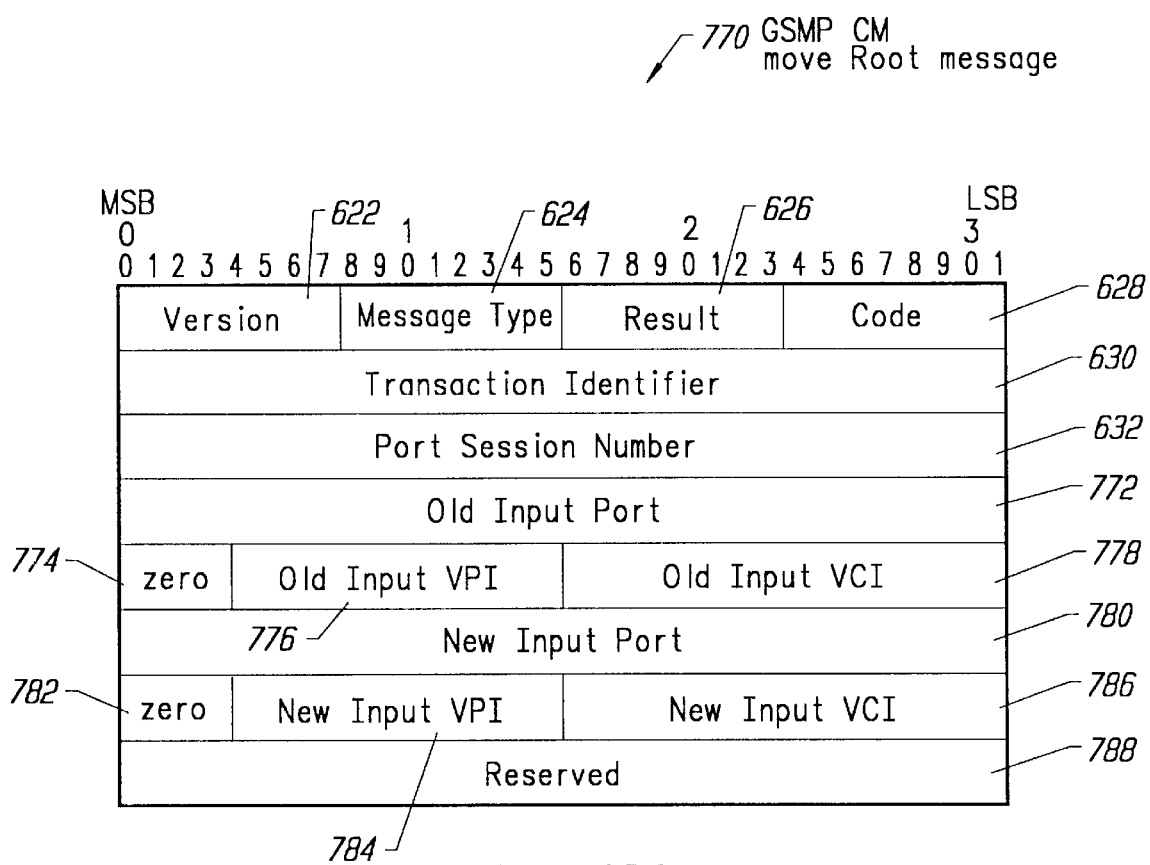
FIG. 13f illustrates the format of a GSMP Connection Management Move Root message.
Figure 13G:
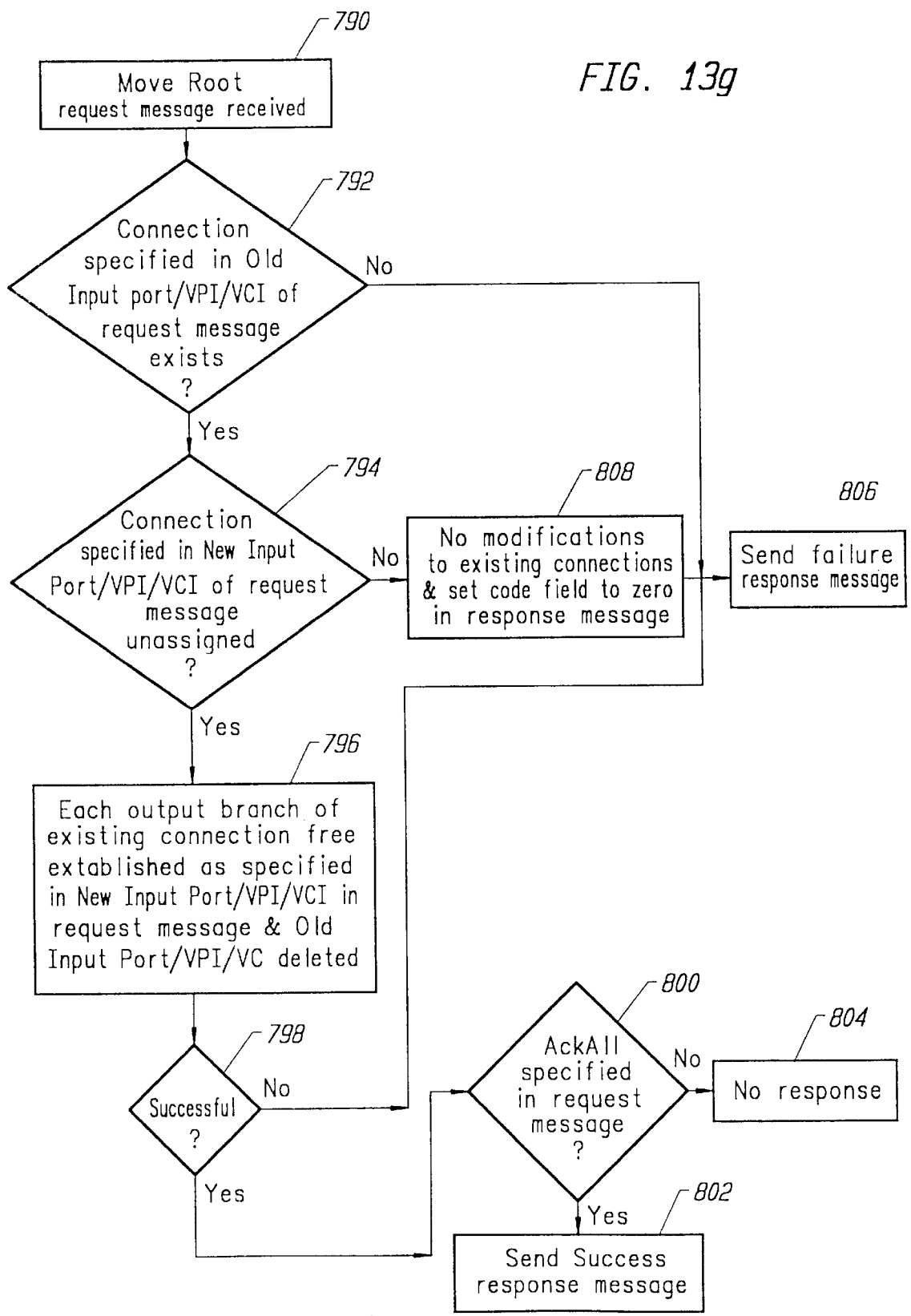
FIG. 13g is a simplified diagram illustrating the operation of a sender entity upon receiving a packet with an incoming GSMP Connection Management Move Root message.

The Move Root message is a GSMP CM message used to move an entire virtual connection tree from its current Input Port, Input VPI, and Input VCI, to a new Input Port, Input VPI and Input VCI. FIG. 13f illustrates the structure for GSMP CM Move Root message 770, used as both request and response. GSMP CM Move Root message 770 includes (described in order of MSB to LSB) the following fields: an 8-bit Version field 622, an 8-bit Message Type field 624, an 8-bit Result field 626, and an 8-bit Code field 628; 32-bit word Transaction Identifier field 630; 32-bit word Port Session Number field 632; 32-bit Old Input Port field 772; 4-bit word 774 set to zero, 12-bit Old Input VPI field 776, and 16-bit Old Input VCI field 778; 32-bit New Input Port field 780; 8-bit word 782 set to zero, 12-bit New Input VPI field 784, and 16-bit New Input VCI field 786; and 32-bit Reserved field 788. Version field 622, Message Type field 624, Result field 626, Code field 628, Transaction Identifier field 630, and Port Session Number 632 are used generally in the same manner as for other GSMP CM messages, as discussed earlier. Reserved field 788 is unused and set to zero by the sender and ignored by the receiver. In a Move Root message, the current virtual channel connection is specified by Old Input Port field 772, Old Input VPI field 776, and Old Input VCI field 778, and the new virtual channel connection is specified by New Input Port field 780, New Input VPI field 784, and New Input VCI field 786. FIG. 13g is a general diagram illustrating the operation of the ATM switch that receives a GSMP Move Root request message from switch controller. At step 790, switch controller sends a GSMP Move Root request message that is received by the switch. The switch determines whether the virtual channel connection, as specified in Old Input Port field 772, Old Input VPI field 776, and Old Input VCI field 778 of the received Move Root request message, exists in the switch, at a step 792. If the switch determines at step 792 that the virtual channel connection does exist, the switch at step 794 determines whether the virtual channel connection, as specified by New Input Port field 780, New Input VPI field 784, and New Input VCI field 786 of the received Move Root request message, is unassigned. If it is determined at step 794 that the virtual channel connection is unassigned, then the switch proceeds to move each output branch of the existing virtual channel connection to establish the new virtual channel connection as specified in the Move Root request message in step 796. After step 796, the switch determines at step 798 whether the move operation was successful. If the operation is determined to be successfully completed, the switch at step 800 determines from Result field 626 of the Move Root request message whether a response is required when the request is successful. If the Result field of the request message indicates AckAll (success response required), the switch sends a Move Root success response message to the switch controller in step 802. The Move Root success response message is a copy of the received Move Root request message with Result field 626 indicating Success. If it is determined at step 800 that a success response is not required, then the switch provides no response (indicated as 804). If the switch determines at step 792 that the old connection specified in the Move Root request message does not exist, then the switch at step 806 sends a Move Root failure response message to the switch controller with the appropriate failure code. A Move Root failure response message is a copy of the received Move Root request message with Result field 626 indicating Failure and with the type of failure indicated by the appropriate failure code in its Code field 628. If the switch determines at step 794 that the new virtual channel connection specified in the Move Root request message is assigned, then the switch makes no modifications to the existing connections and sets Code field 628 to zero in the Move Root failure response message (indicated at step 808) before sending it to switch controller at step 806.

Figure 13H:
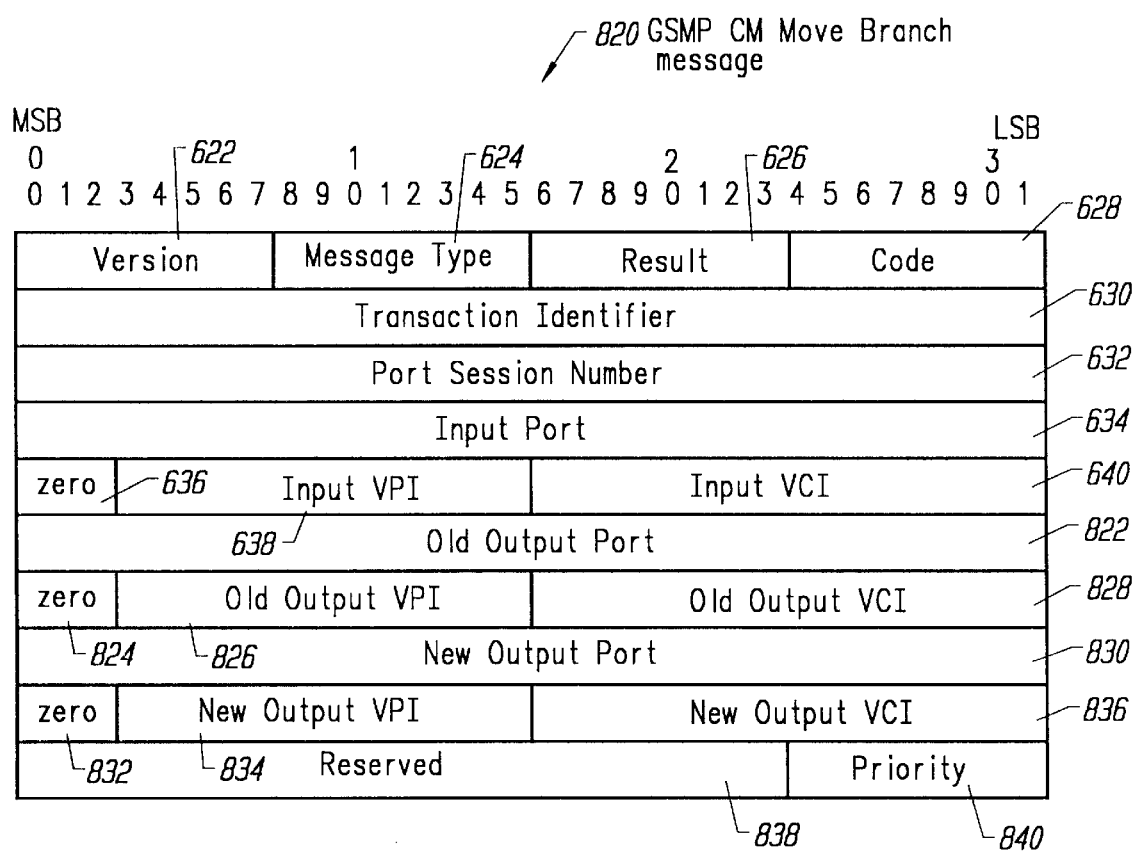
FIG. 13h illustrates the format of a GSMP Connection Management Move Branch message.
Figure 13I:
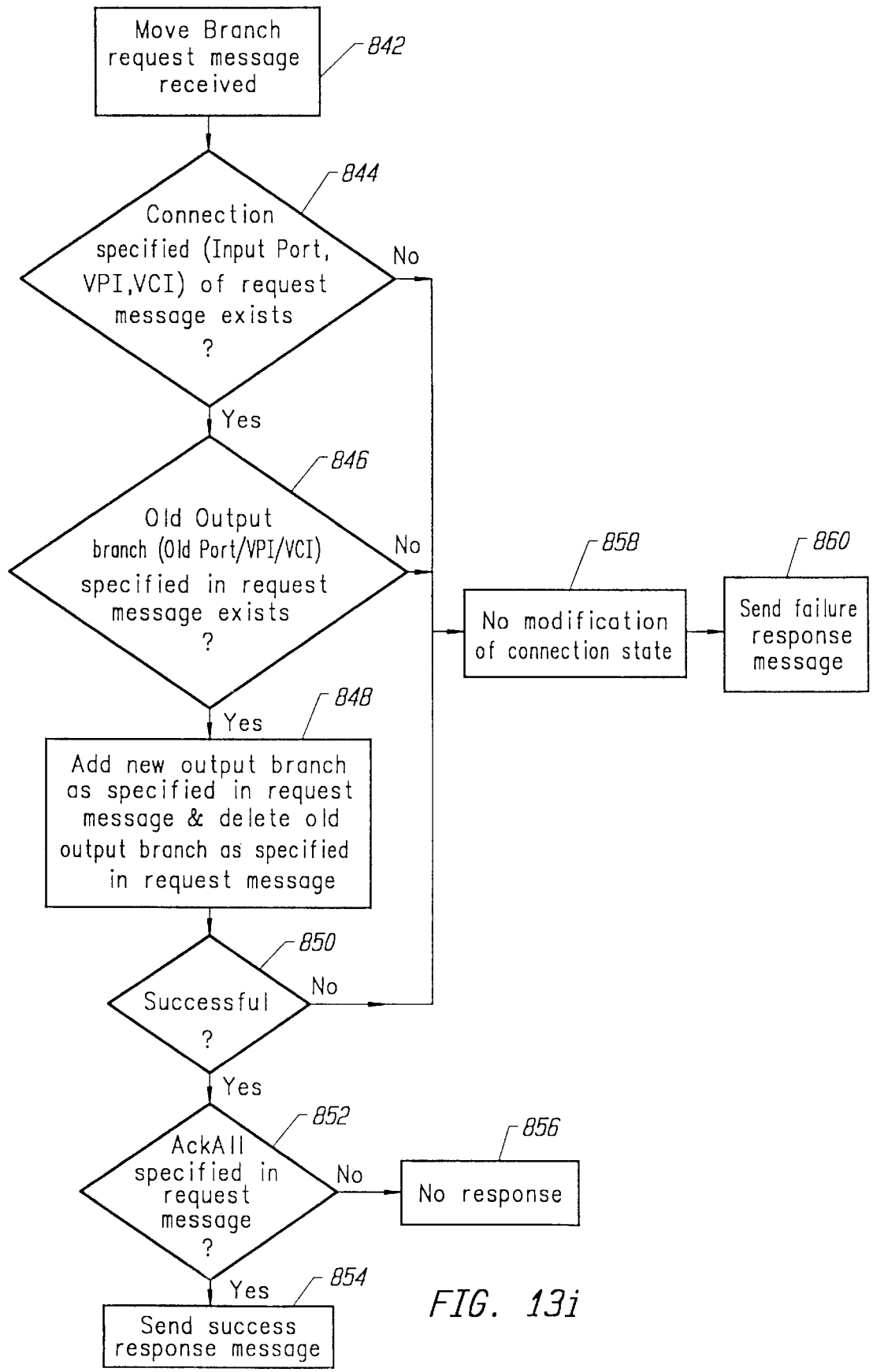
FIG. 13i is a simplified diagram illustrating the operation of a sender entity upon receiving a packet with an incoming GSMP Connection Management Move Branch message.

Another GSMP CM message, the Move Branch message is used to move a single output branch of a virtual channel connection from its current Output Port, Output VPI, and output VCI, to a new Output Port, Output VPI, and Output VCI on the same virtual channel connection. FIG. 13h illustrates the structure for GSMP CM Move Branch message 820, used as both request and response. GSMP CM Move Branch message 820 includes (described in order of MSB to LSB) the following fields: an 8-bit Version field 622, an 8-bit Message Type field 624, an 8-bit Result field 626, and an 8-bit Code field 628; 32-bit word Transaction Identifier field 630; 32-bit word Port Session Number field 632; 32-bit Input Port field 634; 4-bit word 636 set to zero, 12-bit Input VPI field 638, and 16-bit Input VCI field 640; 32-bit Old Output Port field 822; 8-bit word 824 set to zero, 12-bit Old Output VPI field 826, and 16-bit Old Output VCI field 828; 32-bit New Output Port field 830; 8-bit word 832 set to zero, 12-bit New Output VPI field 834, and 16-bit New Output VCI field 836; 24-bit Reserved field 838; and Priority field 940. Version field 622, Message Type field 624, Result field 626, Code field 628, Transaction Identifier field 630, and Port Session Number 632 are used generally in the same manner as for other GSMP CM messages, as discussed earlier. Reserved field 838 is unused and set to zero by the sender and ignored by the receiver. Priority field 940 is used in a similar manner as discussed above for Priority field 654 of a GSMP CM message. In a Move Branch message, the virtual channel connection is specified by Input Port field 634, Input VPI field 638, and Input VCI field 640. The old branch of the virtual channel connection is specified by Old Output Port field 822, Old Output VPI field 826, and Old Output VCI field 828. The new branch of the virtual channel connection is specified by New Output Port field 830, New Output VPI field 834, and New Output VCI field 836. FIG. 13i is a general diagram illustrating the operation of the ATM switch that receives a GSMP Move Branch request message from switch controller. At step 842, switch controller sends a GSMP Move Branch request message that is received by the switch. The switch determines whether the virtual channel connection, as specified in Input Port field 634, Input VPI field 638, and Input VCI field 640 of the received Move Branch request message, exists in the switch, at a step 844. If the switch determines at step 844 that the virtual channel connection does exist, the switch at step 846 determines whether the old output branch, as specified by Old Output Port field 822, Old Output VPI field 826, and Old Output VCI field 828 of the received Move Branch request message, exists on that virtual channel connection. If it is determined at step 846 that the old output branch exists, then the switch proceeds to add the new output branch as specified by New Output Port field 830, New Output VPI field 834, and New Output VCI field 836 in the Move Branch request message and delete the old output branch as specified in the Move Branch request message in step 848. After step 848, the switch determines at step 850 whether the move operation was successful. If the operation is determined to be successfully completed, the switch at step 852 determines from Result field 626 of the Move Branch request message whether a response is required when the request is successful. If the Result field of the request message indicates AckAll (success response required), the switch sends a Move Branch success response message to the switch controller in step 854. The Move Branch success response message is a copy of the received Move Branch request message with Result field 626 indicating Success. If it is determined at step 852 that a success response is not required, then the switch provides no response (indicated as 856). If the switch determines at step 844 that the virtual channel connection specified in the Move Branch request message does not exist, or if the switch determines at step 846 that the old branch specified in the Move Branch request message does not exist on the virtual channel connection, or if the switch determines at step 850 that the move branch operation was unsuccessful, then the switch at step 858 does not modify any connection states and sends at step 860 a Move Branch failure response message to the switch controller with the appropriate failure code. A Move Branch failure response message is a copy of the received Move Branch request message with Result field 626 indicating Failure and with the type of failure indicated by the appropriate failure code in its Code field 628.

Figure 14:
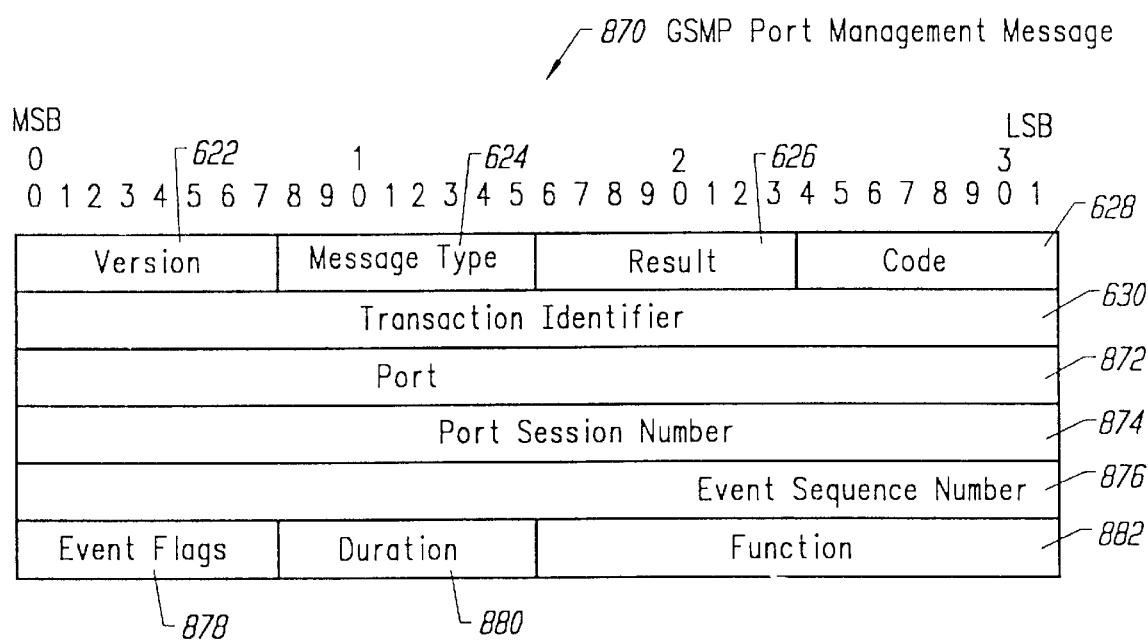
FIG. 14 illustrates the format of a GSMP Port Management message.

Providing switch port management, the GSMP Port Management (PM) message allows a port to be brought into service, taken out of service, looped back, or reset. FIG. 14 illustrates the structure for a GSMP PM message 870, used as both request and response messages. GSMP PM message 870 may be contained in GSMP Message field 546 of the encapsulated GSMP packet 540 in FIG. 11a. As seen in FIG. 14, GSMP PM message 870 includes (described in order of MSB to LSB) the following fields: an 8-bit Version field 622, an 8-bit Message Type field 624, an 8-bit Result field 626, and an 8-bit Code field 628; 32-bit word Transaction Identifier field 630; 32-bit word Port field 872; 32-bit word Port Session Number field 874; 32-bit Event Sequence Number field 874; 8-bit Events Flag field 878; 8-bit Duration field 880; and 16-bit Function field 882. Version field 622, Message Type field 624, Result field 626, Code field 628, Transaction Identifier field 630, and Port Session Number 874 are used generally in the same manner as for other GSMP messages, as discussed earlier. Port field 872 gives the port number of the port to which the GSMP PM message applies. A GSMP PM message has a particular Message Type field and various possible functions that may be specified in Function field 882. Some of the functions of GSMP PM messages include: a Bring Up function, a Take Down function, an Internal Loopback function, an External Loopback function, a Bothway Loopback function, a Reset Input Port function, and a Reset Event Flags function. Each switch port maintains an Event Sequence Number and a set of Event Flags (one Event Flag for each type of Event Message). The Event Sequence Number is set to zero when the port is initialized and is incremented each time an asynchronous event reportable by an Event message is detected on that port, regardless of whether the Event message is sent or not. When a switch port sends an Event message, it sets the corresponding Event Flag on that port. The port is not permitted to send another Event message of the same type until the corresponding Event Flag is reset by a Reset Event Flags function of a GSMP PM message. The use of the Event Flags provides simple flow control to prevent the switch from flooding the switch controller with Event messages. In a GSMP PM request message, Event Sequence Number field 876 is not used and is set to zero by the switch controller and ignored by the switch. In a GSMP PM success response message, Event Sequence Number field 876 gives the current value of the Event Sequence Number of the switch port specified in the received GSMP PM request message. In a GSMP PM request message with the Function field 882 specifying Reset Event Flags, particular bits in the Event Flags field 878 may be used to reset the corresponding Event Flags in the switch port specified by the Port field 872. In a GSMP PM success response message with the Function field 882 specifying Reset Event Flags, the bits in Event Flags field 878 are set to the current values of the corresponding Event Flags for the specified port, after the Event Flags specified in the request message have been reset. By setting the Event Flags field to all zeros in a GSMP PM message with a Reset Event Flags function, the switch controller is able to obtain the current state of the Event Flags and the current Event Sequence Number of the specified port without changing the state of the Event Flags. In other GSMP PM messages with a different Function field 882 specified, the Event Flags field 878 is not used and is set to zero by the switch controller and ignored by the switch. Duration field 880 is used only in GSMP PM messages with the Function field 882 specified as Internal Loopback, External Loopback, or Bothway Loopback. Duration field 880 provides the length of time (in seconds) that any of the loopback states remains in operation. When the duration expires, the port which was in loopback automatically returns to service. In GSMP PM messages with a different Function field 882 specified, Duration field 880 is not used and is set to zero by the switch controller and ignored by the switch. In GSMP PM messages, Function field 882 specifies the action to be taken (the specified action is taken regardless of the current status of the port). The Bring Up function brings the port into service, and the Take Down function takes the port out of service. The Internal Loopback function performs an internal loopback (ATM cells arriving at the output port from the switch fabric are looped through to the input port back to the switch fabric). The External Loopback function performs an external loopback (ATM cells arriving at the input port from the external communications link are looped back to the communications link at the physical layer without entering the input port). The Bothway Loopback function performs both internal and external loopback. The Reset Input Port function resets the input port (all connections arriving at the specified input port are deleted and the input and output port hardware are reinitialized so that all VPI/VCI values for the specified input port in the connection table are empty). The Reset Event Flags function resets the Event Flags as discussed above.

GSMP Statistics messages allow the switch controller to request values of various hardware counters associated with the switch input and output ports, and virtual channels. Two classes of statistics messages are provided: VC Activity messages, and Port and VC Statistics messages. The VC Activity message is used to determine whether one or more specific virtual channels have recently been carrying traffic. A VC Activity message contains one or more VC Activity Records. Each VC Activity Record is used to request and return activity information concerning a single specified virtual connection. If a switch supports traffic accounting per virtual connection, the current value of the traffic counter for each specified virtual connection is returned in the VC Traffic Count field of the VC Activity Record. The current value of the traffic count is compared to previous values for each of the specified virtual connections to determine whether each virtual connection has been active in the intervening period. If a switch supports traffic detecting per virtual connection in some other way besides traffic accounting, the result may be indicated for the virtual connection using a Flag field in the VC Activity Record. The Port and VC Statistics messages are used to query the various port and VC specific traffic and error counters. A Port Statistics message is used to get the statistics of the switch port specified in the Port field of the message, and a VC Statistics message is used to get the statistics for the virtual channel (specified in the VPI/VCI fields of the message) on the switch input port specified in the Port field of the message.

GSMP Configuration messages permit the switch controller to determine the capabilities of the ATM switch in basic switching unit. Three message types for GSMP Configuration messages are defined: Switch Configuration, Port Configuration, and All Ports Configuration. GSMP Configuration messages use different formats for the request message and the response message, since they contain different information in their fields. Sent by switch controller to an ATM switch, a Switch Configuration request message, indicated by a particular Message Type field, asks the ATM switch for its global configuration. Then the switch returns to the switch controller a Switch Configuration response message that includes fields for the switch type and switch name of the ATM switch, as well as the version of the switch control firmware installed. The switch type is a allocated by a manufacturer of the switch to identify the switch product, and the switch name may be a 48-bit IEEE 802 MAC address or other quantity that is unique within the operational context of the switch. A Port Configuration request message has its own particular Message Type field and is sent by switch controller to an ATM switch. The Port Configuration request message asks the switch for configuration information of a single switch port that is specified in the Port field of a Port Configuration request message. The switch sends to the switch controller a Port Configuration success response message that includes configuration information for both the input and output sides of the specified port. The configuration information in a Port Configuration success response message includes: the current Port Session Number of the port, the minimum value of VPI that the connection table on the input port that can be supported by GSMP, the maximum value of VPI that the connection table on the input port that can be supported by GSMP, the minimum value of VCI that the connection table on the input port that can be supported by GSMP, and the maximum value of VCI that the connection table on the input port that can be supported by GSMP. The configuration information also includes: the cell rate (rate of ATM cells per second) of the port, the current status (i.e., down, up, unavailable, internal loopback, external loopback, or bothway loopback) of the port; the port type (the type of physical transmission interface of the port, e.g., unknown, SONET STS-3c at 155.52 Mbps, DS3 at 44.736 Mbps, 4B/5B encoding at 100 Mbps, 8B/10B encoding at 155.52 Mbps, 25 Mbps ATM Forum physical layer, or 51 Mbps ATM Forum physical layer); and the number of priorities that the output port can assign to virtual channel connections. The configuration information provided is referred to as the Port Record for a port. The switch controller sends an All Ports Configuration request message, which has its own particular Message Type field, to the ATM switch to ask for the configuration information for all of the switch ports. Thus, the All Ports Configuration request message does not specify a particular port. The switch sends an All Ports Configuration success response message that provides: the number of Port Records contained by the response message, the byte length of each Port Record, and the Port Records for each port. The Port Record for each port is the same configuration information discussed for the Port Configuration success response message. Of course, if the number of Port Records exceeds a specified maximum amount set for the All Ports Configuration success response message, then the Port Records may be sent in multiple success response messages that each do not exceed the specified maximum amount.

GSMP Event messages allow the ATM switch to inform the switch controller of certain asynchronous events. As mentioned earlier, Event messages are not acknowledged. Event messages may have different Message Types, depending on the asynchronous event. Different Event messages include a Port Up Event message, a Port Down Event message, an Invalid VPI/VCI Event message, a New Port Event message, and a Dead Port Event message. Each switch port maintains an Event Sequence Number and a set of Event Flags (one Event Flag for each type of Event Message). When a switch port sends an Event message, it sets the corresponding Event Flag on that port. The port is not permitted to send another Event message of the same type until the corresponding Event Flag is reset by a Reset Event Flags function of a GSMP Port Management message. The use of the Event Flags provides simple flow control to prevent the switch from flooding the switch controller with Event messages. The Event Sequence Number is set to zero when the port is initialized and is incremented each time an asynchronous event reportable by an Event message is detected on that port, regardless of whether the Event message is sent or not. The current Event Sequence Number is included in Event messages to inform the switch controller of asynchronous events that have occurred on the port, but that have not been reported via an Event message due to the action of the simple flow control mechanism. A Port Up Event message informs the switch controller that the specified port has changed from the down state to the up state. When a port comes up, all connections on its input port are deleted (the input port's connection tables are empty) and a new Port Session Number is assigned by the switch. A Port Down Event message informs the switch controller that the specified port has changed from the up state to the down state. If a switch is capable of detecting link failure, the switch sends a Port Down Event message to report link failure to the switch controller. When one or more ATM cells arrive at an input port with a VPI/VCI that is not currently allocated to a virtual channel connection, the switch sends an Invalid VPI/VCI Event message to the switch controller. The Invalid VPI/VCI Event message specifies the input port and the VPI/VCI in the Port and VPI/VCI fields respectively. A New Port Event message specifying the number of a new port informs the switch controller that the new port has been added to the switch. The Dead Port Event message informs the switch controller that a port has been removed from the switch. The Dead Port Event message specifies the number of the removed port and the Port Session Number that was valid before the port was removed in its Port and Port Session Number fields respectively.

IV. Conclusion

The inventions claimed herein provide an improved method and apparatus for transmitting packets over a network. It is to be understood that the above description is intended to be illustrative and not restrictive. Many embodiments will be apparent to those of skill in the art upon reviewing the above description. By way of example the inventions herein have been illustrated primarily with regard to transmission of IP packets capable of carrying voice, video, image, facsimile, and data signals, but they are not so limited. By way of further example, the invention has been illustrated in conjunction with specific components and operating speeds, but the invention is not so limited. The scope of the inventions should, therefore, be determined not with reference to the above description, but should instead be determined with reference to the appended claims, along with the full scope of equivalents to which such claims are entitled, by one of ordinary skill in the art.

What is claimed is:

1. A method for transmitting packets between an upstream node and a downstream node in a network, said downstream node being downstream from said upstream node, said method comprising the steps of:

establishing default virtual channels between said upstream node and said downstream node;

receiving a packet at said downstream node;

determining whether the packet arrived on one of said default virtual channels;

selectively performing a flow classification, at said downstream node, on said packet;

selecting at said downstream node, a free label on said upstream node;

informing said upstream node that future packets belonging to said specified flow should be sent with said selected free label attached.

2. The method of claim 1 wherein said upstream and downstream nodes use ATM.

3. The method of claim 2 wherein said free label comprises a VPI/VCI.

4. The method of claim 1 wherein said network comprises a local area computer network.

5. A method for transmitting packets between an upstream node and a downstream node in a network, said downstream node being downstream from said upstream node, said method comprising the steps of:

establishing default virtual channels between said upstream node and said downstream node;

receiving a packet at said downstream node;

performing a flow classification at said downstream node on said packet to determine whether said packet belongs to a specified flow that should be redirected in the upstream node;

selecting a free label at said downstream node;

informing said upstream node that future packets belonging to said specified flow should be sent with said selected free label attached; and wherein said network comprises a local area computer network, and wherein said informing step is performed by IFMP software that enables communication between said upstream and downstream nodes.

6. A method for transmitting packets between an upstream node and a downstream node in a network, said downstream node being downstream from said upstream node, said method comprising the steps of:

establishing default virtual channels between said upstream node and said downstream node;

receiving a packet at said downstream node;

performing a flow classification at said downstream node on said packet to determine whether said packet belongs to a specified flow that should be redirected in the upstream node;

selecting a free label at said downstream node;

informing said upstream node that future packets belonging to said specified flow should be sent with said selected free label attached;

wherein said flow classification performing step includes looking at a flow identifier of the packet to determine whether said packet belongs to a specified flow that should be redirected in the upstream node, said flow identifier comprising specified header fields from the packet; and sending said future packets belonging to the specified flow with said specified header fields removed to provide security.

7. The method of claim 6 wherein said future packets may be reconstructed using the flow identifier at a destination permitted to receive said specified flow.

8. A method for switching a flow at a first node, said first node having a downstream link to a second node and an upstream link to a third node, said method comprising the steps of:

performing a flow classification at said first node on a first packet to determine whether said first packet belongs to a specified flow that should be redirected in the third node;

selecting a first free label at said first node;

informing said third node that future packets belonging to said specified flow should be sent with said selected first free label attached;

performing a flow classification at said second node on a second packet to determine whether said second packet belongs to said specified flow that should be redirected in the third node;

selecting a second free label at said second node;

informing said first node that future packets belonging to said specified flow should be sent with said selected second free label attached; and selectively switching said specified flow from said upstream link by said first node to said downstream link; and wherein said specified flow from said upstream link may be sent by said first node to said downstream link.

9. The method of claim 8 wherein said second packet is said first packet.

10. The method of claim 9 wherein said first, second and third nodes use ATM.

11. The method of claim 10 wherein said first and second free labels comprise VPI/VCIs.

12. A method for switching a flow at a first node, said first node having a downstream link to a second node and an upstream link to a third node, said method comprising the steps of:

performing a flow classification at said first node on a first packet to determine whether said first packet belongs to a specified flow that should be redirected in the third node;

selecting a first free label at said first node;

informing said third node that future packets belonging to said specified flow should be sent with said selected first free label attached;

performing a flow classification at said second node on a second packet to determine whether said second packet belongs to said specified flow that should be redirected in the third node;

selecting a second free label at said second node;

informing said first node that future packets belonging to said specified flow should be sent with said selected second free label attached, wherein said specified flow from said upstream link may be switched by said first node to said downstream link, said second packet is said first packet, and said informing steps are performed by IFMP software that enables communication between said nodes.

13. A computer program product that enables dynamic shifting between routing and switching in a network having an upstream node and a downstream node downstream from said upstream node, said computer program product comprising:

computer readable code that performs a flow classification on a packet at said downstream node to determine whether said packet belongs to a specified flow that should be redirected in said upstream node;

computer readable code that selects, at said downstream node, a first free label on said upstream node;

computer readable code that informs said upstream node that future packets belonging to said specified flow should be sent with said selected first free label attached; and a tangible medium that stores the computer readable codes.

14. The computer program product of claim 13, wherein said tangible media comprises a hard disk on a computer.

15. The computer program product of claim 13, wherein said tangible media is selected from a group consisting of CD-ROM, tape, floppy disk, and the like.

16. A method for transmitting packets between an upstream node and a downstream node in a network comprising the steps of:

receiving a packet from said upstream node at said downstream node;

performing a flow classification, at said downstream node, on said packet;

selectively assigning, at said downstream node, a free label on said upstream node;

sending a message to said upstream node indicating said free label; and selectively including said free label in future packets from said upstream node.

17. The method of claim 16 wherein said free label comprises a VPI/VCI.

18. The method of claim 16 wherein said network comprises an ATM network.

19. A method for forwarding packets from a first node to a second node in a network comprising the steps of:

receiving a first packet from said first node;

performing a flow classification on said first packet;

selectively assigning a free label to a flow associated with said first packet;

sending a message to said first node indicating said free label; and forwarding future packets from said flow using a channel indicated by said free label.

20. The method of claim 19 further comprising the steps of:

setting a timer upon assigning said free label; and forwarding future packets from said flow using a default channel upon expiration of said timer.

21. A method for switching a flow at a first node comprising the steps of:

receiving a first packet of said flow from an upstream node;

performing a flow classification on said first packet;

selecting a first free label on said upstream node;

sending a message to said upstream node indicating said first free label;

receiving a message from a downstream node indicating a second free label; and selectively switching future packets of said flow from said upstream node to said downstream node based on said first and second free labels.

22. The method of claim 21 further wherein said upsteam and downstream nodes use ATM.

23. A computer program product for transmitting packets between an upstream node and a downstream node in a network comprising:

code for receiving a packet from said upstream node at said downstream node;

code for performing a flow classification, at said downstream node, on said packet;

code for selectively assigning, at said downstream node, a free label on said upstream node;

code for sending a message to said upstream node indicating said free label; and code for selectively including said free label in future packets from said upstream node.

24. A computer program product for forwarding packets from a first node to a second node in a network comprising:

code for receiving a first packet from said first node;

code for performing a flow classification on said first packet;

code for selectively assigning a free label to a flow associated with said first packet;

code for sending a message to said first node indicating said free label; and code for forwarding future packets from said flow using a channel indicated by said free label.

25. A computer program product for switching a flow at a first node comprising:

code for receiving a first packet of said flow from an upstream node;

code for performing a flow classification on said first packet;

code for selecting a first free label on said upstream node;

code for sending a message to said upstream node indicating said first free label;

code for receiving a message from a downstream node indicating a second free label; and code for selectively switching future packets of said flow from said upstream node to said downstream node based on said first and second free labels.

\* \* \* \* \*